(12) United States Patent
Jin et al.

(10) Patent No.: US 12,342,363 B2
(45) Date of Patent: Jun. 24, 2025

(54) ELECTRONIC DEVICE FOR PROVIDING AUDIO SERVICE AND OPERATING METHOD THEREOF

(71) Applicant: SAMSUNG ELECTRONICS CO., LTD., Suwon-si (KR)

(72) Inventors: Juyeon Jin, Suwon-si (KR); Gupil Cheong, Suwon-si (KR); Doosuk Kang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 436 days.

(21) Appl. No.: 17/963,765

(22) Filed: Oct. 11, 2022

(65) Prior Publication Data
US 2023/0116736 A1    Apr. 13, 2023

Related U.S. Application Data

(63) Continuation of application No. PCT/KR2022/014451, filed on Sep. 27, 2022.

(30) Foreign Application Priority Data

Oct. 8, 2021  (KR) .................. 10-2021-0133737
Jan. 26, 2022 (KR) .................. 10-2022-0011621

(51) Int. Cl.
*H04W 72/54* (2023.01)

(52) U.S. Cl.
CPC .................... *H04W 72/54* (2023.01)

(58) Field of Classification Search
CPC .... H04W 72/54; H04W 92/18; H04W 72/542
See application file for complete search history.

(56) References Cited

U.S. PATENT DOCUMENTS 11,956,676 B2 *  4/2024 Bonde .................. H04W 28/20
2016/0316051 A1  10/2016 Hsieh
(Continued)

FOREIGN PATENT DOCUMENTS

CN    109347581 A    2/2019
CN    110519742 A    11/2019
(Continued)

OTHER PUBLICATIONS

International Search Report with Written Opinion issued in International Application No. PCT/KR2022/014451; International Filing Date Sep. 27, 2022; Date of Mailing Jan. 10, 2023 (10 pages).

*Primary Examiner* — Brian D Nguyen
(74) *Attorney, Agent, or Firm* — CANTOR COLBURN LLP

(57) ABSTRACT

According to an embodiment, an electronic device may include a communication circuit, and at least one processor operatively connected to the communication circuit. The at least one processor may be configured to receive, from an external electronic device via the communication circuit, information associated with a communication link established between the external electronic device and another external electronic device. The at least one processor may be configured to receive, from the external electronic device via the communication circuit, a request that the electronic device transmit, to the other external electronic device instead of the external electronic device, first data transmitted from the external electronic device to the other external electronic device. The at least one processor may be configured to, in response to the request, receive, via the communication circuit, the first data transmitted from the external electronic device to the other external electronic device. The at least one processor may be configured to transmit the received first data to the other external elec- (Continued)

tronic device instead of the external electronic device via the communication circuit.

20 Claims, 27 Drawing Sheets

(56) References Cited

U.S. PATENT DOCUMENTS

| | | |
|---|---|---|
| 2017/0192743 A1 | 7/2017 | Chun et al. |
| 2017/0311105 A1 | 10/2017 | Hariharan et al. |
| 2017/0366924 A1 | 12/2017 | Thoen |
| 2018/0199282 A1 | 7/2018 | Newham |
| 2018/0279050 A1 | 9/2018 | Ryu |
| 2019/0052961 A1 | 2/2019 | Yun et al. |
| 2019/0261089 A1 | 8/2019 | Hariharan et al. |
| 2020/0100029 A1 | 3/2020 | Watson et al. |
| 2020/0107127 A1 | 4/2020 | Gong et al. |
| 2020/0107387 A1 | 4/2020 | Li et al. |
| 2020/0205031 A1 | 6/2020 | Gostev et al. |
| 2022/0078541 A1* | 3/2022 | Zhu .................. H04W 4/38 |
| 2022/0369394 A1* | 11/2022 | Ni .................. H04M 1/6066 |
| 2024/0080134 A1* | 3/2024 | Zhu .................. H04L 1/0036 |
| 2024/0212808 A1* | 6/2024 | Nie .................. G16H 50/30 |
| 2024/0244381 A1* | 7/2024 | Goldstein .......... H04R 25/305 |

FOREIGN PATENT DOCUMENTS

| | | |
|---|---|---|
| KR | 20170082405 A | 7/2017 |
| KR | 20180108310 A | 10/2018 |
| KR | 20190016802 A | 2/2019 |
| KR | 20200013798 A | 2/2020 |
| KR | 20210111453 A | 9/2021 |

\* cited by examiner

ELECTRONIC DEVICE FOR PROVIDING AUDIO SERVICE AND OPERATING METHOD THEREOF

CROSS-REFERENCE TO RELATED APPLICATION(S)

This application is a bypass continuation application of International Application No. PCT/KR2022/014451, which was filed on Sep. 27, 2022, and is based on and claims priority to Korean Patent Application No. 10-2022-0011621, which was filed in the Korean Intellectual Property Office on Jan. 26, 2022, and Korean Patent Application No. 10-2021-0133737, which was filed in the Korean Intellectual Property Office on Oct. 8, 2021, the disclosures of which are incorporated by reference herein in their entireties.

BACKGROUND

1. Field

An embodiment of the disclosure relate to an electronic device providing an audio service and an operating method thereof.

2. Description of Related Art

Recently, with the development of an information communication technology, various wireless communication technologies, along with various services such as, for example, audio streaming services. In particular, a Bluetooth scheme which is one of short-range communication schemes has been actively used, and electronic devices using the Bluetooth scheme have been also widely used. In particular, a pair of ear buds which may be respectively worn on both ears of a user have been widely used as an ear-wearable device. The ear-wearable device may provide various functions. For example, the ear-wearable device may use a microphone to input and identify a user's voice, transmit audio data related to the user's voice to an electronic device (e.g., a smart phone), and use a speaker to output audio data received from the electronic device.

The Bluetooth scheme may include a Bluetooth legacy (or Bluetooth classic) scheme or a Bluetooth low energy (BLE) scheme. Each of electronic devices (e.g., a first electronic device (e.g., a left earbud) and a second electronic device (e.g., a right earbud)) providing an audio over BLE (AoBLE) service which is based on the BLE scheme may establish a communication link independently of an external electronic device (e.g., a smart phone), and may transmit and receive data to and from the external electronic device through the established communication link.

If the first electronic device, the second electronic device, and the external electronic device which are connected based on the BLE scheme provide a stereo audio service such as music play, each of the first electronic device and the second electronic device may operate as an audio sink, and the external electronic device may operate as an audio source. The first electronic device may serve as a first audio channel (e.g., a left audio channel) role, and the second electronic device may serve as a second audio channel (e.g., a right audio channel) role. Each of the first electronic device and the second electronic device may transmit, to the external electronic device at a set time point, a device capability identifier (ID) (e.g., a connected isochronous stream (CIS) ID) related to an audio channel role performed by each of the first electronic device and the second electronic device. For example, the set time point may be a time point when each of the first electronic device and the second electronic device is connected to the external electronic device, or a time point when a service (e.g., a stereo audio service) is started. The external electronic device may identify the audio channel role performed by each of the first electronic device and the second electronic device based on the device capability ID received from each of the first electronic device and the second electronic device, and may transmit and receive audio data to and from each of the first electronic device and the second electronic device based on the identified audio channel role.

If a first electronic device, a second electronic device, and an external electronic device which are connected based on a BLE scheme provide a binaural recording service, each of the first electronic device and the second electronic device may transmit, to the external electronic device, audio data inputted via a microphone of each of the first electronic device and the second electronic device.

Because each of the first electronic device and the second electronic device transmits and receives audio data through a communication link established with the external electronic device based on the BLE scheme, if a radio link failure (RLF) occurs in a communication link of any one of the first electronic device and the second electronic device while the binaural recording service is being provided, service quality degradation, such as occurrence of distortion, roar, or silence in one side of a sound source recorded in stereo type, may occur.

So, there is a need for a scheme in which the external electronic device may stably provide the audio service even if the RLF occurs in the communication link of any one of the first electronic device and the second electronic device.

SUMMARY

An electronic device according to an embodiment may include a communication circuit, and at least one processor operatively connected to the communication circuit.

According to an embodiment, the at least one processor may be configured to receive, from an external electronic device via the communication circuit, information associated with a communication link established between the external electronic device and another external electronic device.

According to an embodiment, the at least one processor may be further configured to receive, from the external electronic device via the communication circuit, a request that the electronic device transmit, to the other external electronic device, first data transmitted from the external electronic device to the other external electronic device instead of the external electronic device.

According to an embodiment, the at least one processor may be further configured to, in response to the request, receive, via the communication circuit, the first data transmitted from the external electronic device to the other external electronic device.

According to an embodiment, the at least one processor may be further configured to transmit, to the other external electronic device via the communication circuit, the received first data instead of the external electronic device.

An electronic device according to an embodiment may include a communication circuit, and at least one processor operatively connected to the communication circuit.

According to an embodiment, the at least one processor may be configured to transmit, to an external electronic device via the communication circuit, information associated with a communication link established between the electronic device and another external electronic device.

According to an embodiment, the at least one processor may be configured to identify that quality of the communication link is less than threshold quality.

According to an embodiment, the at least one processor may be further configured to, in response to identifying that the quality of the communication link is less than the threshold quality, transmit, to the external electronic device via the communication circuit, a request that the external electronic device receive first data transmitted from the electronic device to the other external electronic device to transmit, to the other external electronic device, the first data instead of the electronic device.

According to an embodiment, the at least one processor may be further configured to transmit the first data to the other external electronic device via the communication circuit.

An electronic device according to an embodiment may include a communication circuit, and at least one processor operatively connected to the communication circuit.

According to an embodiment, the at least one processor may be configured to identify that quality of a communication link established between the electronic device and an external electronic device is less than threshold quality.

According to an embodiment, the at least one processor may be further configured to, in response to identifying that the quality of the communication link is less than the threshold quality, transmit, to another external electronic device via the communication circuit, a request that the other external electronic device transmit, to the electronic device, first data transmitted from the external electronic device to the electronic device instead of the external electronic device.

According to an embodiment, the at least one processor may be further configured to receive, from the other external electronic device via the communication circuit, the first data received by the other external electronic device.

According to an embodiment, an operating method of an electronic device may include receiving, from an external electronic device, information associated with a communication link established between the external electronic device and another external electronic device.

According to an embodiment, the operating method may further include receiving, from the external electronic device, a request that the electronic device transmit, to the other external electronic device, first data transmitted from the external electronic device to the other external electronic device instead of the external electronic device.

According to an embodiment, the operating method may further include, in response to the request, receiving the first data transmitted from the external electronic device to the other external electronic device.

According to an embodiment, According to an embodiment, the operating method may further include transmitting, to the other external electronic device, the received first data instead of the external electronic device.

According to an embodiment, an operating method of an electronic device may include transmitting, to an external electronic device, information associated with a communication link established between the electronic device and another external electronic device.

According to an embodiment, the operating method may further include identifying that quality of the communication link is less than threshold quality.

According to an embodiment, the operating method may further include, in response to identifying that the quality of the communication link is less than the threshold quality, transmitting, to the external electronic device, a request that the external electronic device receive first data transmitted from the electronic device to the other external electronic device to transmit, to the other external electronic device, the first data instead of the electronic device.

According to an embodiment, the operating method may further include transmitting the first data to the other external electronic device via the communication circuit.

According to an embodiment, an operating method of an electronic device may include identifying that quality of a communication link established between the electronic device and an external electronic device is less than threshold quality.

According to an embodiment, the operating method may further include, in response to identifying that the quality of the communication link is less than the threshold quality, transmitting, to another external electronic device, a request that the other external electronic device transmit, to the electronic device, first data transmitted from the external electronic device to the electronic device instead of the external electronic device.

According to an embodiment, the operating method may further include receiving, from the other external electronic device, the first data received by the other external electronic device.

According to an embodiment, a non-transitory computer readable storage medium may include one or more programs, the one or more programs comprising instructions configured to, when executed by at least one processor of an electronic device, cause the electronic device to, receive, from an external electronic device, information associated with a communication link established between the external electronic device and another external electronic device.

According to an embodiment, the instructions may be further configured to cause the electronic device to receive, from the external electronic device, a request that the electronic device transmit, to the other external electronic device, first data transmitted from the external electronic device to the other external electronic device instead of the external electronic device.

According to an embodiment, the instructions may be further configured to cause the electronic device to, in response to the request, receive the first data transmitted from the external electronic device to the other external electronic device.

According to an embodiment, the instructions may be further configured to cause the electronic device to transmit, to the other external electronic device, the received first data instead of the external electronic device.

According to an embodiment, a non-transitory computer readable storage medium may include one or more programs, the one or more programs comprising instructions configured to, when executed by at least one processor of an electronic device, cause the electronic device to, transmit, to an external electronic device, information associated with a communication link established between the electronic device and another external electronic device.

According to an embodiment, the instructions may be further configured to cause the electronic device to identify that quality of the communication link is less than threshold quality.

According to an embodiment, the instructions may be further configured to cause the electronic device to, in response to identifying that the quality of the communication link is less than the threshold quality, transmit, to the external electronic device, a request that the external electronic device receive first data transmitted from the electronic device to the other external electronic device to transmit, to the other external electronic device, the first data instead of the electronic device.

According to an embodiment, the instructions may be further configured to cause the electronic device to transmit the first data to the other external electronic device via the communication circuit.

According to an embodiment, a non-transitory computer readable storage medium may include one or more programs, the one or more programs comprising instructions configured to, when executed by at least one processor of an electronic device, cause the electronic device to, identify that quality of a communication link established between the electronic device and an external electronic device is less than threshold quality.

According to an embodiment, the instructions may be further configured to cause the electronic device to, in response to identifying that the quality of the communication link is less than the threshold quality, transmit, to another external electronic device, a request that the other external electronic device transmit, to the electronic device, first data transmitted from the external electronic device to the electronic device instead of the external electronic device.

According to an embodiment, the instructions may be further configured to cause the electronic device to receive, from the other external electronic device, the first data received by the other external electronic device.

DETAILED DESCRIPTION

Figure 1:
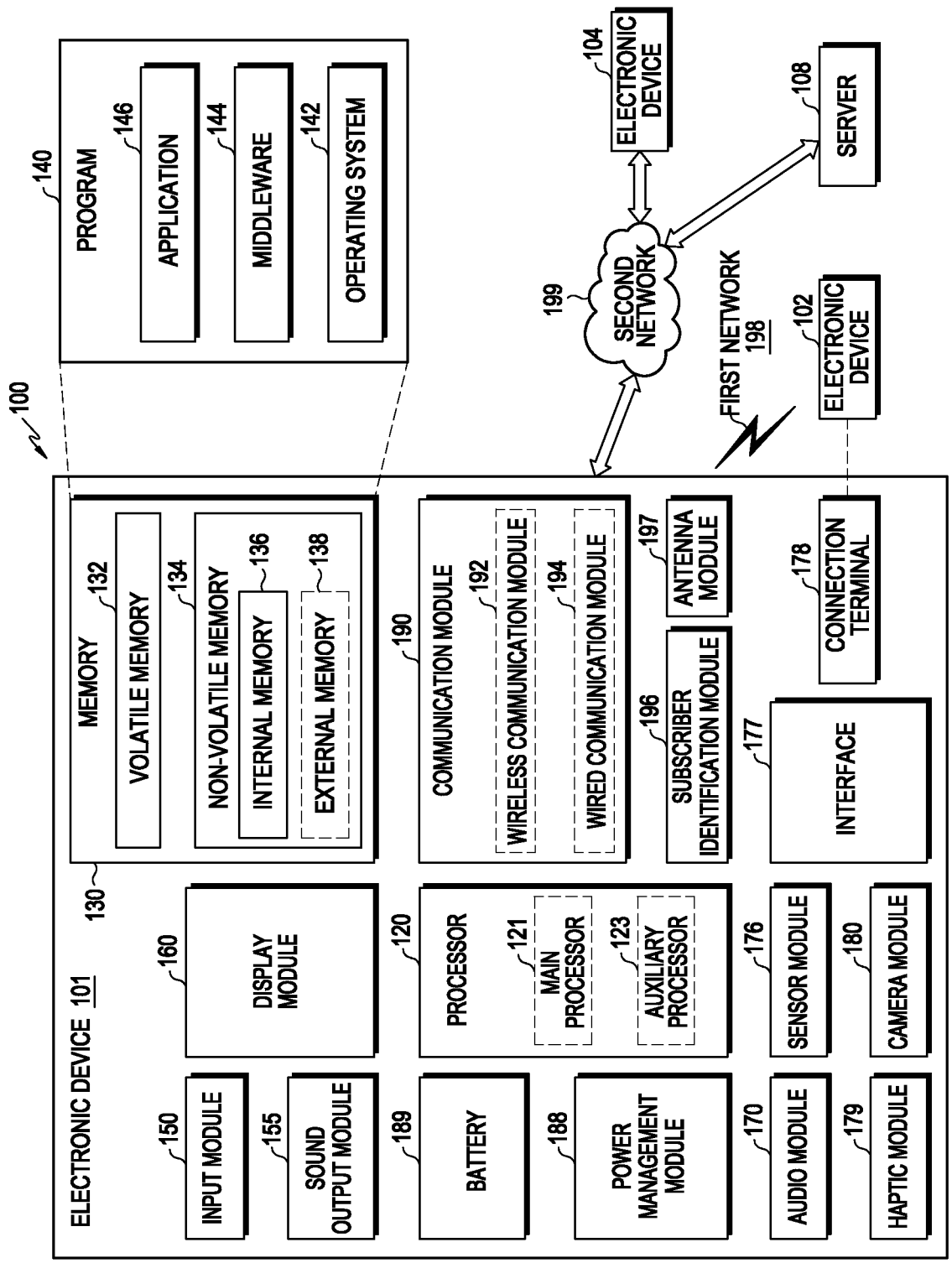
FIG. 1 is a block diagram schematically illustrating an electronic device within a network environment according to an embodiment.

Hereinafter, an embodiment of the disclosure will be described in detail with reference to the accompanying drawings. In the following description of an embodiment of the disclosure, a detailed description of relevant known functions or configurations incorporated herein will be omitted when it is determined that the description may make the subject matter of an embodiment of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in an embodiment of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in an embodiment of the disclosure, the terminal may be a device having a communication function such as, for example, a mobile phone, a personal digital assistant (PDA), a smart phone, a wireless MODEM, and a notebook.

In a detailed description of an embodiment of the disclosure, a standard specified by Bluetooth special interest group (SIG) is referred to, but the main subject of the disclosure can be somewhat modified and applied to other communication systems having a similar technical background without departing from the scope of the disclosure, and the modifications can be made on the basis of determination of those skilled in the art.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
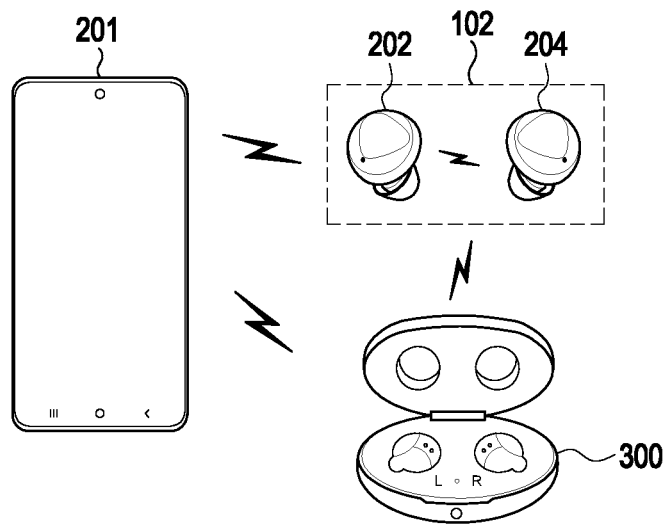
FIG. 2 is a diagram schematically illustrating an example of connections between electronic devices which are based on a Bluetooth scheme in a wireless communication network according to an embodiment.

FIG. 2 is a diagram schematically illustrating an example of connections between electronic devices which are based on a Bluetooth scheme in a wireless communication network according to an embodiment.

Referring to FIG. 2, an external electronic device 201 (e.g., an electronic device 101 in FIG. 1) may be connected wirelessly to one or more ear-wearable devices 102 (e.g., an electronic device 102 in FIG. 1). In an embodiment, the external electronic device 201 may be a smart phone. The ear-wearable device 102 may include a first electronic device 202 (e.g., a left earbud) and a second electronic device 204 (e.g., a right earbud).

In an embodiment, it is assumed that the first electronic device 202 and the second electronic device 204 are included in the ear-wearable device 102, but the first electronic device 202 and the second electronic device 204 may be included in any electronic device as long as the first electronic device 202 and the second electronic device 204 may operate as a pair as well as the ear-wearable device 102.

According to an embodiment, the first electronic device 202 and the second electronic device 204 may be implemented to include the same or similar components.

According to an embodiment, the external electronic device 201, the first electronic device 202, and the second electronic device 204 may establish a connection (e.g., a communication link) with one another and transmit and/or receive data to and from one another. For example, the electronic device 101 and each of the first electronic device 202 and the second electronic device 204 may establish a communication link based on at least one of a Wi-Fi scheme and/or a Bluetooth scheme, however, a scheme for establishing the communication link in the electronic device 101 and each of the first electronic device 202 and the second electronic device 204 is not limited to at least one of the Wi-Fi scheme and/or the Bluetooth scheme.

In an embodiment, the external electronic device 201 may establish a communication link with only one of the first electronic device 202 and the second electronic device 204 or may establish a communication link with each of the first electronic device 202 and the second electronic device 204.

In an embodiment, the first electronic device 202 and the second electronic device 204 may establish a communication link based on at least one of the Wi-Fi scheme and/or the Bluetooth scheme, however, a scheme for establishing the communication link in the first electronic device 202 and the second electronic device 204 is not limited to at least one of the Wi-Fi scheme and/or the Bluetooth scheme.

In an embodiment, one of the first electronic device 202 and the second electronic device 204 may be a central (or a master, a primary device, or a main), and the other one may operate as a peripheral (or a slave or a secondary). An electronic device operating as a central may transmit data to an electronic device operating as a peripheral. For example, when the first electronic device 202 and the second electronic device 204 establish a communication link with each other, one of the first electronic device 202 and the second electronic device 204 may be randomly selected as a central, and the other one may be selected as a peripheral.

The first electronic device 202 and the second electronic device 204 may communicate directly or indirectly with the third electronic device 300. In an embodiment, the third electronic device 300 may be an ear-buds case device or cradle device which stores and charges the first electronic device 202 and the second electronic device 204, and in FIG. 2, it will be assumed that the third electronic device 300 is an ear-buds case device for convenience of description.

Figure 3:
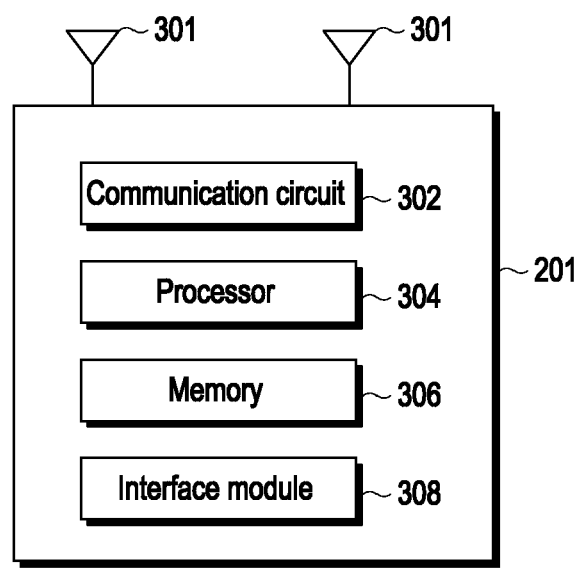
FIG. 3 is a block diagram of an external electronic device in a wireless communication network according to an embodiment.

FIG. 3 is a block diagram of an external electronic device in a wireless communication network according to an embodiment.

Referring to FIG. 3, an external electronic device 201 (e.g., an electronic device 101 in FIG. 1 or an external electronic device 201 in FIG. 2) may be a device implementing a Bluetooth low energy (BLE) scheme. The external electronic device 201 may include a communication circuit 302 (e.g., a communication module 190) which transmits and receives signals with another electronic device (e.g., an electronic device 102 or 104 in FIG. 1), for example, a peer device by using one or more antennas 301. In an embodiment, the other electronic device may include a first electronic device 202 and a second electronic device 204.

The external electronic device 201 may include a processor 304 (e.g., a processor 120 in FIG. 1) which may be implemented in one or more single-core processors or one or more multi-core processors, and a memory 306 (e.g., a memory 130 in FIG. 1) which stores instructions for an operation of the external electronic device 201.

The external electronic device 201 may include an interface module 308 (e.g., an interface 177 in FIG. 1) which provides a wired and/or wireless interface for communicating with components outside a network. For example, at least a portion of the one or more antennas 301, the communication circuit 302, or the interface module 308 may be implemented as at least a portion of the communication module 190 and the antenna module 198 in FIG. 1.

According to an embodiment, the external electronic device 201 may include a plurality of communication circuits, one of the plurality of communication circuits may be a communication circuit which is based on a Wi-Fi scheme, and another of the plurality of communication circuits may be a communication circuit which is based on a Bluetooth scheme, e.g., a BLE scheme. According to an embodiment, the plurality of communication circuits may include a communication circuit 302, and the communication circuit 302 may be a communication circuit which is based on the Wi-Fi scheme or a communication circuit which is based on the BLE scheme.

According to an embodiment, the external electronic device 201 does not separately include a communication circuit which is based on the Wi-Fi scheme and a communication circuit which is based on the BLE scheme, and may include one communication circuit capable of supporting both the Wi-Fi scheme and the BLE scheme. According to an embodiment, the one communication circuit capable of supporting both the Wi-Fi scheme and the BLE scheme may be the communication circuit 302.

Figure 4:
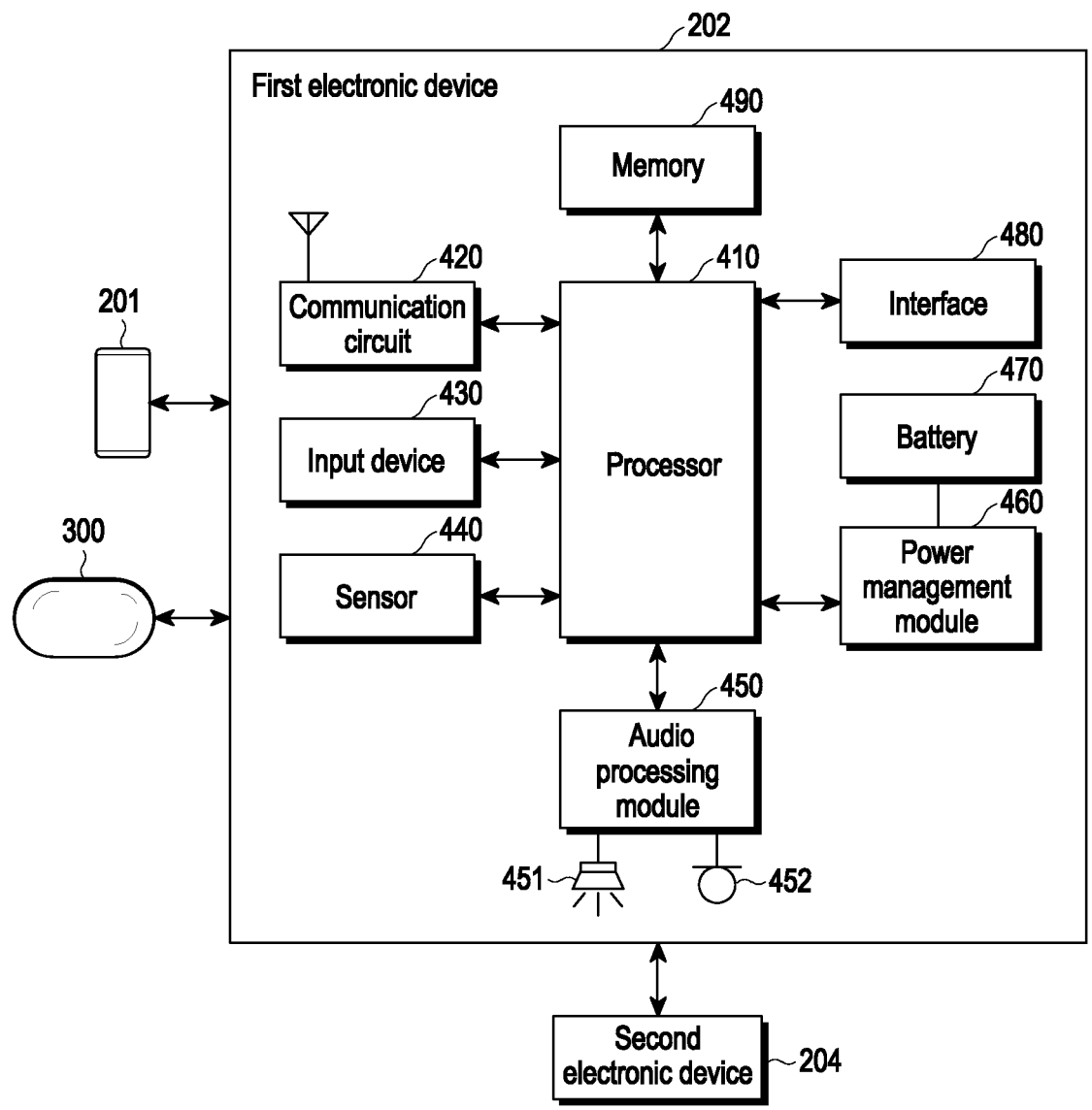
FIG. 4 is a block diagram of a first electronic device in a wireless communication network according to an embodiment.

FIG. 4 is a block diagram of a first electronic device in a wireless communication network according to an embodiment.

Referring to FIG. 4, an external electronic device 201 (e.g., an electronic device 101 in FIG. 1 or an external electronic device 201 in FIG. 2 or FIG. 3) may be connected wirelessly to an ear-wearable device (e.g., an electronic device 102 in FIG. 1). In an embodiment, the external electronic device 201 may be a smart phone, and the ear-wearable device may include a first electronic device 202 (e.g., a left earbud) and a second electronic device 204 (e.g., a right earbud). In an embodiment, the external electronic device 201, the first electronic device 202 (e.g., a left earbud) and a second electronic device 204 (e.g., a right earbud) operate together to establish a binaural recording system. In an embodiment, binaural recording allows for recording sound using two microphones, (e.g., a first microphone included in the first electronic device 202 and a second microphone included in the second electronic device 204) which are arranged with the intent to create a 3-D stereo sound sensation for the listener of actually being in the room with the performers or instruments.

In FIG. 4, it is described that each of the first electronic device 202 and the second electronic device 204 is implemented as an earbud, but the first electronic device 202 and the second electronic device 204 may be implemented as various types of devices (e.g., a smart watch, a head-mounted display device, and devices for measuring a biometric signal (e.g., an electrocardiogram patch)) which may include at least one electrode and sensor device to be described below. According to an embodiment, if each of the first electronic device 202 and the second electronic device 204 is implemented as an earbud, the first electronic device 202 and the second electronic device 204 may compose a pair. According to an embodiment, the first electronic device 202 and the second electronic device 204 may be implemented to include the same or similar components.

According to an embodiment, the external electronic device 201, the first electronic device 202, and the second electronic device 204 may establish a connection (e.g., a communication link) with one another and transmit and/or receive data to and from one another. For example, the external electronic device 201 and each of the first electronic device 202 and the second electronic device 204 may establish a communication link using at least one of a Wi-Fi scheme and/or a Bluetooth scheme, however, a scheme for establishing the communication link in the external electronic device 201 and each of the first electronic device 202 and the second electronic device 204 is not limited to at least one of the Wi-Fi scheme and/or the Bluetooth scheme.

In an embodiment, the external electronic device 201 may connect a communication link to only one (e.g., a central earbud) of the first electronic device 202 and the second electronic device 204 or may connect communication links to both the first electronic device 202 and the second electronic device 204.

In an embodiment, the first electronic device 202 and the second electronic device 204 may establish a communication link based on at least one of the Wi-Fi scheme and/or the Bluetooth scheme, however, a scheme for establishing the communication link in the first electronic device 202 and the second electronic device 204 is not limited to at least one of the Wi-Fi scheme and/or the Bluetooth scheme.

In an embodiment, the first electronic device 202 may include the same or similar components to at least one of the components (e.g., modules) of the external electronic device 201 (e.g., the electronic device in FIG. 1). The first electronic device 202 may include a communication circuit 420 (e.g., a communication module 190 in FIG. 1), an input device 430 (e.g., an input module 150 in FIG. 1), a sensor 440 (e.g., a sensor module 176 in FIG. 1), an audio processing module 450 (e.g., an audio module 170 in FIG. 1), a memory 490 (e.g., a memory 130 in FIG. 1), a power management module 460 (e.g., a power management module 188 in FIG. 1), a battery 470 (e.g., a battery 189 in FIG. 1), an interface 480 (e.g., an interface 177 in FIG. 1), and a processor 410 (e.g., a processor 120 in FIG. 1).

According to an embodiment, the communication circuit 420 may include at least one of a wireless communication module (e.g., a Bluetooth communication module, a cellular communication module, a wireless-fidelity (Wi-Fi) communication module, a near-field communication (NFC) communication module, or a GNSS communication module) or a wired communication module (e.g., a LAN communication module and/or a power line communication (PLC) communication module).

The communication circuit 420 may directly and/or indirectly communicate with at least one of the external electronic device 201, the third electronic device 300, or the second electronic device 204 through a first network (e.g., a first network 198 in FIG. 1), using at least one communication module. The second electronic device 204 may compose a pair with the first electronic device 202. The communication module 420 may include one or more communication processors which are operable independently from the processor 410 and supports wired or wireless communication.

According to an embodiment, the communication circuit 420 may be connected to one or a plurality of antennas for transmitting signals or information to another electronic device (e.g., the external electronic device 201, the second electronic device 204, or the third electronic device 300) or receiving signals or information from the other electronic device.

According to an embodiment, at least one antenna appropriate for a communication scheme used in a communication network, such as the first network (e.g., the first network 198 of FIG. 1) or the second network (e.g., the second network 199 of FIG. 2), may be selected from the plurality of antennas by the communication circuit 420. The signal or information may then be transmitted or received between the communication circuit 420 and another electronic device via the selected at least one antenna.

According to an embodiment, the input device 430 may be configured to generate various input signals that may be used for operation of the first electronic device 202. The input device 430 may include at least one of a touch pad, a touch panel, or a button.

According to an embodiment, the input device 430 may generate a user input related to the turn-on or turn-off of the first electronic device 202. According to an embodiment, the input device 430 may receive a user input for establishing a communication link between the first electronic device 202 and the second electronic device 204. According to an embodiment, the input device 430 may receive a user input related to audio data (or audio content). For example, the user input may be associated with functions of starting playback of audio data, pausing playback, stopping playback, adjusting playback speed, adjusting playback volume, or muting.

According to an embodiment, the sensor 440 may obtain a location or an operation state of the first electronic device 202. The sensor 440 may convert an obtained signal into an electric signal. For example, the sensor 440 may include at least one of a magnetic sensor, an acceleration sensor, a gyro sensor, a geomagnetic sensor, a proximity sensor, a gesture sensor, a grip sensor, a biometric sensor, and/or an optical sensor.

According to an embodiment, the processor 410 may obtain data (e.g., audio data) from a data packet received from the external electronic device 201, and process the obtained data via the audio processing module 450 to output the processed data via the speaker 454. The audio processing module 450 may support an audio data gathering function and reproduce the gathered audio data.

According to an embodiment, the audio processing module 450 may include an audio decoder (not shown) and a D/A converter (not shown). The audio decoder may convert audio data stored in the memory 490 or received from the external electronic device 201 via communication circuit 420 into a digital audio signal. The D/A converter may convert the digital audio signal converted by the audio decoder into an analog audio signal. According to an embodiment, the audio decoder may convert audio data received from the external electronic device 201 via the communication circuit 420 and stored in the memory 490 into a digital audio signal. The speaker 454 may output the analog audio signal converted by the D/A converter.

According to an embodiment, the audio processing module 450 may include an A/D converter (not shown). The A/D converter may convert the analog audio signal transferred via a microphone 452 into a digital voice signal. The microphone 452 may include at least one air conduction microphone and/or at least one bone conduction microphone for obtaining voice and/or sound.

According to an embodiment, the audio processing module 450 may play various audio data set in the operation of the first electronic device 202. For example, the processor 410 may be designed to identify insertion or removal of the first electronic device 202 into/from the user's ear via the sensor 440 and reproduce audio data regarding an effect sound or guide sound via the audio processing module 450. The output of the sound effect or guide sound may be omitted according to the user setting or the designer's intention.

According to an embodiment, the memory 490 may store various data used by at least one component (e.g., the processor 410 or the sensor 440) of the first electronic device 202. For example, data may include software and input data or output data for an instruction related thereto. The memory 490 may include a volatile memory or a non-volatile memory.

According to an embodiment, the power management module 460 may manage power supplied to the first electronic device 202. According to one embodiment, the power management module 460 may be implemented as at least part of a power management integrated circuit (PMIC). According to an embodiment, the power management module 460 may include a battery charging module. According to an embodiment, if another electronic device (e.g., one of the external electronic device 201, the second electronic device 204, and/or the third electronic device) is electrically (wirelessly or wiredly) connected to the first electronic device 202, the power management module 460 may receive power from the other electronic device to charge the battery 470.

According to an embodiment, the battery 470 may supply power to at least one component of the first electronic device 202. According to an embodiment, the battery 470 may include a rechargeable battery. According to an embodiment, if the first electronic device 202 is mounted in the third electronic device 300, the first electronic device 202 may charge the battery 470 to a designated charge level and then power on the first electronic device 202 or turn on at least part of the communication circuit 420.

According to an embodiment, the interface 480 may support one or more designated protocols which may be used for the first electronic device 202 to directly (e.g., wiredly) connect to the external electronic device 201, the third electronic device 300, the second electronic device 204, or another electronic device. According to an embodiment, the interface 480 may include at least one of a high definition multimedia interface (HDMI), a USB interface, an SD card interface, a power line communication (PLC) interface, or an audio interface. According to an embodiment, the interface 480 may include at least one connection port for establishing a physical connection with the third electronic device 300.

According to an embodiment, the processor 410 may execute software to control at least one other component (e.g., a hardware or software component) of the first electronic device 202 connected with the processor 410 and may process or compute various data. According to an embodiment, as at least part of the data processing or computation, the processor 410 may load an instruction or data received from another component (e.g., the sensor 440 or communication circuit 420) onto a volatile memory 490, process the instruction or the data stored in the volatile memory 490, and store resulting data in a non-volatile memory.

According to an embodiment, the processor 410 may establish a communication link with the external electronic device 201 via the communication circuit 420 and receive data (e.g., audio data) from the external electronic device 201 through the established communication link. According to an embodiment, the processor 410 may transmit the data, received from the external electronic device 201 via the communication circuit 420, to the second electronic device 204. According to an embodiment, the processor 410 may perform operations of the first electronic 202 which are to be described below.

According to an embodiment, the first electronic device 202 may further include various modules depending on the form in which it is provided. There are many variations according to the convergence trend of digital devices, so it is not possible to list them all, but components equivalent to the above-mentioned components may be further included in the first electronic device 202. Further, it is apparent that in the first electronic device 202 according to an embodiment, specific components may be excluded from the components described in FIG. 4 or the specific components may be replaced with other components according to the form in which it is provided.

According to an embodiment, the second electronic device 204 configured in pair with the first electronic device 202 may include the same or similar components to those included in the first electronic device 202 and may perform all or some of operations of the first electronic device 202 to be described below.

An embodiment of the disclosure may provide an electronic device which provides an audio service and an operating method thereof.

According to an embodiment of the disclosure may provide an electronic device which transmits data which is transmitted through a communication link in which an RLF occurs through another communication link in which the RLF does not occur when the RLF occurs in at least one of communication links between electronic devices which provide an audio service and an operating method thereof.

According to an embodiment of the disclosure, an electronic device (e.g., a second electronic device 204 in FIG. 2 or FIG. 4) may include a communication circuit (e.g., a communication circuit 420 in FIG. 4), and at least one processor (e.g., a processor 410 in FIG. 4) operatively connected to the communication circuit (e.g., the communication circuit 420 in FIG. 4).

According to an embodiment of the disclosure, the at least one processor (e.g. the processor 410 in FIG. 4) may be configured to receive, from an external electronic device (e.g., a first electronic device 202 in FIG. 2 or FIG. 4) via the communication circuit (e.g., the communication circuit 420 in FIG. 4), information associated with a communication link established between the external electronic device (e.g., the first electronic device 202 in FIG. 2 or FIG. 4) and another external electronic device (e.g., an electronic device 101 in FIG. 1 or an external electronic device 201 in FIG. 2, FIG. 3, or FIG. 4).

According to an embodiment of the disclosure, the at least one processor (e.g. the processor 410 in FIG. 4) may be further configured to receive, from the external electronic device (e.g., the first electronic device 202 in FIG. 2 or FIG. 4) via the communication circuit (e.g., the communication circuit 420 in FIG. 4), a request that the electronic device (e.g., the second electronic device 204 in FIG. 2 or FIG. 4) transmit, to the other external electronic device (e.g., the electronic device 101 in FIG. 1 or the external electronic device 201 in FIG. 2, FIG. 3, or FIG. 4), first data transmitted from the external electronic device (e.g., the first electronic device 202 in FIG. 2 or FIG. 4) to the other external electronic device (e.g., the electronic device 101 in FIG. 1 or the external electronic device 201 in FIG. 2, FIG. 3, or FIG. 4) instead of the external electronic device (e.g., the first electronic device 202 in FIG. 2 or FIG. 4).

According to an embodiment of the disclosure, the at least one processor (e.g. the processor 410 in FIG. 4) may be further configured to, in response to the request, receive, via the communication circuit (e.g., the communication circuit 420 in FIG. 4), the first data transmitted from the external electronic device (e.g., the first electronic device 202 in FIG. 2 or FIG. 4) to the other external electronic device (e.g., the electronic device 101 in FIG. 1 or the external electronic device 201 in FIG. 2, FIG. 3, or FIG. 4).

According to an embodiment of the disclosure, the at least one processor (e.g. the processor 410 in FIG. 4) may be further configured to transmit, to the other external electronic device (e.g., the electronic device 101 in FIG. 1 or the external electronic device 201 in FIG. 2, FIG. 3, or FIG. 4) via the communication circuit (e.g., the communication circuit 420 in FIG. 4), the received first data instead of the external electronic device (e.g., the first electronic device 202 in FIG. 2 or FIG. 4).

According to an embodiment of the disclosure, the request may be received if quality of the communication link is less than threshold quality.

According to an embodiment of the disclosure, the request may include information about a time point at which the electronic device (e.g., the second electronic device 204 in FIG. 2 or FIG. 4) starts receiving the first data.

According to an embodiment of the disclosure, the at least one processor (e.g. the processor 410 in FIG. 4) may be configured to transmit, to the other external electronic device (e.g., the electronic device 101 in FIG. 1 or the external electronic device 201 in FIG. 2, FIG. 3, or FIG. 4) via the communication circuit (e.g., the communication circuit 420 in FIG. 4), the received first data together with second data transmitted from the electronic device (e.g., the second electronic device 204 in FIG. 2 or FIG. 4) to the other external electronic device (e.g., the electronic device 101 in FIG. 1 or the external electronic device 201 in FIG. 2, FIG. 3, or FIG. 4). According to an embodiment of the disclosure, the at least one processor (e.g. the processor 410 in FIG. 4) may be further configured to receive, via the communication circuit (e.g., the communication circuit 420 in FIG. 4) from the external electronic device (e.g., the first electronic device 202 in FIG. 2 or FIG. 4), a request for the electronic device (e.g., the second electronic device 204 in FIG. 2 or FIG. 4) to stop receiving the first data, and in response to the request to stop receiving the first data, stop receiving the first data.

According to an embodiment of the disclosure, the request to stop receiving the first data may be received if a quality of the communication link is greater than or equal to threshold quality.

According to an embodiment of the disclosure, the request to stop receiving the first data may include information about a time point at which the electronic device (e.g., the second electronic device 204 in FIG. 2 or FIG. 4) stops receiving the first data.

According to an embodiment of the disclosure, a time period in which the electronic device (e.g., the second electronic device 204 in FIG. 2 or FIG. 4) receives the request from the external electronic device (e.g., the first electronic device 202 in FIG. 2 or FIG. 4) may precede a time period in which the electronic device (e.g., the second electronic device 204 in FIG. 2 or FIG. 4) transmits, to the other external electronic device (e.g., the electronic device 101 in FIG. 1 or the external electronic device 201 in FIG. 2, FIG. 3, or FIG. 4), the received first data instead of the external electronic device (e.g., the first electronic device 202 in FIG. 2 or FIG. 4).

According to an embodiment of the disclosure, an electronic device (e.g., a second electronic device 204 in FIG. 2 or FIG. 4) may include a communication circuit (e.g., a communication circuit 420 in FIG. 4), and at least one processor (e.g., a processor 410 in FIG. 4) operatively connected to the communication circuit (e.g., the communication circuit 420 in FIG. 4).

According to an embodiment of the disclosure, the at least one processor (e.g., the processor 410 in FIG. 4) may be configured to transmit, to an external electronic device (e.g., a first electronic device 202 in FIG. 2 or FIG. 4) via the communication circuit (e.g., the communication circuit 420 in FIG. 4), information associated with a communication link established between the electronic device (e.g., the second electronic device 204 in FIG. 2 or FIG. 4) and another external electronic device (e.g., an electronic device 101 in FIG. 1, or an external electronic device 201 in FIG. 2, FIG. 3, or FIG. 4), identify that quality of the communication link is less than threshold quality.

According to an embodiment of the disclosure, the at least one processor (e.g., the processor 410 in FIG. 4) may be further configured to in response to identifying that the quality of the communication link is less than the threshold quality, transmit, to the external electronic device (e.g., the first electronic device 202 in FIG. 2 or FIG. 4) via the communication circuit (e.g., the communication circuit 420 in FIG. 4), a request that the external electronic device (e.g., the first electronic device 202 in FIG. 2 or FIG. 4) receive first data transmitted from the electronic device (e.g., the second electronic device 204 in FIG. 2 or FIG. 4) to the other external electronic device (e.g., the electronic device 101 in FIG. 1, or the external electronic device 201 in FIG. 2, FIG. 3, or FIG. 4) to transmit, to the other external electronic device (e.g., the electronic device 101 in FIG. 1, or the external electronic device 201 in FIG. 2, FIG. 3, or FIG. 4), the first data instead of the electronic device (e.g., the second electronic device 204 in FIG. 2 or FIG. 4).

According to an embodiment of the disclosure, the at least one processor (e.g., the processor 410 in FIG. 4) may be further configured to transmit the first data to the other external electronic device (e.g., the electronic device 101 in FIG. 1, or the external electronic device 201 in FIG. 2, FIG. 3, or FIG. 4) via the communication circuit (e.g., the communication circuit 420 in FIG. 4).

According to an embodiment of the disclosure, the at least one processor (e.g., the processor 410 in FIG. 4) may be configured to identify that the quality of the communication link is less than the threshold quality based on at least one of a noise level, a bit error rate (BER), a packet error rate (PER), packet retransmission time, a number of transmitted packets in each unit time, or a retransmission ratio.

According to an embodiment of the disclosure, the request may include information about a time point at which the external electronic device (e.g., the first electronic device 202 in FIG. 2 or FIG. 4) starts receiving the first data.

According to an embodiment of the disclosure, the at least one processor (e.g., the processor 410 in FIG. 4) may be further configured to identify that the quality of the communication link is greater than or equal to the threshold quality, and in response to identifying that the quality of the communication link is greater than or equal to the threshold quality, transmit, to the external electronic device (e.g., the first electronic device 202 in FIG. 2 or FIG. 4) via the communication circuit (e.g., the communication circuit 420 in FIG. 4), a request for the external electronic device (e.g., the first electronic device 202 in FIG. 2 or FIG. 4) to stop receiving the first data.

According to an embodiment of the disclosure, the request to stop receiving the first data may include information about a time point at which the external electronic device (e.g., the first electronic device 202 in FIG. 2 or FIG. 4) stops receiving the first data.

According to an embodiment of the disclosure, an electronic device (e.g., an electronic device 101 in FIG. 1, or an external electronic device 201 in FIG. 2, FIG. 3, or FIG. 4) may include a communication circuit (e.g., a communication module 190 in FIG. 1 or a communication circuit 302 in FIG. 3), and at least one processor (e.g., a processor 120 in FIG. 1 or a processor 304 in FIG. 3) operatively connected to the communication circuit (e.g., the communication module 190 in FIG. 1 or the communication circuit 302 in FIG. 3).

According to an embodiment of the disclosure, the at least one processor (e.g., the processor 120 in FIG. 1 or the processor 304 in FIG. 3) may be configured to identify that quality of a communication link established between the electronic device (e.g., the electronic device 101 in FIG. 1, or the external electronic device 201 in FIG. 2, FIG. 3, or FIG. 4) and an external electronic device (e.g., a first electronic device 202 in FIG. 2 or FIG. 4) is less than threshold quality.

According to an embodiment of the disclosure, the at least one processor (e.g., the processor 120 in FIG. 1 or the processor 304 in FIG. 3) may be further configured to, in response to identifying that the quality of the communication link is less than the threshold quality, transmit, to another external electronic device (e.g., a second electronic device 204 in FIG. 2 or FIG. 4) via the communication circuit (e.g., the communication module 190 in FIG. 1 or the communication circuit 302 in FIG. 3), a request that the other external electronic device (e.g., the second electronic device 204 in FIG. 2 or FIG. 4) transmit, to the electronic device (e.g., the electronic device 101 in FIG. 1, or the external electronic device 201 in FIG. 2, FIG. 3, or FIG. 4), first data transmitted from the external electronic device (e.g., the first electronic device 202 in FIG. 2 or FIG. 4) to the electronic device (e.g., the electronic device 101 in FIG. 1, or the external electronic device 201 in FIG. 2, FIG. 3, or FIG. 4) instead of the external electronic device (e.g., the first electronic device 202 in FIG. 2 or FIG. 4).

According to an embodiment of the disclosure, the at least one processor (e.g., the processor 120 in FIG. 1 or the processor 304 in FIG. 3) may be further configured to receive, from the other external electronic device (e.g., the second electronic device 204 in FIG. 2 or FIG. 4) via the communication circuit (e.g., the communication module 190 in FIG. 1 or the communication circuit 302 in FIG. 3), the first data received by the other external electronic device (e.g., the second electronic device 204 in FIG. 2 or FIG. 4).

According to an embodiment of the disclosure, the at least one processor (e.g., the processor 120 in FIG. 1 or the processor 304 in FIG. 3) may be configured to identify that the quality of the communication link is less than the threshold quality based on at least one of a noise level, a bit error rate (BER), a packet error rate (PER), packet retransmission time, a number of transmitted packets in each unit time, or a retransmission ratio.

According to an embodiment of the disclosure, the request may include information about a time point at which the other external electronic device (e.g., the second electronic device 204 in FIG. 2 or FIG. 4) starts receiving the first data.

According to an embodiment of the disclosure, the at least one processor (e.g., the processor 120 in FIG. 1 or the processor 304 in FIG. 3) may be further configured to identify that the quality of the communication link is greater than or equal to the threshold quality, and in response to identifying that the quality of the communication link is greater than or equal to the threshold quality, transmit, to the other external electronic device (e.g., the second electronic device 204 in FIG. 2 or FIG. 4) via the communication circuit (e.g., the communication module 190 in FIG. 1 or the communication circuit 302 in FIG. 3), a request for the other external electronic device (e.g., the second electronic device 204 in FIG. 2 or FIG. 4) to stop receiving the first data.

According to an embodiment of the disclosure, the request to stop receiving the first data may include information about a time point at which the other external electronic device (e.g., the second electronic device 204 in FIG. 2 or FIG. 4) stops receiving the first data.

According to an embodiment of the disclosure, the at least one processor (e.g., the processor 120 in FIG. 1 or the processor 304 in FIG. 3) may be configured to receive, from the other external electronic device (e.g., the second electronic device 204 in FIG. 2 or FIG. 4) via the communication circuit (e.g., the communication module 190 in FIG. 1 or the communication circuit 302 in FIG. 3), the received first data and second data transmitted from the other external electronic device (e.g., the second electronic device 204 in FIG. 2 or FIG. 4) to the electronic device (e.g., the electronic device 101 in FIG. 1, or the external electronic device 201 in FIG. 2, FIG. 3, or FIG. 4) together.

According to an embodiment of the disclosure, a time period in which the electronic device (e.g., the electronic device 101 in FIG. 1, or the external electronic device 201 in FIG. 2, FIG. 3, or FIG. 4) transmits the request to the other external electronic device (e.g., the second electronic device 204 in FIG. 2 or FIG. 4) may precede a time period in which the electronic device (e.g., the electronic device 101 in FIG. 1, or the external electronic device 201 in FIG. 2, FIG. 3, or FIG. 4) receives the first data received by the other external electronic device (e.g., the second electronic device 204 in FIG. 2 or FIG. 4) from the other external electronic device (e.g., the second electronic device 204 in FIG. 2 or FIG. 4).

A Bluetooth scheme may include, for example, a Bluetooth legacy (or Bluetooth classic) scheme or a Bluetooth low energy (BLE) scheme. Each of electronic devices (e.g., a first electronic device 202 and a second electronic device 204 in FIG. 2 or FIG. 4) using a BLE audio (audio over BLE, referred to as "AoBLE") service (e.g., a binaural recording service) of the BLE scheme may independently establish a connection (e.g., a communication link) with an external electronic device (e.g., an electronic device 101 in FIG. 1 or an external electronic device 201 in FIG. 2, FIG. 3, or FIG. 4), and transmit and receive data to and from the external electronic device through the established connection.

If a binaural recording service is provided, each of a first electronic device and a second electronic device may transmit, to an external electronic device, audio data inputted via a microphone of each of the first electronic device and the second electronic device. Each of the first electronic device and the second electronic device may transmit and receive audio data to and from the external electronic device through a communication link established based on a BLE scheme.

In a Bluetooth scheme including a BLE scheme, according to a characteristic thereof, a communication between electronic devices may not be smooth due to a weak electric field environment due to ambient interference, a physical obstacle existing between the electronic devices, or a physical distance between the electronic devices. For example, in a case of an AoBLE service provided in the BLE scheme, a time period during which retransmission is possible is predetermined, and the AoBLE service may be vulnerable to ambient interference and a weak field environment due to a characteristic of a scheme in which a first electronic device and a second electronic device transmit, to an external electronic device, different media data, e.g., audio data. Due to the characteristic vulnerable to the ambient interference and the weak electric field environment, there may be a high probability that a sound quality degradation issue due to loss of a media packet (e.g., an audio packet) occurs in the AoBLE service. If the audio packet is lost, a retransmission operation for the lost audio packet may be performed in the predetermined time period during which retransmission is possible. As the time period during which retransmission is possible becomes longer, opportunities for performing a retransmission operation may increase, and this may increase a probability of completion of transmission of an audio packet. However, current consumption is inevitably increased due to the retransmission operation, so an embodiment of the disclosure may provide a scheme of stably transmitting an audio packet while reducing (e.g., minimizing) the retransmission operation. In the disclosure, an embodiment will be described using a binaural recording service as an example, but the disclosure may be applied to all coordinated communication services which a first electronic device, a second electronic device, and an external electronic device may provide in cooperation with one other as well as the binaural recording service.

Figure 5:
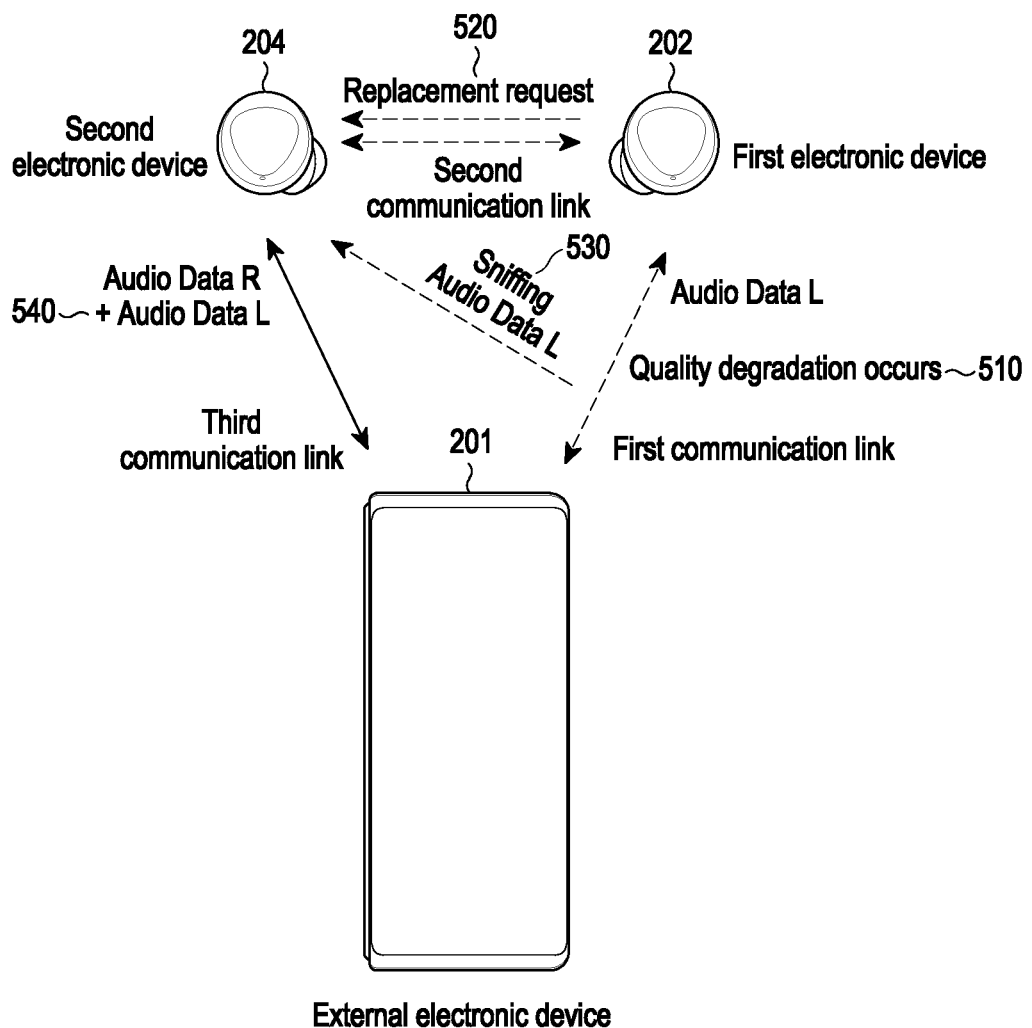
FIG. 5 is a diagram schematically illustrating an example of an operation of providing an audio service in a wireless communication network according to an embodiment.

FIG. 5 is a diagram schematically illustrating an example of an operation of providing an audio service in a wireless communication network according to an embodiment.

Referring to FIG. 5, a wireless communication network may include a first electronic device 202 (e.g., a first electronic device 202 in FIG. 2 or FIG. 4), a second electronic device 204 (e.g., a second electronic device 204 in FIG. 2), and an external electronic device 101 (e.g., an electronic device 101 in FIG. 1, or an external electronic device 201 in FIG. 2, FIG. 3, or FIG. 4). In an embodiment, an audio service may be a binaural recording service which is an AoBLE service. In FIG. 5, the first electronic device 202 and the second electronic device 204 may be included in an electronic device (e.g., an electronic device 102 in FIG. 1 or FIG. 2). In an embodiment, the electronic device may be wiredly and/or wirelessly connected to a third electronic device (e.g., a third electronic device 300 in FIG. 2 or FIG. 3).

Each of the first electronic device 202 and the second electronic device 204 may be connected to the external electronic device 201 based on a BLE scheme. The first electronic device 202 and the second electronic device 204 may be connected to each other based on the BLE scheme or a Bluetooth legacy scheme. A communication link established between the first electronic device 202 and the external electronic device 201 may be a first communication link, a communication link established between the second electronic device 204 and the external electronic device 201 may be a third communication link, and a communication link established between the first electronic device 202 and the second electronic device 204 may be a second communication link.

An operation in which the first electronic device 202 and the external electronic device 201 establish the first communication link, an operation in which the second electronic device 204 and the external electronic device 201 establish the third communication link, and an operation in which the first electronic device 202 and the second electronic device 204 establish the second communication link will be described with reference to FIG. 6, FIG. 8, and FIG. 9, respectively, and a detailed description thereof will be omitted herein.

In a state in which the first communication link is established between the external electronic device 201 and the first electronic device 202, the third communication link is established between the external electronic device 201 and the second electronic device 204, and the second communication link is established between the first electronic device and the second electronic device 204, the external electronic device 201, the first electronic device 202, and the second electronic device 204 may perform (e.g., provide) an audio service (e.g., a binaural recording service).

While the external electronic device 201, the first electronic device 202, and the second electronic device 204 provide the binaural recording service, quality of the first communication link or the third communication link may be lower than threshold quality.

In an embodiment, quality of a communication link may be determined based on channel quality, and the channel quality may be represented by at least one of a noise level, a bit error rate (BER), a packet error rate (PER), packet retransmission time, the number of transmission packets per unit time, and/or a retransmission rate. In an embodiment, the channel quality may be detected per channel, and the channel quality may be detected per channel based on at least one of the noise level, the BER, the PER, the packet retransmission time, the number of transmission packets per unit time, or the retransmission ratio. For example, the quality of the communication link may be less than threshold quality if at least one of a case that the noise level exceeds a threshold noise level, a case that the BER exceeds a threshold BER, a case that the PER exceeds a threshold PER, a case that the packet retransmission time exceeds threshold packet retransmission time, a case that the number of transmission packets per unit time is less than the threshold number of transmission packets per unit time, and/or a case that the retransmission rate exceeds a threshold retransmission rate occurs. If, for example, the quality of the communication link is less than the threshold quality, a radio link failure (RLF) may occur in the communication link. In an embodiment, the RLF may denote a state in which data may not be normally transmitted and received through the communication link (e.g., a wireless link).

In an embodiment, the quality of the communication link may be greater than or equal to the threshold quality if at least one of a case that the noise level is less than or equal to the threshold noise level, a case that the BER is less than or equal to the threshold BER, a case that the PER is less than or equal to the threshold PER, a case that the packet retransmission time is shorter than or equal to the threshold packet retransmission time, a case that the number of transmission packets per unit time is greater than or equal to the threshold number of transmission packets per unit time, and/or a case that the retransmission rate is less than or equal to the threshold retransmission rate occurs. For example, if an RLF does not occur for set time after the RLF occurs in the communication link, the communication link may be recovered. For example, in a communication link in which an RLF has occurred, the communication link may be recovered if a quality of the communication link is greater than or equal to a threshold quality.

According to an embodiment, a case in which the channel quality is represented by the at least one of the noise level, the BER, the PER, the packet retransmission time, the number of transmission packets per unit time, or the retransmission ratio has been described as an example, but the channel quality is not limited to the at least one of the noise level, the BER, the PER, the packet retransmission time, the number of transmission packets per unit time, or the retransmission ratio. Although an expression "Quality of a communication link is less than threshold quality" is used in the disclosure, the expression that the quality of the communication link is less than the threshold quality may be used interchangeably with an expression that degradation occurs in the communication link.

In an embodiment, while the external electronic device 201, the first electronic device 202, and the second electronic device 204 provide the binaural recording service, a battery level of the first electronic device 202 and/or the second electronic device 204 may be less than a threshold battery level. In the disclosure, an operation when the battery level of the first electronic device 202 and/or the second electronic device 204 is less than the threshold battery level may be implemented similarly to or substantially the same as an operation when quality of the first communication link and/or the third communication link is less than the threshold quality.

In an embodiment, while the external electronic device 201, the first electronic device 202, and the second electronic device 204 provide the binaural recording service, the first electronic device 202 and/or the second electronic device 204 having a battery level lower than the threshold battery level may be charged, and the battery level of the first electronic device 202 and/or the second electronic device 204 may be higher than or equal to the threshold battery level according to the charging. In the disclosure, an operation when the battery level of the first electronic device 202 and/or the second electronic device 204 which is lower than the threshold battery level becomes higher than or equal to the threshold battery level again may be implemented similarly to or substantially the same as the operation when the quality of the first communication link and/or the third communication link is greater than or equal to the threshold quality.

In FIG. 5, it will be assumed that the quality of the first communication link established between the external electronic device 201 and the first electronic device 202 is less than the threshold quality (510). In an embodiment, a role of the first electronic device 202 is a first audio channel (e.g., a left audio channel) role, so audio data (e.g., audio data L) of the left audio channel may be transmitted through the first communication link. In an embodiment, a role of the second electronic device 204 is a second audio channel (e.g., a right audio channel) role, so audio data (e.g., audio data R) of the right audio channel may be transmitted through the third communication link. Upon identifying that the quality of the first communication link is less than the threshold quality, the first electronic device 202 may transmit (520), to the second electronic device 204, a request for the second electronic device 204 to receive (e.g., "sniff") data (e.g., audio data) which is transmitted from the first electronic device 202 to the external electronic device 201 to transmit the data to the external electronic device 201 instead of the first electronic device 202. In an embodiment, the request for the second electronic device 204 to transmit the data to the external electronic device 201 instead of the first electronic device 202 may be a request for the second electronic device 204 to receive (e.g., sniff) the data transmitted from the first electronic device 202 to transmit the data instead of the first electronic device 202 due to a relatively high probability that the external electronic device 201 may not receive the data transmitted from the first electronic device 202 because the quality of the first communication link between the first electronic device 202 and the external electronic device 201 is less than the threshold quality. In an embodiment, the request for the second electronic device 204 to transmit the data to the external electronic device 201 instead of the first electronic device 202 may be a request related to non-reception of the data in the external electronic device 201 due to the relatively high probability that the external electronic device 201 may not receive the data transmitted from the first electronic device 202 because the quality of the first communication link between the first electronic device 202 and the external electronic device 201 is less than the threshold quality. In an embodiment, the request for the second electronic device 204 to transmit the data to the external electronic device 201 instead of the first electronic device 202 may be a request for the second electronic device 204 to receive (e.g., sniff) the data (e.g., the audio data) transmitted from the first electronic device 202 to the external electronic device 201 through the first communication link based on information (e.g., a replacement request packet) related to the first communication link upon receiving the information related to the first communication link from the first electronic device 202 to transmit the received data to the external electronic device 201 through the third communication link. For example, the request for the second electronic device 204 to transmit the data to the external electronic device 201 instead of the first electronic device 202 may be implemented with the replacement request packet. In an embodiment, the replacement request packet may be a packet requesting to perform a replacement operation.

In an embodiment, the replacement operation may represent an operation in which an electronic device C sniffs data transmitted from an electronic device A to an electronic device B to transmit the data to the electronic device B according to a request of the electronic device A while at least three electronic devices (e.g., the electronic device A, the electronic device B, and the electronic device C) cooperate to provide a service (e.g., an audio service). The replacement request packet may be a packet requesting the replacement operation.

In an embodiment, if the second communication link established between the first electronic device 202 and the second electronic device 204 is a communication link established based on a BLE scheme, the replacement request packet may be implemented with a generic attribute profile (GATT) packet. In an embodiment, if the second communication link established between the first electronic device 202 and the second electronic device 204 is a communication link established based on a Bluetooth legacy scheme, the replacement request packet may be implemented with a serial port profile (SPP) packet.

In an embodiment, a format of the replacement request packet may be shown in Table 1 below.

TABLE 1

| SOM (1 byte) | Header LSB (1 byte) | Header MSB (1 byte) | Msg ID (2 byte) |
|---|---|---|---|
| 0xFD | 0x0A | 0x00 | 0xA00 |
| Replacement type (1 byte) | Next Anchor point (4 byte) | | EOM (1 byte) |
| 0x00 | 0x00 28 08 01 | | 0x DD |

In Table 1, a replacement type field may indicate a type of a corresponding packet, and if a value of the replacement type field is a first value, the replacement type field may indicate that the corresponding packet is the replacement request packet.

In Table 1, if the value of the replacement type field is the first value, a next anchor point field may indicate information about a time point at which a replacement operation starts.

If the replacement request packet does not include the next anchor point field, the second electronic device 204 may obtain a time point at which the next connected isochronous stream (CIS) event starts as the time point at which the replacement operation starts by calculating a set interval (e.g., an ISO Interval) of the first electronic device 202.

In an embodiment, upon receiving the replacement request packet, the second electronic device 204 may identify whether quality of the first communication link is equal to or greater than the threshold quality. If the quality of the first communication link is less than the threshold quality, the second electronic device 204 may not normally receive data transmitted from the first electronic device 204 to the external electronic device 201. In this case, the second electronic device 204 may transmit, to the first electronic device 204, a packet including information indicating that it is difficult (e.g., indicating that it is impossible) for the second electronic device 204 to perform the replacement operation according to the request of the first electronic device 204. In an embodiment, the quality of the first communication link which has been less than the threshold quality may be greater than or equal to the threshold quality. Upon identifying that the quality of the first communication link is equal to or greater than the threshold quality, the first electronic device 202 may transmit, to the second electronic device 204, a request for the second electronic device 204 to stop sniffing the data transmitted from the first electronic device 202 to the external electronic device 201 instead of the first electronic device 202. In an embodiment, the request to stop sniffing the data transmitted from the first electronic device 202 to the external electronic device 201 may be a request to stop sniffing the data transmitted from the first electronic device 202 in order for the second electronic device 204 to transmit the data to the external electronic device 201 instead of the first electronic device 202 due to a relatively high probability that the external electronic device 201 may receive the data transmitted from the first electronic device 202 because the quality of the first communication link between the first electronic device 202 and the external electronic device 201 is greater than or equal to the threshold quality. For example, the request to stop sniffing the data transmitted from the first electronic device 202 to the external electronic device 201 may be implemented as a replacement release packet. In an embodiment, the replacement release packet may be a packet requesting to stop the replacement operation.

In an embodiment, an example of a format of the replacement release packet may also be as shown in Table 1. However, if the value of the replacement type field is a second value, the replacement type field may indicate that the corresponding packet is the replacement release packet. In an embodiment, the replacement release packet may be a signal requesting to stop an operation in which the second electronic device transmits, to the external electronic device 201, the data transmitted from the first electronic device 202 to the external electronic device 201, and which has been performed according to the replacement request packet. In an embodiment, the replacement release packet may be a packet requesting to release the replacement operation.

In Table 1, the next anchor point field may indicate information about a time point at which the replacement operation is released if the value of the replacement type field is the second value. If the replacement release packet does not include the next anchor point field, the second electronic device 204 may obtain a time point at which the next CIS event starts as the time point at which the replacement operation is released by calculating the ISO Interval of the first electronic device 202.

Upon receiving the replacement request packet from the first electronic device 202, the second electronic device 204 may receive (e.g., may sniff) data (e.g., audio data) transmitted from the first electronic device 202 to the external electronic device 201 (530). In an embodiment, upon receiving the replacement request packet from the first electronic device 202, the second electronic device 204 may obtain information about a time point at which a replacement operation starts based on a value of a next anchor point included in the replacement request packet. If the next anchor point field is not included in the replacement request packet, the second electronic device 204 may obtain a time point at which the next CIS event starts as the time point at which the replacement operation starts by calculating an ISO Interval of the first electronic device 202. The replacement request packet may be implemented similarly to that described in Table 1, so a detailed description of the replacement request packet will be omitted. The second electronic device 204 may start the replacement operation at the obtained time point at which the replacement operation starts. In an embodiment, the second electronic device 204 may receive the data (e.g., the audio data) transmitted from the first electronic device 202 to the external electronic device 201 at the time point at which the replacement operation starts (530).

Upon receiving the data (e.g., first data) transmitted from the first electronic device 202 to the external electronic device 201 according to reception of the replacement request packet, the second electronic device 204 may transmit the first data through the third communication link established between the second electronic device 204 and the external electronic device 201 (540). In an embodiment, the second electronic device 204 may transmit, to the external electronic device 201, the first data based on a set transmission scheme (e.g., a concatenation scheme, a mixing scheme, and/or an independent scheme), and the external electronic device 201 may receive the first data even if the quality of the first communication link between the external electronic device 201 and the first electronic device 202 is less than the threshold quality. The concatenated scheme, the mixing scheme, and/or the independent scheme will be described with reference to FIGS. 12A to 12C, so a detailed description thereof will be omitted herein.

Figure 6:
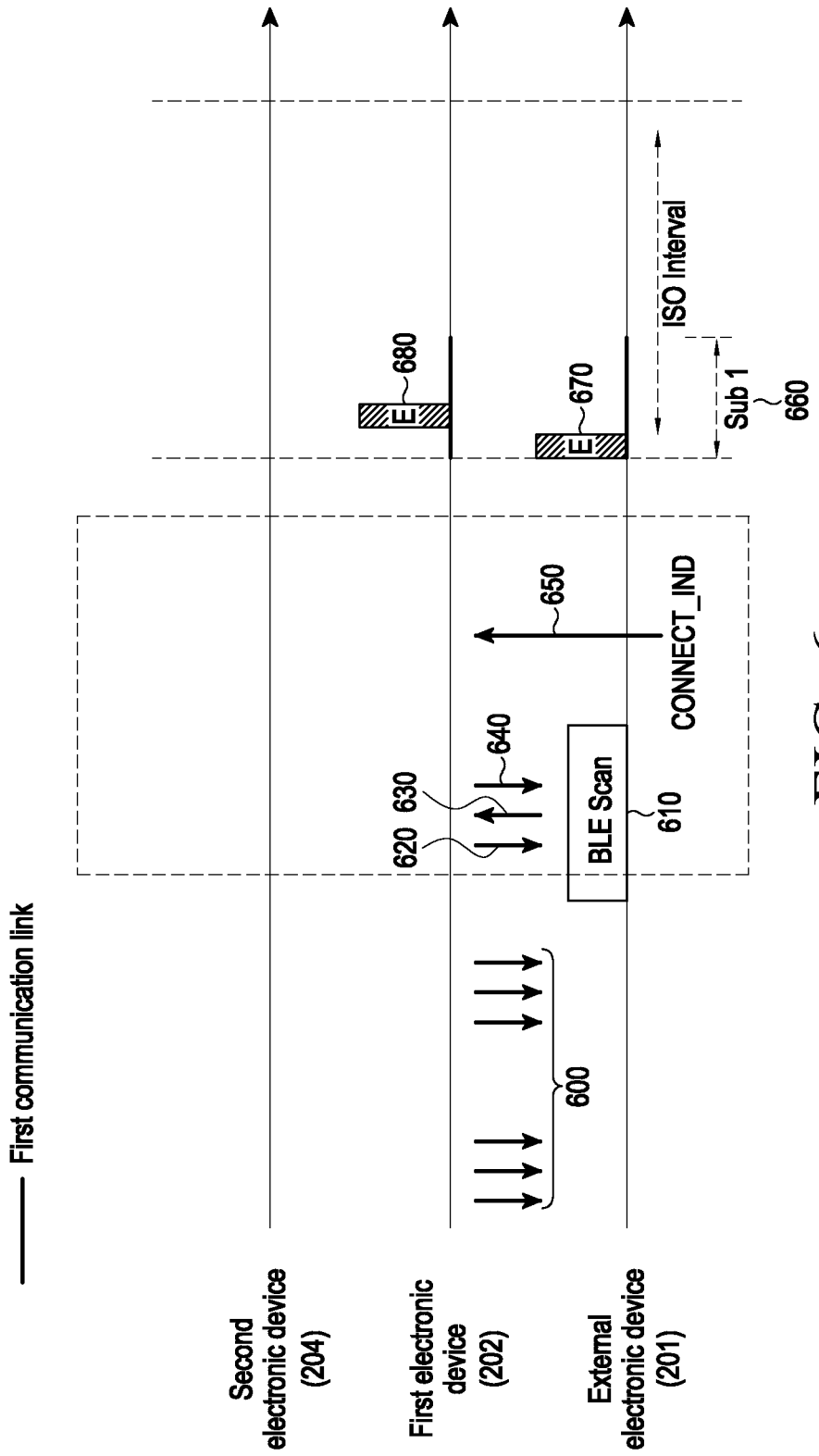
FIG. 6 is a diagram schematically illustrating an example of an operation in which a first electronic device and an external electronic device establish a first communication link in a wireless communication network according to an embodiment.

FIG. 6 is a diagram schematically illustrating an example of an operation in which a first electronic device and an external electronic device establish a first communication link in a wireless communication network according to an embodiment.

Referring to FIG. 6, a structure of a wireless communication network may be implemented similarly to a structure of a wireless communication network described in FIG. 5, so a detailed description thereof will be omitted. An external electronic device 201 (e.g., an electronic device 101 in FIG. 1, or an external electronic device 201 in FIG. 2, FIG. 3, or FIG. 4) may identify a first electronic device 202 (e.g., a first electronic device 202 in FIG. 2 or FIG. 4) based on a BLE scheme.

The first electronic device 202 may transmit a BLE advertising (BLE ADV) signal (e.g., a BLE ADV packet) in a multicast scheme or a broadcast scheme. According to an embodiment, the BLE ADV packet may be a packet for transmitting information related to a connection or an account (e.g., pairing) to unspecified neighbor external electronic devices (e.g., the external electronic device 201). For example, the first electronic device 202 may be stored in a third electronic device (e.g., a third electronic device 300 in FIG. 2 or FIG. 4) together with a second electronic device 204 (e.g., a second electronic device 204 in FIG. 2). The third electronic device may be an earbuds case device or a cradle device which stores and charges the second electronic device 204, and in FIG. 6, it will be assumed that the third electronic device is the earbuds case device for convenience of a description.

In an embodiment, the first electronic device 202 may start transmitting a BLE ADV packet if the third electronic device is opened in a state that the first electronic device 202 is stored in the third electronic device together with the second electronic device 204, or a state that only the first electronic device 202 is stored in the third electronic device. In an embodiment, the first electronic device 202 may start transmitting the BLE ADV packet if a button equipped in the third electronic device is inputted or may start periodically transmitting the BLE ADV packet in the state that the first electronic device 202 is stored in the third electronic device together with the second electronic device 204, or the state that only the first electronic device 202 is stored in the third electronic device. A period at which the BLE ADV packet is transmitted may be variable, as needed. The first electronic device 202 may transmit the BLE ADV packet based on a set period (600). In an embodiment, the BLE ADV packet may include at least one of identification information of the first electronic device 202, user account information of the first electronic device 202, information about an electronic device with which the first electronic device 202 is currently paired, information about an electronic device which has performed a pairing process with the first electronic device 202, information about electronic devices which may be paired at the same time, transmission power, a sensing area, information about a remaining battery level of the first electronic device 202, and/or audio channel role information. In an embodiment, an audio channel role of the first electronic device 202 may be a first audio channel (e.g., a left audio channel) role.

An example of a format of a BLE ADV packet in a wireless communication network according to an embodiment will be described with reference to FIG. 7.

Figure 7:
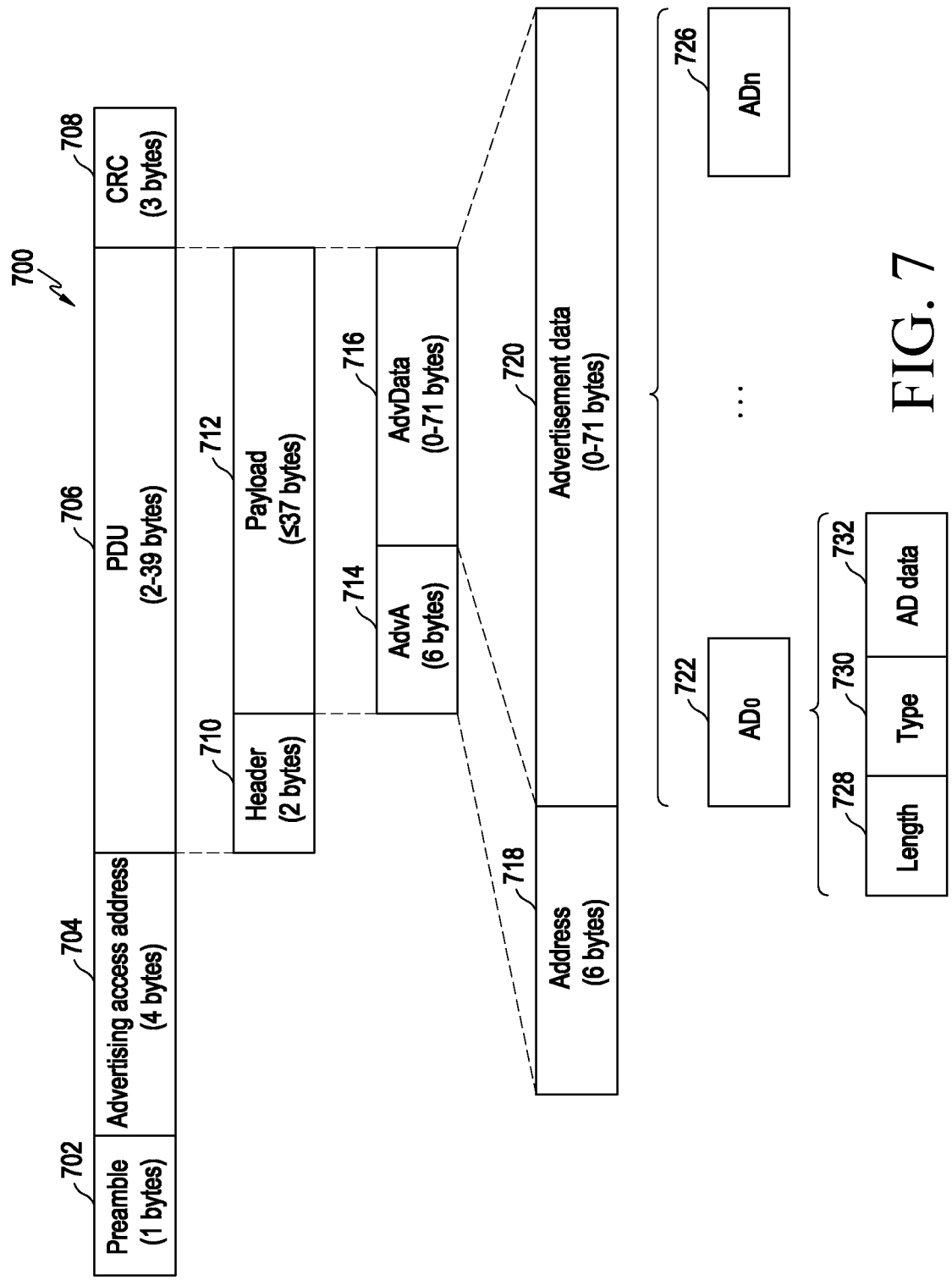
FIG. 7 is a diagram schematically illustrating an example of a format of a Bluetooth Low Energy (BLE) advertising (ADV) packet in a wireless communication network according to an embodiment.

FIG. 7 is a diagram schematically illustrating an example of a format of a BLE ADV packet in a wireless communication network according to an embodiment.

Referring to FIG. 7, a BLE ADV packet 700 may include a preamble field 702, an advertising access address field 704, a packet data unit (PDU) field 706, and a cyclic redundancy check (CRC) field 708.

In an embodiment, the preamble field 702 may include information used for an external electronic device (e.g., an electronic device 101 in FIG. 1, or an external electronic device 201 in FIG. 2, FIG. 3, or FIG. 4) which receives the BLE ADV packet 700 to perform frequency synchronization and/or symbol timing estimation. For example, the preamble field 702 may be implemented with one byte. In an embodiment, the preamble field 702 may include a fixed sequence of one byte in length comprising of alternating a bit value 0 and a bit value 1 based on address information included in the advertising access address field 704. For example, the preamble field 702 may include "10101010" if the address information included in the advertising access address field 704 starts with 1. As another example, the preamble field 702 may include "01010101" if the address information included in the advertising access address field 704 starts with 0.

In an embodiment, the advertising access address field 704 may include address information related to the BLE ADV packet. For example, the advertising access address field 704 may be implemented with 4 bytes.

In an embodiment, the PDU field 706 may have a variable length from a minimum of 2 bytes to a maximum of 39 bytes. The PDU field 706 may include a header field 710 and a payload field 712.

In an embodiment, the header field 710 may include information indicating a type and length of data included in the payload field 712. In an embodiment, the header field 710 may include information indicating that a type of the data included in the payload field 712 is advertising data. For example, the header field 710 may be implemented with 2 bytes.

In an embodiment, the payload field 712 may have a variable length of 37 bytes or less, and include an advertising address (AdvA) field 714 and an advertising data (AdvData) field 716.

In an embodiment, the AdvA field 714 may include an address 718 of an electronic device (e.g., a first electronic device 202 in FIG. 2 or FIG. 4) which transmits the BLE ADV packet 700. In an embodiment, the address 718 of the electronic device may be a medium access control (MAC) address of the electronic device. In an embodiment, the address 718 of the electronic device may be a resolvable private address (RPA). The RPA may be implemented with 48 bits. For example, the RPA may be divided into a first part (e.g., prand which is a 24-bit random part) and a second part (e.g., hash which is a 24-bit hash part). A least significant octet of the PRA may be a least significant octet of the hash, and a most significant octet of the PRA may be a most significant octet of the prand.

In an embodiment, the AdvData field 716 may include advertising data 720 of up to 31 bytes. In an embodiment, the AdvData field 716 may include at least one of identification information of the electronic device, user account information of the electronic device, information about an electronic device with which the electronic device is currently paired, information about an electronic device which has performed a pairing process with the electronic device, information about electronic devices which may be paired at the same time, transmission power, a sensing area, information about remaining battery amount of the electronic device, or audio channel role information. In an embodiment, an audio channel role of the electronic device may be a first audio channel (e.g., a left audio channel) role.

In an embodiment, the AdvData field 716 may include one or two or more advertising data (AD) elements. The one or two or more AD elements may be, for example, N AD elements including an $AD_0$ element 722 to an $AD_N$ element 726.

In an embodiment, each of the one or two or more AD elements may include a length field, a type field, and an AD data field. FIG. 7 illustrates a length field 728, a type field 730, and an AD data field 732 included in the $AD_0$ element 722. Although not shown in FIG. 7, the $AD_N$ element 726 may include a length field, a type field, and an AD data field, like the $AD_0$ element 722.

In an embodiment, the length field 728 may include length information of the AD data field 732, and the type field 730 may include type information of data included in the AD data field 732. In an embodiment, the type field 732 may include information indicating one of data types as shown in Table 2 below.

TABLE 2

| Data type | Description |
|---|---|
| Universally unique identifier (UUID) | Identifier information of a service provided by an electronic device |
| Manufacturer specific data | May include at least one of data defined by manufacturer of an electronic device or data set by an electronic device. |
| Transmit power level | Information about a transmit power level used for an electronic device to transmit a BLE ADV packet |
| Slave connection interval range | Connection interval range to be used by an external electronic device receiving a BLE ADV packet |
| Service solicitation | Information about one or two or more services for receiving through an external electronic device, and it is used for inviting the external electronic device for connection. |
| Service data | Data associated with a service provided by an electronic device (may include a service UUID) |
| Uniform resource identifier (URI) | URI associated with a service provided by an electronic device |

In an embodiment, the CRC field 708 may include information used for an external electronic device to detect an error for a received BLE ADV packet. For example, the CRC field 708 may be implemented with 3 bytes.

Referring back to FIG. 6, the first electronic device 202 may transmit a BLE ADV packet based on a set condition. In an embodiment, the set condition may include at least one of a condition in which power is supplied to the first electronic device 202, a condition in which a set period is reached, or a user input. The external electronic device 201 may perform a BLE scan operation in a set scan period (610).

As the BLE scan operation is performed, the external electronic device 201 may receive at least one BLE ADV packet 620 from among BLE ADV packets transmitted from the first electronic device 202. The external electronic device 201 receiving the BLE ADV packet 620 may display a user interface (UI) via a display module (e.g., a display module 160 in FIG. 1). The external electronic device 201 may display the UI via the display module based on information included in the received BLE ADV packet 620 and the set condition. In an embodiment, the UI may include an image corresponding to the first electronic device 202. In an embodiment, the UI may include device recognition information, and the device recognition information may be information generated according to a result of the external electronic device 201 recognizing the first electronic device 202. For example, the external electronic device 201 may recognize that the first electronic device 202 is Samsung Galaxy buds, and may generate information related to the Samsung Galaxy buds as the device recognition information. The generated device recognition information may be included in the UI, and the UI including the device recognition information may be displayed via the display module. An example of the UI displayed via the display module of the external electronic device 201 may be as shown in FIG. 20.

Figure 20:
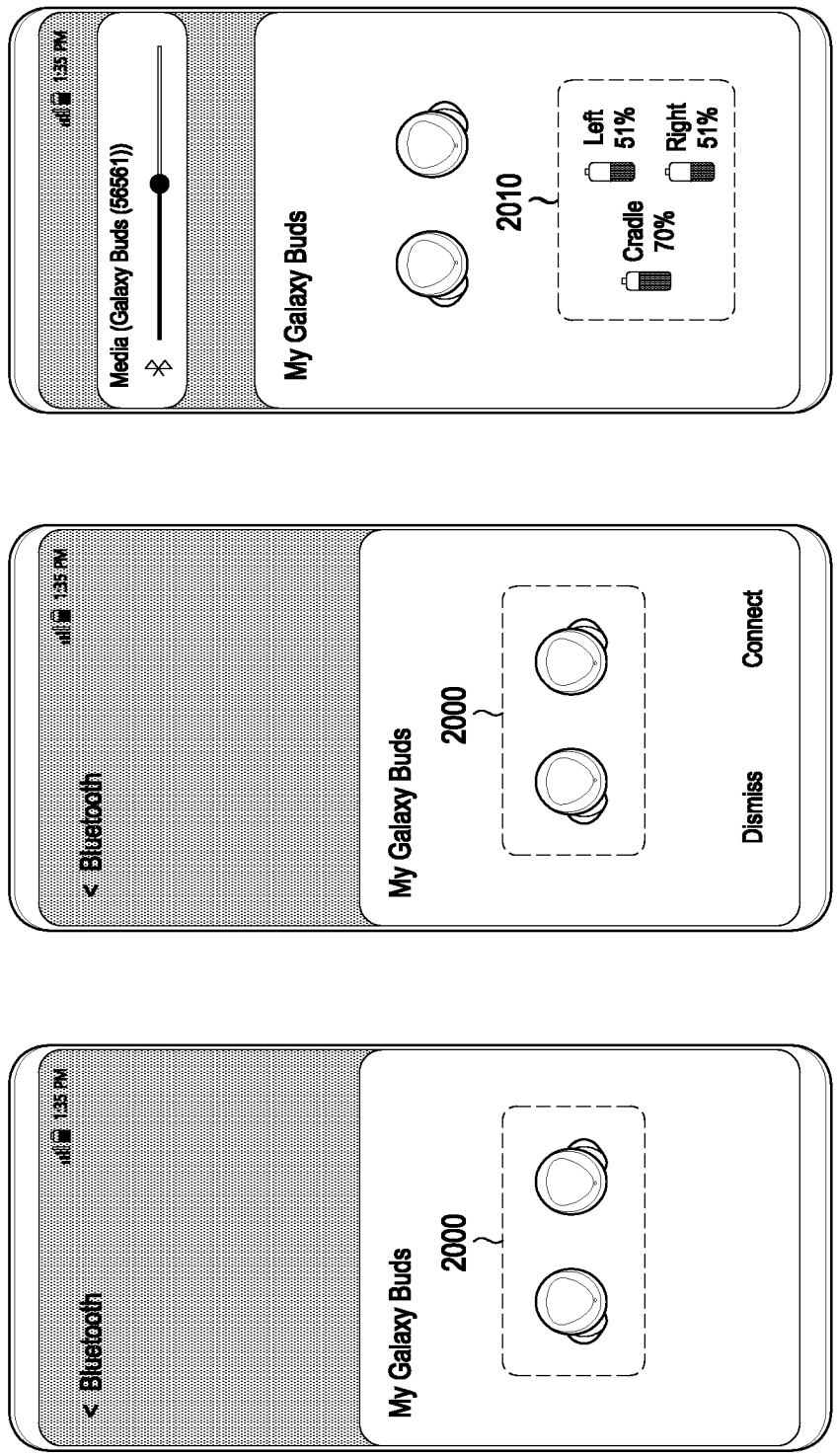
FIG. 20 is a diagram illustrating an example of a UI displayed on an external electronic device in a case that the external electronic device receives a BLE ADV packet in a wireless communication network according to an embodiment.

FIG. 20 is a diagram illustrating an example of a UI displayed on an external electronic device in a case that the external electronic device receives a BLE ADV packet in a wireless communication network according to an embodiment.

Referring to FIG. 20, upon receiving a BLE ADV packet from a first electronic device (e.g., a first electronic device in FIG. 2 or FIG. 4), an external electronic device (e.g., an electronic device 101 in FIG. 1, or an external electronic device 201 in FIG. 2, FIG. 3, or FIG. 4) may display a UI via a display module (e.g., a display module 160 in FIG. 1). The external electronic device may display the UI via the display module based on information included in the received BLE ADV packet and a set condition. In an embodiment, the UI may include device recognition information, and the device recognition information may be information generated according to a result of the external electronic device recognizing the first electronic device. For example, the external electronic device may recognize that the first electronic device is Samsung Galaxy buds, and may generate information related to the Samsung Galaxy buds as the device recognition information. In an embodiment, the device recognition information may indicate whether the external electronic device has been previously paired with the first electronic device, or may be generated based on a user account of the first electronic device.

For example, the external electronic device may recognize the first electronic device by receiving the BLE ADV packet from the first electronic device, and output the UI for informing a user of the recognized first electronic device via the display of the external electronic device. For example, the first electronic device and a second electronic device (e.g., a second electronic device 204 in FIG. 2 or FIG. 4) may compose a pair, and the external electronic device may recognize the first electronic device and the second electronic device as one electronic device (e.g., an ear wearable device (e.g., an electronic device 102 in FIG. 1)). In an embodiment, the UI may include at least one of an image 2000 indicating a shape of the first electronic device and the second electronic device or a text indicating a name (e.g., My Galaxy Buds) of the first electronic device and the second electronic device. In an embodiment, the UI may further include an image 2010 indicating a battery state of the first electronic device and the second electronic device.

Referring back to FIG. 6, the external electronic device 201 receiving the BLE ADV packet 620 may generate a scan request (SCAN_REQ) packet 630 based on information included in the BLE ADV packet, and transmit the generated SCAN_REQ packet 630 to the first electronic device 202. Upon receiving the SCAN_REQ packet 630 from the external electronic device 201, the first electronic device 202 may generate a scan response (SCAN_RSP) packet 640 as a response packet to the SCAN_REQ packet 630 based on information included in the SCAN_REQ packet 630, and transmit the generated SCAN_RSP packet 640 to the external electronic device 201.

Upon receiving the SCAN_RSP packet 640 from the first electronic device 202, the external electronic device 201 may determine whether it is required to establish a connection with the first electronic device 202 based on information included in the SCAN_RSP packet 640. Upon determining that it is required to establish the connection with the first electronic device 202, the external electronic device 201 may transmit, to the first electronic device 202, a connection indication (CONNECT_IND) packet 650 requesting to establish a connection. In an embodiment, the CONNECT_IND packet 650 may include at least one of an access address (AA), a coding indicator (CI), a transmit window offset, and/or a transmit window of the external electronic device 201. FIG. 6 illustrates a case in which the external electronic device 201 performs a BLE scan operation based on an active scan scheme, and when the external electronic device 201 performs a passive scan operation, the operation of transmitting and receiving the SCAN_REQ packet 630 and the SCAN_RSP packet 640 performed between the external electronic device 201 and the first electronic device 202 may be omitted.

Upon receiving the CONNECT_IND packet 650 from the external electronic device 201, the first electronic device 202 may determine whether to establish a connection with the external electronic device 201 based on information included in the CONNECT_IND packet 650. Upon determining to establish the connection with the external electronic device 201, the first electronic device 202 may establish the connection (e.g., the first communication link) with the external electronic device 201. In an embodiment, the external electronic device 201 which transmits the CONNECT_IND packet 650 may operate as a central, and the first electronic device 202 which receives the CONNECT_IND packet 650 may operate as a peripheral.

In an embodiment, the connection between the first electronic device 202 and the external electronic device 201 may be an isochronous connection. The external electronic device 201 may establish, using an asynchronous connection-oriented logical transport (ACL) connection, at least one isochronous connection which uses an isochronous physical channel. The isochronous connection may be used to transfer isochronous data between the external electronic device 201 and the first electronic device 202 using a logic transport called a connected isochronous stream (CIS). In an embodiment, the CIS may include CIS events occurring at a set interval (e.g., an ISO interval), and each of the CIS events may include at least one sub-event. In each sub-event, the external electronic device 201 may perform a transmission operation once, and the first electronic device 202 may respond. If the external electronic device 201 and the first electronic device 202 finish transferring isochronous data scheduled in a CIS event, all remaining sub-events in the CIS event will have no more wireless transmissions, and the CIS event may be terminated. A case in which the external electronic device 201 transmits a packet in a first sub-event (sub 1) 660 (670), and the first electronic device 202 transmits a packet in the first sub-event 660 (680) is shown in FIG. 6. For example, in the first sub-event 660, each of the external electronic device 201 and the first electronic device 202 may transmit an empty (E) packet. According to an embodiment, each of the external electronic device 201 and the first electronic device 202 may identify whether the connection established between the external electronic device 201 and the first electronic device 202 is normally maintained by transmitting the E packet.

Figure 8:
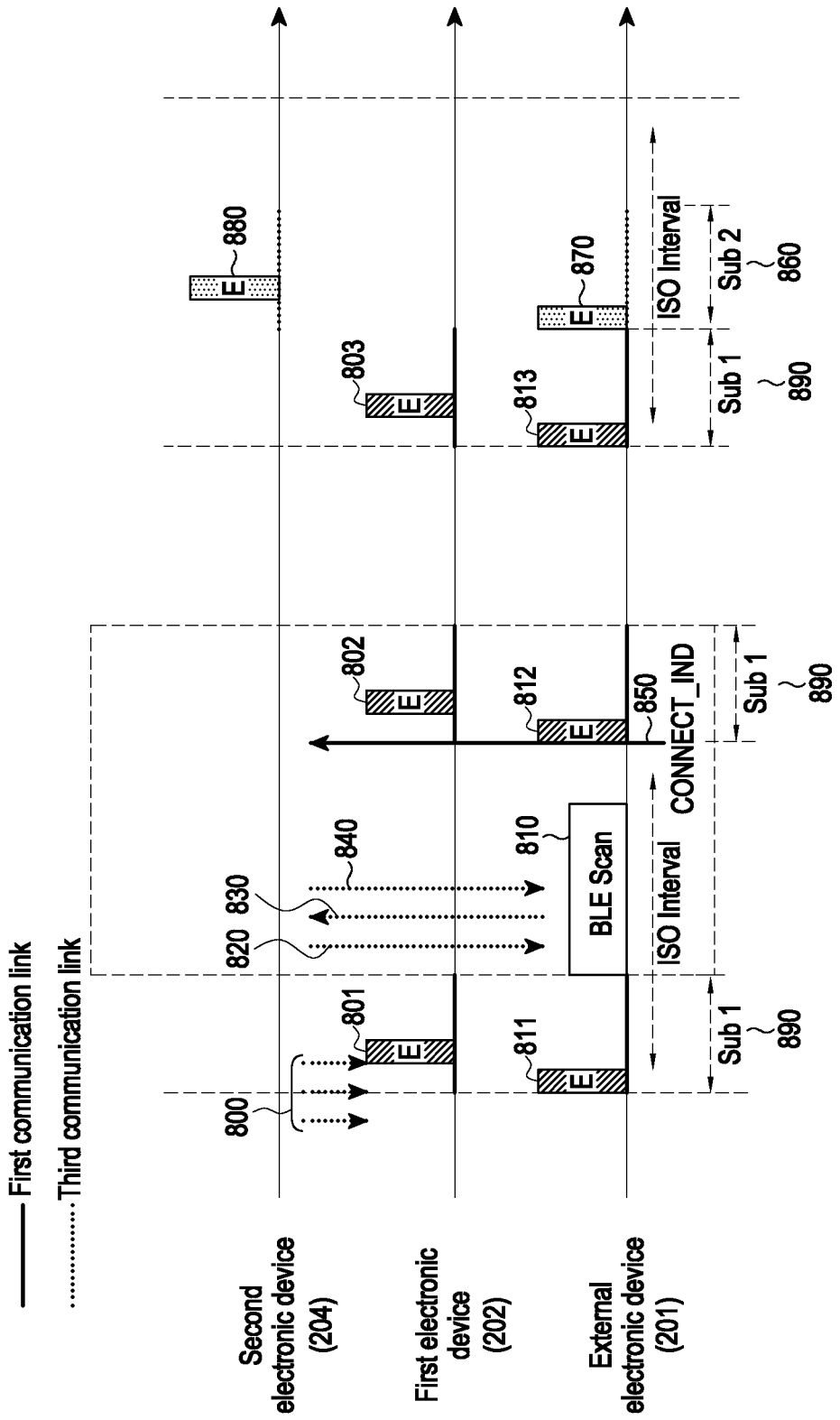
FIG. 8 is a diagram schematically illustrating an example of an operation in which a second electronic device and an external electronic device establish a third communication link in a wireless communication network according to an embodiment.

FIG. 8 is a diagram schematically illustrating an example of an operation in which a second electronic device and an external electronic device establish a third communication link in a wireless communication network according to an embodiment.

Referring to FIG. 8, a structure of a wireless communication network may be implemented similarly to a structure of a wireless communication network described in FIG. 5, so a detailed description thereof will be omitted. An external electronic device 201 (e.g., an electronic device 101 in FIG. 1, or an external electronic device 201 in FIG. 2, FIG. 3, or FIG. 4) may identify a second electronic device 204 (e.g., a second electronic device 204 in FIG. 2 or FIG. 4) based on a BLE scheme.

The second electronic device 204 may transmit a BLE advertising (BLE ADV) signal (e.g., a BLE ADV packet) in a multicast scheme or a broadcast scheme. According to an embodiment, the BLE ADV packet may be a packet for transmitting information related to a connection or an account (e.g., pairing) to unspecified neighbor external electronic devices (e.g., the external electronic device 201). For example, the second electronic device 204 may be stored in a third electronic device (e.g., a third electronic device 300 in FIG. 2 or FIG. 4) together with a first electronic device 202. The third electronic device may be an earbuds case device or a cradle device which stores and charges the second electronic device 204, and in FIG. 8, it will be assumed that the third electronic device is the earbuds case device for convenience of a description.

For example, the second electronic device 204 may start transmitting a BLE ADV packet if the third electronic device is opened in a state that the second electronic device 204 is stored in the third electronic device together with the first electronic device 202, or a state that only the second electronic device 204 is stored in the third electronic device, and may transmit the BLE ADV packet based on a set period (800). In an embodiment, the BLE ADV packet may include at least one of identification information of the second electronic device 204, user account information of the second electronic device 204, information about an electronic device with which the second electronic device 204 is currently paired, information about an electronic device which has performed a pairing process with the second electronic device 204, information about electronic devices which may be paired at the same time, transmission power, a sensing area, information about a remaining battery level of the second electronic device 204, or audio channel role information. In an embodiment, an audio channel role of the second electronic device 204 may be a second audio channel (e.g., a right audio channel) role. A format of the BLE ADV packet transmitted from the second electronic device 204 may be implemented similarly to a format of a BLE ADV packet described in FIG. 7, so a detailed description thereof will be omitted.

The second electronic device 204 may transmit a BLE ADV packet based on a set condition. In an embodiment, the set condition may include at least one of a condition in which power is supplied to the second electronic device 204, a condition in which a set period is reached, or a user input. The external electronic device 201 may perform a BLE scan operation in a set scan period (810).

As the BLE scan operation is performed, the external electronic device 201 may receive at least one BLE ADV packet 820 from among BLE ADV packets transmitted from the second electronic device 204. The external electronic device 201 receiving the BLE ADV packet 820 may display a UI via a display module (e.g., a display module 160 in FIG. 1). The external electronic device 201 may display the UI via the display module based on information included in the received BLE ADV packet 820 and the set condition. In an embodiment, the UI may include an image corresponding to the second electronic device 204. In an embodiment, the UI may include device recognition information, and the device recognition information may be information generated according to a result of the external electronic device 201 recognizing the second electronic device 204. For example, the external electronic device 201 may recognize that the second electronic device 204 is Samsung Galaxy buds, and may generate information related to the Samsung Galaxy buds as the device recognition information. The generated device recognition information may be included in the UI, and the UI including the generated device recognition information may be displayed via the display module. The UI displayed via the display module of the external electronic device 201 may be implemented similarly to a UI described in FIG. 20, so a detailed description thereof will be omitted.

The external electronic device 201 receiving the BLE ADV packet 820 may generate a SCAN_REQ packet 830 based on information included in the BLE ADV packet, and transmit the generated SCAN_REQ packet 830 to second first electronic device 204. Upon receiving the SCAN_REQ packet 830 from the external electronic device 201, the second electronic device 204 may generate a SCAN_RSP packet 840 as a response packet to the SCAN_REQ packet 830 based on information included in the SCAN_REQ packet 830, and transmit the generated SCAN_RSP packet 840 to the external electronic device 201.

Upon receiving the SCAN_RSP packet 840 from the second electronic device 204, the external electronic device 201 may determine whether it is required to establish a connection with the second electronic device 204 based on information included in the SCAN_RSP packet 840. Upon determining that it is required to establish the connection with the second electronic device 204, the external electronic device 201 may transmit, to the second electronic device 204, a CONNECT_IND packet 850 requesting to establish a connection. In an embodiment, the CONNECT_IND packet 850 may include at least one of an AA, a CI, a transmit window offset, and/or a transmit window of the external electronic device 201. FIG. 8 illustrates a case in which the external electronic device 201 performs a BLE scan operation based on an active scan scheme, and if the external electronic device 201 performs a passive scan operation, the operation of transmitting and receiving the SCAN_REQ packet 830 and the SCAN_RSP packet 840 performed between the external electronic device 201 and the second electronic device 204 may be omitted.

Upon receiving the CONNECT_IND packet 850 from the external electronic device 201, the second electronic device 204 may determine whether to establish a connection with the external electronic device 201 based on information included in the CONNECT_IND packet 850. Upon determining to establish the connection with the external electronic device 201, the second electronic device 204 may establish the connection (e.g., a third communication link) with the external electronic device 201. In an embodiment, the external electronic device 201 which transmits the CONNECT_IND packet 850 may operate as a central, and the second electronic device 204 which receives the CONNECT_IND packet 850 may operate as a peripheral.

In an embodiment, the connection between the second electronic device 204 and the external electronic device 201 may be an isochronous connection, and the isochronous connection may be implemented similarly to an isochronous connection described in FIG. 6, so a detailed description thereof will be omitted. A case in which the first electronic device 202 transmits a packet in a first sub-event (sub 1) 890 (801, 802, and 803), and the external electronic device 201 transmits a packet in the first sub-event 890 (811, 812, and 813) is shown in FIG. 8. For example, in the first sub-event 890, each of the external electronic device 201 and the first electronic device 202 may transmit an E packet. According to an embodiment, each of the external electronic device 201 and the first electronic device 202 may identify whether the connection established between the external electronic device 201 and the first electronic device 202 is normally maintained by transmitting the E packet. A case in which the external electronic device 201 transmits a packet in a second sub-event (sub 2) 860 (870), and the second electronic device 204 transmits a packet in the second sub-event 860 (880) is shown in FIG. 8. For example, in the first second-event 860, each of the external electronic device 201 and the second electronic device 204 may transmit an E packet. According to an embodiment, each of the external electronic device 201 and the second electronic device 204 may identify whether the connection established between the external electronic device 201 and the second electronic device 204 is normally maintained by transmitting the E packet.

Figure 9:
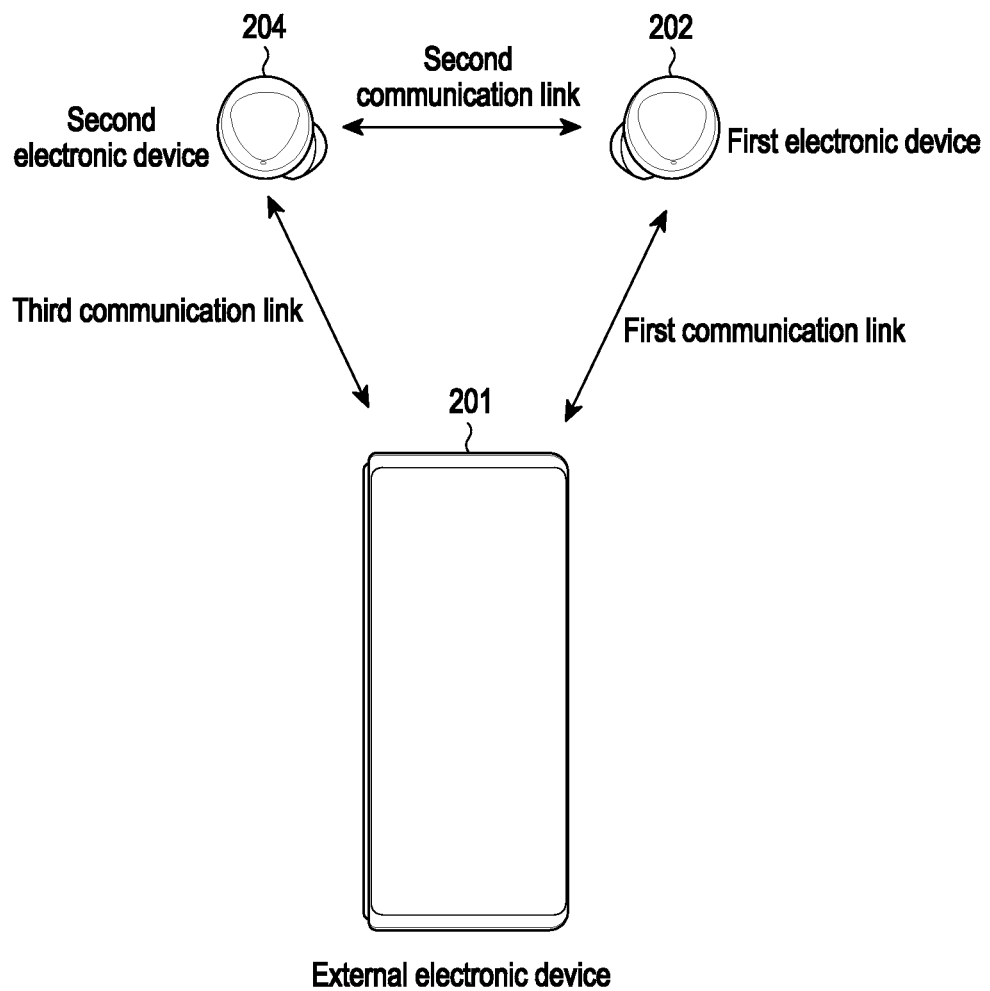
FIG. 9 is a diagram schematically illustrating an example of an operation in which a first electronic device and a second electronic device establish a second communication link in a wireless communication network according to an embodiment.

FIG. 9 is a diagram schematically illustrating an example of an operation in which a first electronic device and a second electronic device establish a second communication link in a wireless communication network according to an embodiment.

Referring to FIG. 9, a structure of a wireless communication network may be implemented similarly to a structure of a wireless communication network described in FIG. 5, so a detailed description thereof will be omitted. In FIG. 9, it will be assumed that an external electronic device 201 (e.g., an electronic device 101 in FIG. 1, or an external electronic device 201 of FIG. 2, FIG. 3, or FIG. 4) and a first electronic device 202 (e.g., a first electronic device 202 in FIG. 2 or FIG. 4) establish a first communication link based on a BLE scheme, and the external electronic device 201 and a second electronic device 204 (e.g., a second electronic device 204 in FIG. 2 or FIG. 4) establish a third communication link based on the BLE scheme.

In FIG. 9, it will be assumed that the first electronic device 202 and the second electronic device 204 establish a connection (e.g., a second communication link) based on the BLE scheme or a Bluetooth legacy scheme in a state in which the connection (e.g., the first communication link) is established between the external electronic device 201 and the first electronic device 202, and the connection (e.g., the first communication link) is established between the external electronic device 201 and the second electronic device 204. In FIG. 9, a case in which the second communication link is established after the first communication link and the third communication link are established is described as an example, however, the first communication link and the third communication link may be established after the second communication link is established.

If the first electronic device 202 and the second electronic device 204 establish the second communication link based on the BLE scheme, an operation of establishing the second communication link between the first electronic device 202 and the second electronic device 204 may be implemented similarly to an operation of establishing a first communication link between the external electronic device 201 and the first electronic device 202 described in FIG. 6 and an operation of establishing a third communication link between the external electronic device 201 and the second electronic device 204 described in FIG. 8, so a detailed description of the operation of establishing the second communication link between the first electronic device 202 and the second electronic device 204 will be omitted.

If the first electronic device 202 and the second electronic device 204 establish the second communication link based on the Bluetooth legacy scheme, the first electronic device 202 and the second electronic device 204 may establish the second communication link based on a basic rate/enhanced data rate (BR/EDR) scheme which uses a page packet and a page scan packet.

In an embodiment, the first electronic device 202 and the second electronic device 204 may exchange information about the first communication link and the third communication link through the second communication link.

In an embodiment, the information about the first communication link may include a CIS parameter, and the CIS parameter may include at least one of ISO_Interval, Sub_Interval, SE_Length, Max_PDU, Max_SDU, MPTm, MPTs, NES, BN, FT, or Framed. In an embodiment, the information about the third communication link may include a CIS parameter, and the CIS parameter may include at least one of ISO_Interval, Sub_Interval, SE_Length, Max_PDU, Max_SDU, MPTm, MPTs, NES, BN, FT, or Framed.

The at least one of ISO_Interval, Sub_Interval, SE_Length, Max_PDU, Max_SDU, MPTm, MPTs, NES, BN, FT, and Framed included in the CIS parameter will be described as follows.

ISO_Interval may indicate a regular time interval between two consecutive CIS anchor points, and one CIS event may occur within one ISO interval. Sub_Interval may indicate a time interval between two consecutive sub-events within one CIS event. Max_PDU may indicate a maximum size of a CIS data PDU. Max_SDU may indicate a maximum size of a service data unit (SDU) on a CIS. MPTm and MPTs may indicate time it takes for a central and a peripheral to transmit a packet including a CIS PDU having a payload of Max_PDU through a physical (PHY) layer used for SIC, respectively. For example, in a case of an LE Coded PHY, it may be assumed that S=8 coding is used. A number of subevent (NSE) may indicate a maximum number of sub-events within each CIS event. A burst number (BN) may indicate the number of packets which may be transmitted without acknowledgment (ACK)/non-ACK (NACK), and may have a value of up to 15. NSE may be a larger value among BN_M_To_S and BN_S_To_M, and may be set up to 31. BN_M_To_S may indicate a BN from a central to a peripheral, and BN_S_To_M may indicate a BN from a peripheral to a central. Flushing time (FT) may indicate the maximum number of CIS events for which a CIS data PDU may be transmitted (or retransmitted), and may have a value from 1 to 255.

In FIG. 9, a case has been described that the first electronic device 202 and the second electronic device 204 establish the second communication link in a state in which the first communication link is established between the external electronic device 201 and the first electronic device 202, and the third communication link is established between the external electronic device 201 and the second electronic device 204, however, the second communication link may be established between the first electronic device 202 and the second electronic device 204 before at least one of the first communication link or the third first communication link is established. In a case that the second communication link is established before the at least one of the first communication link or the third first communication link is established, the first electronic device 202 may transmit, to the second electronic device 204, information about the first communication link via the second communication link upon establishing the first communication link with the external electronic device 201, and the second electronic device 204 may transmit, to the first electronic device 202, information about the third communication link via the second communication link upon establishing the third communication link with the external electronic device 201.

An operation in which a first electronic device 202 transmits a replacement request packet as the first electronic device 202 identifies that an RLF occurs in a first communication link established between the first electronic device 202 and an external electronic device 201 will be described with reference to FIG. 10.

Figure 10:
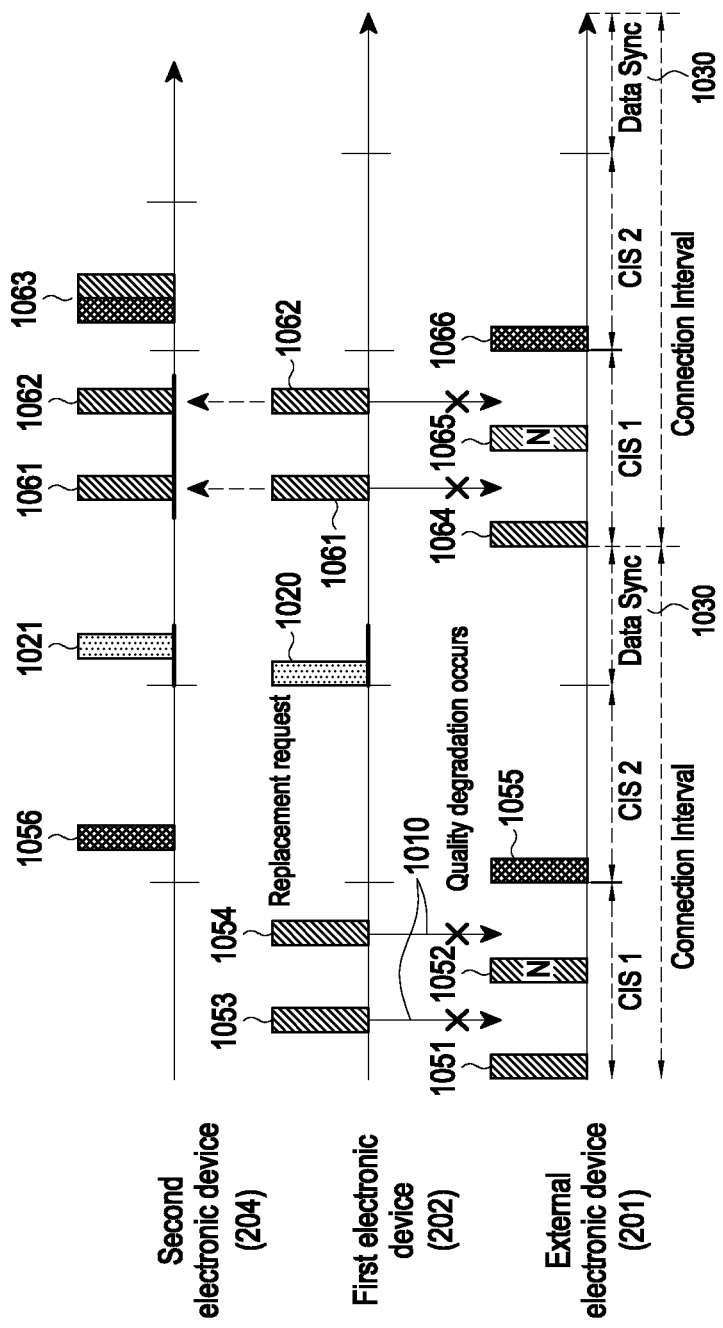
FIG. 10 is a diagram schematically illustrating an example of an operation in which a first electronic device transmits a replacement request packet in a wireless communication network according to an embodiment.

FIG. 10 is a diagram schematically illustrating an example of an operation in which a first electronic device transmits a replacement request packet in a wireless communication network according to an embodiment.

Referring to FIG. 10, a structure of a wireless communication network may be implemented similarly to a structure of a wireless communication network described in FIG. 5, so a detailed description thereof will be omitted. A first electronic device 202 (e.g., a first electronic device 202 in FIG. 2 or FIG. 4) and an external electronic device 201 (e.g., an electronic device 101 in FIG. 1, or an external electronic device 201 in FIG. 2, FIG. 3, or FIG. 4) may perform a packet transmission/reception operation through a first communication link. For example, the external electronic device 201 may transmit packets 1051 and 1052 through the first communication link, and the first electronic device 202 may transmit packets 1053 and 1054 through the first communication link. In an embodiment, a second electronic device 204 (e.g., a second electronic device 204 in FIG. 2 or FIG. 4) and the external electronic device 201 may perform a packet transmission/reception operation through a third communication link. For example, the external electronic device 201 may transmit a packet 1055 through the third communication link, and the second electronic device 204 may transmit a packet 1056 through the third communication link.

In an embodiment, the first electronic device 202 may identify that quality of the first communication link established between the first electronic device 202 and the external electronic device 201 is less than threshold quality (e.g., quality degradation occurs) (1010). Upon identifying that the quality of the first communication link is less than the threshold quality, the first electronic device 202 may transmit a replacement request packet 1020 to the second electronic device 204. In an embodiment, if the quality of the first communication link is less than the threshold quality, the external electronic device 201 may not normally receive data transmitted from the first electronic device 202, so the first electronic device 202 may transmit the replacement request packet 1020 to the second electronic device 204. In an embodiment, the first electronic device 202 may transmit the replacement request packet 1020 to the second electronic device 204 in order to request that the second electronic device 204 transmits, to the external electronic device 201, data transmitted from the first electronic device 202 to the external electronic device 201, instead of the first electronic device 202. In an embodiment, the replacement request packet 1020 may be transmitted in a data synchronization (Data Sync) period 1030 in the second communication link established between the first electronic device 202 and the second electronic device 204. In an embodiment, the Data Sync period 1030 is a period for synchronizing the first electronic device 202 and the second electronic device 204, and the first electronic device 202 and the second electronic device 204 may exchange information for data synchronization through the second communication link in the Data Sync period 1030. In an embodiment, the replacement request packet 1020 may be exchanged together with the information for data synchronization in the Data Sync period 1030 in the second communication link. The second electronic device 204 may receive the replacement request packet 1020 transmitted from the first electronic device 202 through the second communication link, and accordingly, may sniff the packets 1061 and 1062 transmitted from the first electronic device 202 to the external electronic device 201. The second electronic device 204 may transmit, to the external electronic device 201 through the third communication link, the sniffed packets 1061 and 1062 based on a set transmission scheme (e.g., a concatenation scheme, a mixing scheme, and/or an independent scheme). The transmission scheme used for the second electronic device 204 to transmit the sniffed packets 1061 and 1062 to the external electronic device 201 through the third communication link may be implemented in various forms, and the various forms for the transmission scheme will be described with reference to FIGS. 12A to 12C, so a detailed description thereof will be omitted herein. FIG. 10 illustrates a case in which the set transmission scheme is the concatenation scheme, so the second electronic device 204 may generate a packet 1063 by concatenating at least part of data included in the sniffed packets 1061 and 1062 with data transmitted from the second electronic device 204 to the external electronic device 201, and transmit the generated packet 1063 to the external electronic device 201 through the third communication link.

In an embodiment, the external electronic device 201 may transmit packets 1064 and 1065 through the first communication link and transmit a packet 1066 through the third communication link.

In FIG. 10, for example, a packet marked as "N" may represent a NACK packet. In an embodiment, the first electronic device 202 receiving a NACK packet transmitted from the external electronic device 201 may retransmit a packet corresponding to the NACK packet, and the number of times the packet is retransmitted may be less than or equal to a set number of times. For example, the first electronic device 202 may retransmit the packet corresponding to the NACK packet up to the set number of times as needed.

A process in which a second electronic device 204 receiving a replacement request packet from a first electronic device 202 performs a replacement operation will be described with reference to FIGS. 11A and 11B.

Figure 11A:
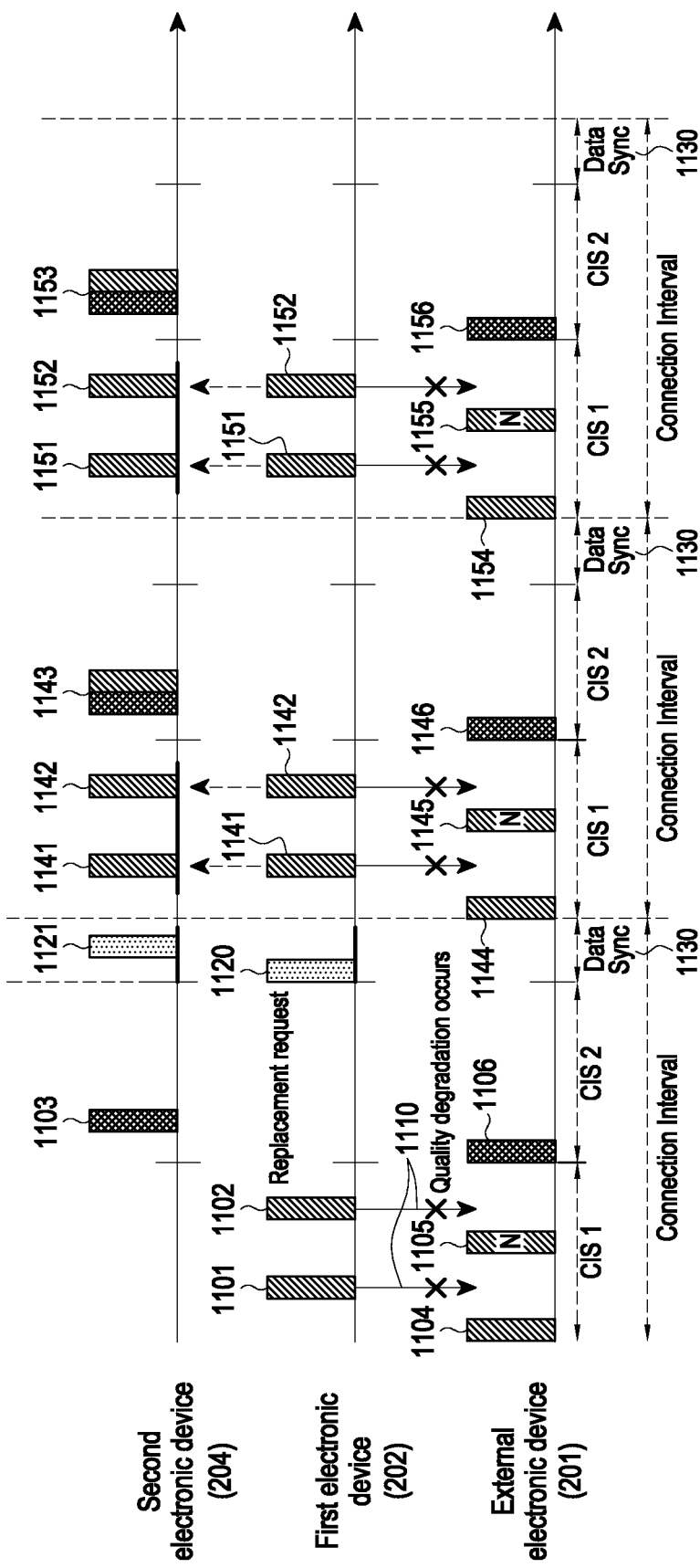
FIG. 11A is a diagram schematically illustrating an example of a process in which a second electronic device performs a replacement operation in a wireless communication network according to an embodiment.

FIG. 11A is a diagram schematically illustrating an example of a process in which a second electronic device performs a replacement operation in a wireless communication network according to an embodiment.

Referring to FIG. 11A, a structure of a wireless communication network may be implemented similarly to a structure of a wireless communication network described in FIG. 5, so a detailed description thereof will be omitted. A first electronic device 202 (e.g., a first electronic device 202 in FIG. 2 or FIG. 4) and an external electronic device 201 (e.g., an electronic device 101 in FIG. 1, or an external electronic device 201 in FIG. 2, FIG. 3, or FIG. 4) may perform a packet transmission/reception operation through a first communication link. For example, the first electronic device 202 may transmit packets 1101 and 1102 through the first communication link, and the external electronic device 201 may transmit packets 1104 and 1105 through the first communication link. In an embodiment, a second electronic device 204 (e.g., a second electronic device 204 in FIG. 2 or FIG. 4) and the external electronic device 201 may exchange data, e.g., perform a packet transmission/reception operation, through a third communication link. For example, the external electronic device 201 may transmit a packet 1106 through the third communication link, and the second electronic device 204 may transmit a packet 1103 through the third communication link.

In an embodiment, as the first electronic device 202 identifies that quality of the first communication link established between the first electronic device 202 and the external electronic device 201 is less than threshold quality (e.g., quality degradation occurs) (1110), the first electronic device 202 may transmit a replacement request packet 1120 to the second electronic device 204 via the second communication link. In an embodiment, the replacement request packet 1120 may be exchanged in a Data Sync period 1130 in the second communication link, and an operation in which the first electronic device 202 and the second electronic device 204 exchange the replacement request packet 1120 in the Data Sync period 1130 in the second communication link may be implemented similarly to or substantially the same as an operation in which the first electronic device 202 and the second electronic device 204 exchange a replacement request packet 1020 in a Data Sync period 1030 in the second communication link as described in FIG. 10, so a detailed description thereof will be omitted.

Upon receiving the replacement request packet 1120 from the first electronic device 202, the second electronic device 204 may obtain information about a time point at which a replacement operation starts based on a value of a next anchor point included in the replacement request packet 1120. If the next anchor point field is not included in the replacement request packet 1120, the second electronic device 204 may obtain a time point at which the next CIS event starts as the time point at which the replacement operation starts by calculating an ISO Interval of the first electronic device 202. The replacement request packet 1120 may be implemented similarly to that described in Table 1, so a detailed description of the replacement request packet 1120 will be omitted.

The second electronic device 204 may start the replacement operation at the obtained time point at which the replacement operation starts. In an embodiment, the second electronic device 204 may receive packets 1141 and 1142 including the data (e.g., audio data or first data) transmitted from the first electronic device 202 to the external electronic device 201 at the time point at which the replacement operation starts. Data transmitted by the first electronic device 202 to the external electronic device 201 may be referred to as "first data".

The second electronic device 204 may transmit, to the external electronic device 201 through the third communication link established between the second electronic device 204 and the external electronic device 201, the sniffed packets 1141 and 1142 based on a set transmission scheme (e.g., a concatenation scheme, a mixing scheme, and/or an independent scheme). The concatenation scheme, the mixing scheme, and/or the independent scheme which may be used for the second electronic device 204 to transmit the sniffed packets 1141 and 1142 to the external electronic device 201 through the third communication link will be described with reference to FIGS. 12A to 12C, so a detailed description thereof will be omitted herein. FIG. 11A illustrates a case in which the set transmission scheme is the concatenation scheme, so the second electronic device 204 may generate a packet 1143 by concatenating at least part of data included in the sniffed packets 1141 and 1142 with data transmitted from the second electronic device 204 to the external electronic device 201, and transmit the generated packet 1143 to the external electronic device 201 through the third communication link.

In an embodiment, the external electronic device 201 may transmit packets 1144 and 1145 through the first communication link and transmit a packet 1146 through the third communication link.

Because the quality of the first communication link is still less than the threshold quality (e.g., because a replacement release packet is not received from the first electronic device 202), the second electronic device 204, as in a previous Connection Interval, may receive (e.g., may sniff) packets 1151 and 1152 including data (e.g., audio data or first data) transmitted from the first electronic device to the external electronic device 201. The second electronic device 204 may transmit, based on the concatenation scheme, the sniffed packets 1151 and 1152 to the external electronic device 201 through the third communication link established between the second electronic device 204 and the external electronic device 201. For example, the second electronic device 204 may generate a packet 1153 by concatenating at least part of data included in the sniffed packets 1151 and 1152 with data transmitted from the second electronic device 204 to the external electronic device 201, and transmit the generated packet 1153 to the external electronic device 201 through the third communication link.

In an embodiment, the external electronic device 201 may transmit packets 1154 and 1155 through the first communication link and transmit a packet 1156 through the third communication link.

In FIG. 11A, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

Figure 11B:
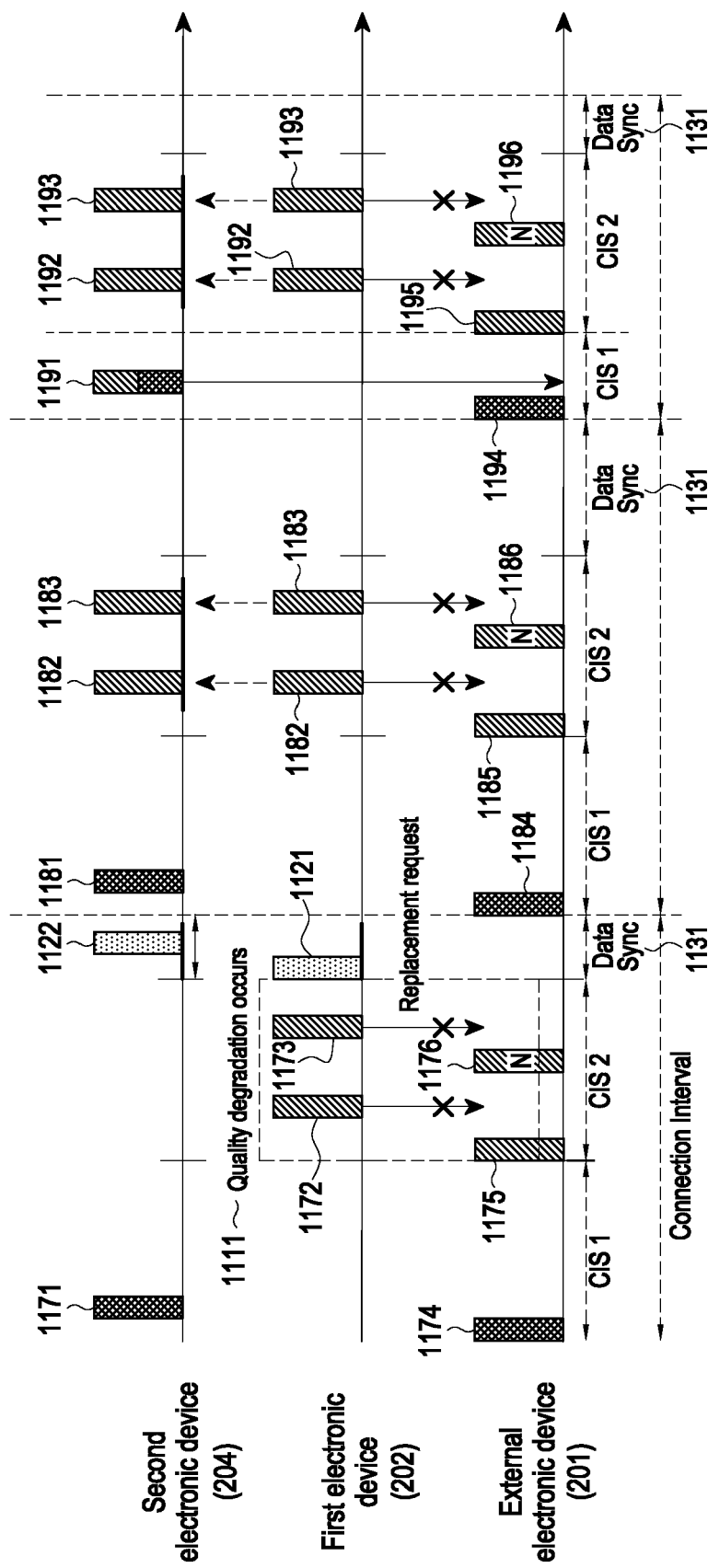
FIG. 11B is a diagram schematically illustrating another example of a process in which a second electronic device performs a replacement operation in a wireless communication network according to an embodiment.

FIG. 11B is a diagram schematically illustrating another example of a process in which a second electronic device performs a replacement operation in a wireless communication network according to an embodiment.

Referring to FIG. 11B, a structure of a wireless communication network may be implemented similarly to a structure of a wireless communication network described in FIG. 5, so a detailed description thereof will be omitted. A first electronic device 202 (e.g., a first electronic device 202 in FIG. 2 or FIG. 4) and an external electronic device 201 (e.g., an electronic device 101 in FIG. 1, or an external electronic device 201 in FIG. 2, FIG. 3, or FIG. 4) may perform a packet transmission/reception operation through a first communication link. For example, the first electronic device 202 may transmit packets 1172 and 1173 through the first communication link, and the external electronic device 201 may transmit packets 1175 and 1176 through the first communication link. In an embodiment, a second electronic device 204 (e.g., a second electronic device 204 in FIG. 2 or FIG. 4) and the external electronic device 201 may perform a packet transmission/reception operation through a third communication link. For example, the external electronic device 201 may transmit a packet 1174 through the third communication link, and the second electronic device 204 may transmit a packet 1171 through the third communication link.

In an embodiment, as the first electronic device 202 identifies that quality of the first communication link established between the first electronic device 202 and the external electronic device 201 is less than threshold quality (e.g., quality degradation occurs) (1111), the first electronic device 202 may transmit a replacement request packet 1121 to the second electronic device 204 via the second communication link. In an embodiment, the replacement request packet 1121 may be exchanged in a Data Sync period 1131 in the second communication link, and an operation in which the first electronic device 202 and the second electronic device 204 exchange the replacement request packet 1121 in the Data Sync period 1131 in the second communication link may be implemented similarly to or substantially the same as an operation in which the first electronic device 202 and the second electronic device 204 exchange a replacement request packet 1020 in a Data Sync period 1030 in the second communication link as described in FIG. 10, so a detailed description thereof will be omitted.

Upon receiving the replacement request packet 1121 from the first electronic device 202, the second electronic device 204 may obtain information about a time point at which a replacement operation starts based on a value of a next anchor point included in the replacement request packet 1121. If the next anchor point field is not included in the replacement request packet 1121, the second electronic device 204 may obtain a time point at which the next CIS event starts as the time point at which the replacement operation starts by calculating an ISO Interval of the first electronic device 202. The replacement request packet 1121 may be implemented similarly to that described in Table 1, so a detailed description of the replacement request packet 1121 will be omitted.

The second electronic device 204 may start the replacement operation at the obtained time point at which the replacement operation starts. In an embodiment, the second electronic device 204 may receive packets 1182 and 1183 including the data (e.g., audio data or first data) transmitted from the first electronic device 202 to the external electronic device 201 at the time point at which the replacement operation starts. The second electronic device 204 may transmit, to the external electronic device 201 through the third communication link established between the second electronic device 204 and the external electronic device 201, the sniffed packets 1182 and 1183 based on a set transmission scheme (e.g., a concatenation scheme, a mixing scheme, and/or an independent scheme). The concatenation scheme, the mixing scheme, and/or the independent scheme which may be used for the second electronic device 204 to transmit the sniffed packets 1182 and 1183 to the external electronic device 201 through the third communication link will be described with reference to FIGS. 12A to 12C, so a detailed description thereof will be omitted herein. FIG. 11B illustrates a case in which the set transmission scheme is the mixing scheme, so the second electronic device 204 may generate a packet 1191 by mixing, based on the mixing scheme, first data included in at least part of the sniffed packets 1182 and 1183 with data (e.g., second data) transmitted from the second electronic device 204 to the external electronic device 201, and transmit the generated packet 1191 to the external electronic device 201 through the third communication link.

In an embodiment, the external electronic device 201 may transmit packets 1185 and 1186 through the first communication link and transmit a packet 1184 through the third communication link. In an embodiment, the second electronic device 204 may transmit a packet 1181 through the third communication link.

Because the quality of the first communication link is still less than the threshold quality (e.g., because a replacement release packet is not received from the first electronic device 202), the second electronic device 204, as in a previous Connection Interval, may receive (e.g., may sniff) packets 1192 and 1193 including data (e.g., audio data or first data) transmitted from the first electronic device to the external electronic device 201. In an embodiment, the external electronic device 201 may transmit a packet 1194 through the third communication link and may transmit packets 1195 and 1196 through the first communication link.

In FIG. 11B, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

An operation of transmitting, to an external electronic device 201 according to a replacement operation, data (e.g., first data) which is received by a second electronic device 204 and which is transmitted from a first electronic device 202 to the external electronic device 201 in a wireless communication network will be described with reference to FIGS. 12A to 12C.

Figure 12A:
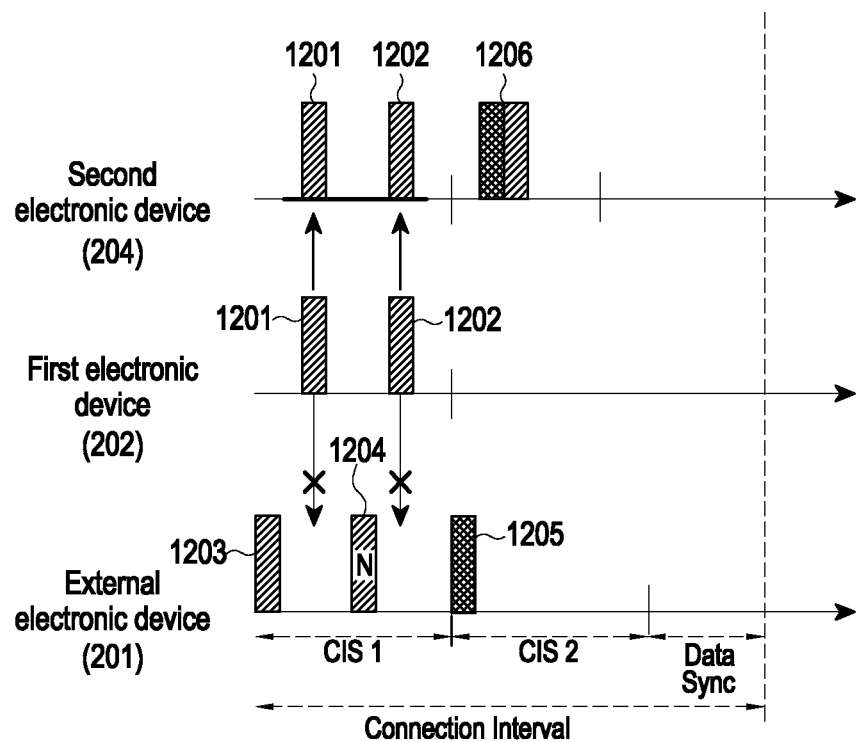
FIG. 12A is a diagram schematically illustrating an example of an operation in which a second electronic device transmits, to an external electronic device, data transmitted from a first electronic device to the external electronic device in a wireless communication network according to an embodiment.

FIG. 12A is a diagram schematically illustrating an example of an operation in which a second electronic device transmits, to an external electronic device, data transmitted from a first electronic device to the external electronic device in a wireless communication network according to an embodiment.

Referring to FIG. 12A, a structure of a wireless communication network may be implemented similarly to a structure of a wireless communication network described in FIG. 5, so a detailed description thereof will be omitted. An operation of a second electronic device 204 (e.g., a second electronic device 204 in FIG. 2 or FIG. 4) shown in FIG. 12A may be an operation of the second electronic device 204 which receives a replacement request packet (not shown in FIG. 12A) from a first electronic device 202 (e.g., a first electronic device 202 in FIG. 2 or FIG. 4) as quality of a first communication link established between the first electronic device 202 and an external electronic device 201 (e.g., an electronic device 101 in FIG. 1, or an external electronic device 201 in FIG. 2, FIG. 3, or FIG. 4) is less than threshold quality (e.g., quality degradation occurs). The operation of the second electronic device 204 shown in FIG. 12A may be an operation in a case that a transmission scheme used to perform a replacement operation for the first electronic device 202 is a concatenation scheme.

Upon receiving the replacement request packet from the first electronic device 202, the second electronic device 204 may receive (e.g., may sniff) packets 1201 and 1202 including data (e.g., audio data or first data) transmitted from the first electronic device 202 to the external electronic device 201.

In an embodiment, a set transmission scheme is a concatenation scheme, so the second electronic device 204 may concatenate at least part of the data (e.g., the first data) included in the packets 1201 and 1202 which are transmitted from the first electronic device 202 to the external electronic device 201 and which are received by the second electronic device 204 with data (e.g., second data) transmitted from the second electronic device 204 to the external electronic device 201 and transmit a packet 1206 including concatenated data (e.g., third data) through a third communication link. The second electronic device 204 may maintain a form of the first data as it is without performing separate processing on the first data, concatenate the second data and the first data, and transmit, to the external electronic device 201, the packet 1206 including the concatenated data (e.g., the third data) through the third communication link. In an embodiment, the third data may be generated by concatenating the first data and the second data so that the second data is received and then the first data is received in consideration of efficient reception in the external electronic device 201. The second electronic device 204 may generate the third data by concatenating the second data with the first data whose form is maintained as it is so that the external electronic device 201 may directly perform a mixing operation and a modification operation on the first data. Upon receiving the packet 1206 including the third data, the external electronic device 201 may identify that two pieces of mono data (e.g., a mono sound source) have been transferred from the second electronic device 204, and process (e.g., mix or modify) the two mono sound sources. In an embodiment, the external electronic device 201 may identify, based at least in part on a packet size, that the packet 1206 is a packet in which the two mono sound sources are transferred. In an embodiment, upon recognizing that the second electronic device 204 performs the replacement operation, the external electronic device 201 may identify that the packet 1206 is the packet in which the two mono sound sources are transferred. In an embodiment, the external electronic device 201 may transmit packets 1203 and 1204 through the first communication link and transmit a packet 1205 through the third communication link.

In FIG. 12A, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

Figure 12B:
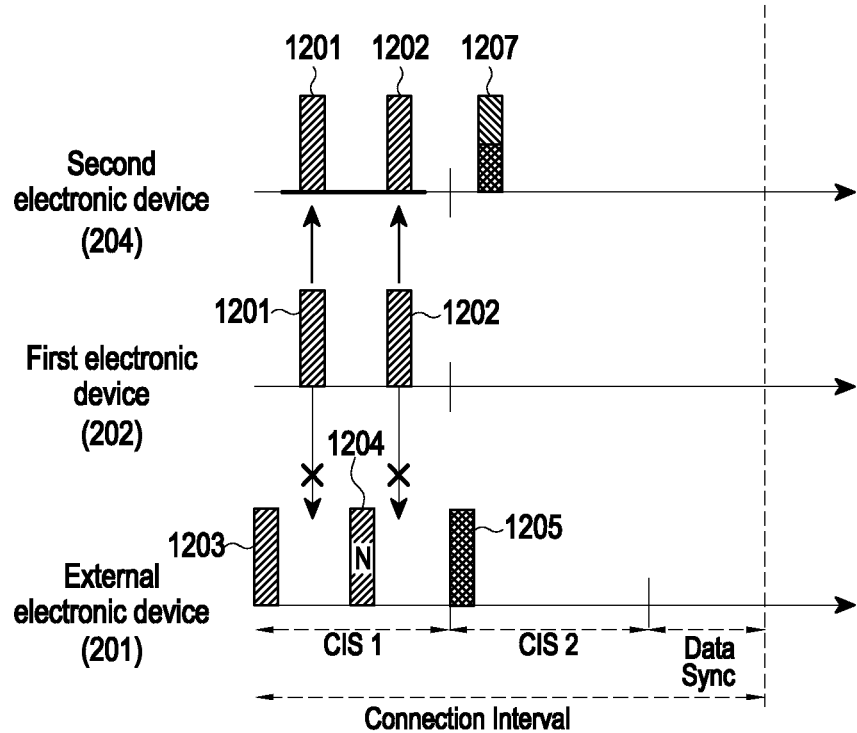
FIG. 12B is a diagram schematically illustrating another example of an operation in which a second electronic device transmits, to an external electronic device, data transmitted from a first electronic device to the external electronic device in a wireless communication network according to an embodiment.

FIG. 12B is a diagram schematically illustrating another example of an operation in which a second electronic device transmits, to an external electronic device, data transmitted from a first electronic device to the external electronic device in a wireless communication network according to an embodiment.

Referring to FIG. 12B, a structure of a wireless communication network may be implemented similarly to a structure of a wireless communication network described in FIG. 5, so a detailed description thereof will be omitted. An operation of a second electronic device 204 (e.g., a second electronic device 204 in FIG. 2 or FIG. 4) shown in FIG. 12B may be an operation of the second electronic device 204 which receives a replacement request packet (not shown in FIG. 12B) from a first electronic device 202 (e.g., a first electronic device 202 in FIG. 2 or FIG. 4) as quality of a first communication link established between the first electronic device 202 and an external electronic device 201 (e.g., an electronic device 101 in FIG. 1, or an external electronic device 201 in FIG. 2, FIG. 3, or FIG. 4) is less than threshold quality (e.g., quality degradation occurs). The operation of the second electronic device 204 shown in FIG. 12B may be an operation in a case that a transmission scheme used for the second electronic device 204 to perform a replacement operation for the first electronic device 202 is a mixing scheme.

Upon receiving the replacement request packet from the first electronic device 202, the second electronic device 204 may receive (e.g., may sniff) packets 1201 and 1202 including data (e.g., audio data or first data) transmitted from the first electronic device 202 to the external electronic device 201.

In an embodiment, a set transmission scheme is a mixing scheme, so the second electronic device 204 may mix at least part of the data (e.g., the first data) included in the packets 1201 and 1202 which are transmitted from the first electronic device 202 to the external electronic device 201 and which are received by the second electronic device 204 with data (e.g., second data) transmitted from the second electronic device 204 to the external electronic device 201 and transmit a packet 1207 including mixed data (e.g., third data) through a third communication link. In an embodiment, the third data may be stereo audio data.

Upon receiving the packet 1207 including the third data, the external electronic device 201 may identify that a stereo sound source has been transferred from the second electronic device 204, and process the stereo sound source. In an embodiment, the external electronic device 201 may transmit packets 1203 and 1204 through the first communication link and transmit a packet 1205 through the third communication link.

In FIG. 12B, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

Figure 12C:
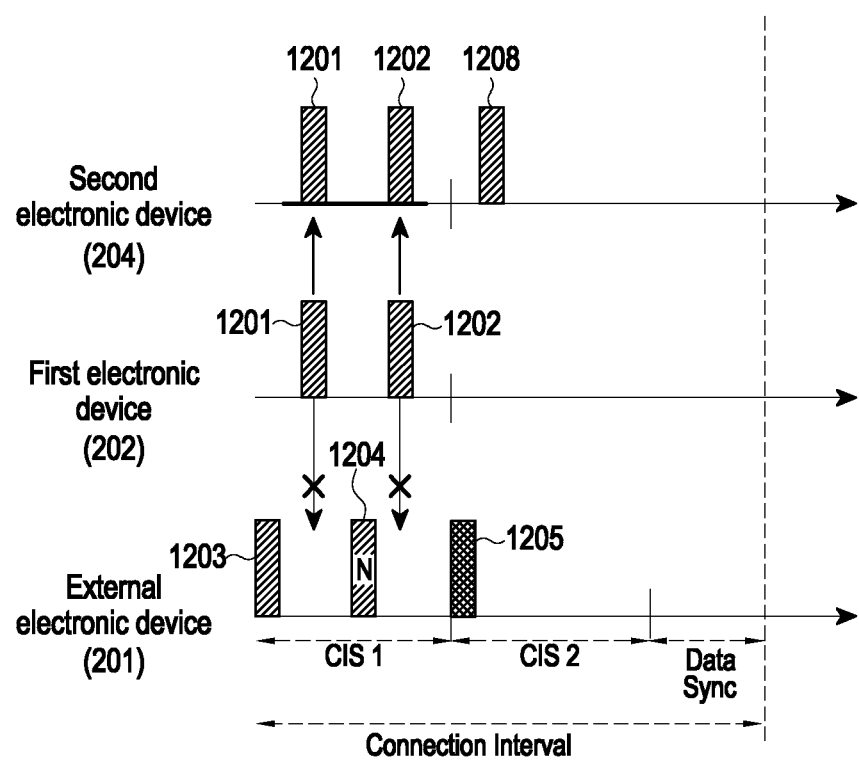
FIG. 12C is a diagram schematically illustrating still another example of an operation in which a second electronic device transmits, to an external electronic device, data transmitted from a first electronic device to the external electronic device in a wireless communication network according to an embodiment.

FIG. 12C is a diagram schematically illustrating still another example of an operation in which a second electronic device transmits, to an external electronic device, data transmitted from a first electronic device to the external electronic device in a wireless communication network according to an embodiment.

Referring to FIG. 12C, a structure of a wireless communication network may be implemented similarly to a structure of a wireless communication network described in FIG. 5, so a detailed description thereof will be omitted. An operation of a second electronic device 204 (e.g., a second electronic device 204 in FIG. 2 or FIG. 4) shown in FIG. 12C may be an operation of the second electronic device 204 which receives a replacement request packet (not shown in FIG. 12C) from a first electronic device 202 (e.g., a first electronic device 202 in FIG. 2 or FIG. 4) as quality of a first communication link established between the first electronic device 202 and an external electronic device 201 (e.g., an electronic device 101 in FIG. 1, or an external electronic device 201 in FIG. 2, FIG. 3, or FIG. 4) is less than threshold quality (e.g., quality degradation occurs). The operation of the second electronic device 204 shown in FIG. 12C may be an operation in a case that a transmission scheme used for the second electronic device 204 to perform a replacement operation for the first electronic device 202 is an independent scheme.

Upon receiving the replacement request packet from the first electronic device 202, the second electronic device 204 may receive (e.g., sniff) packets 1201 and 1202 including data (e.g., audio data or first data) transmitted from the first electronic device 202 to the external electronic device 201.

In an embodiment, a set transmission scheme is an independent scheme, so the second electronic device 204 may transmit, the external electronic device 201 through the third communication link, a packet 1208 including at least part of the data (e.g., the first data) included in the packets 1201 and 1202 which are transmitted from the first electronic device 202 to the external electronic device 201 and which are received by the second electronic device 204. The second electronic device 204 may not have second data to be transmitted in a corresponding Connection Interval, and in this case, the second electronic device 204 may include only the first data in the packet 1208 to transmit the packet 1208 to the external electronic device 201 through the third communication link. If the transmission scheme is the independent scheme, the second electronic device 204 may independently transmit the data sniffed through the replacement operation to the external electronic device 201 instead of the first electronic device 202.

In an embodiment, the external electronic device 201 may transmit packets 1203 and 1204 through the first communication link and transmit a packet 1205 through the third communication link.

In FIG. 12C, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

An operation in which an external electronic device 201 receives data, which is transmitted by a second electronic device 204, transmitted from a first electronic device 202 to the external electronic device 201 in a wireless communication network will be described with reference to FIG. 13.

Figure 13:
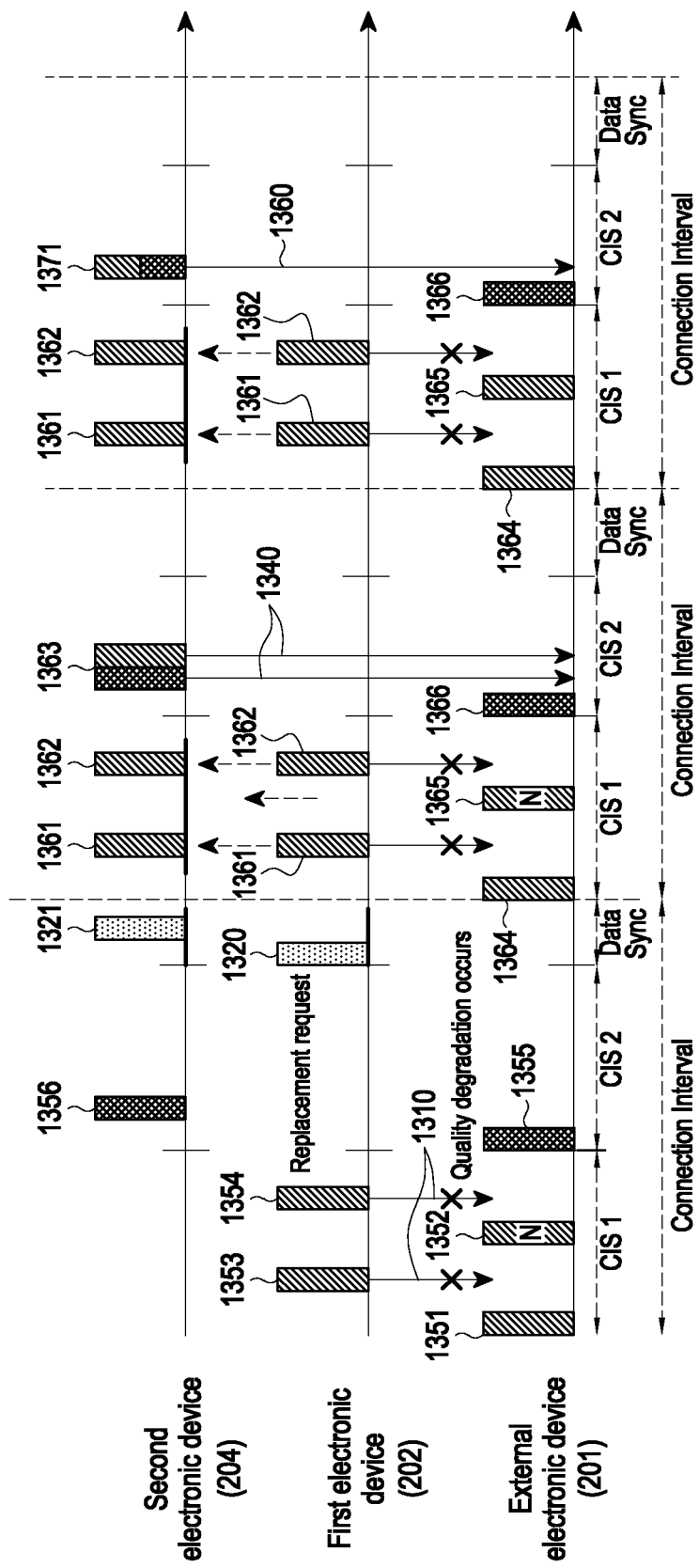
FIG. 13 is a diagram schematically illustrating an example of an operation in which an external electronic device receives data transmitted by a second electronic device and transmitted from a first electronic device to the external electronic device in a wireless communication network according to an embodiment.

FIG. 13 is a diagram schematically illustrating an example of an operation in which an external electronic device receives data, which is transmitted by a second electronic device, transmitted from a first electronic device to the external electronic device in a wireless communication network according to an embodiment.

Referring to FIG. 13, a structure of a wireless communication network may be implemented similarly to a structure of a wireless communication network described in FIG. 5, so a detailed description thereof will be omitted. A first electronic device 202 (e.g., a first electronic device 202 in FIG. 2 or FIG. 4) and an external electronic device 201 (e.g., an electronic device 101 in FIG. 1, or an external electronic device 201 in FIG. 2, FIG. 3, or FIG. 4) may perform a packet transmission/reception operation through a first communication link. For example, the external electronic device 201 may transmit packets 1351 and 1352 through the first communication link, and the first electronic device 202 may transmit packets 1353 and 1354 through the first communication link. In an embodiment, a second electronic device 204 (e.g., a second electronic device 204 in FIG. 2 or FIG. 4) and the external electronic device 201 may perform a packet transmission/reception operation through a third communication link. For example, the external electronic device 201 may transmit a packet 1355 through the third communication link, and the second electronic device 204 may transmit a packet 1356 through the third communication link.

In an embodiment, as the first electronic device 202 identifies that quality of the first communication link established between the first electronic device 202 and the external electronic device 201 is less than threshold quality (e.g., quality degradation occurs) (1310), the first electronic device 202 may transmit a replacement request packet 1320 to the second electronic device 204 via the second communication link.

Upon receiving the replacement request packet 1320 from the first electronic device 202, the second electronic device 204 may receive (e.g., sniff) packets 1361 and 1362 including data (e.g., audio data or first data) transmitted from the first electronic device 202 to the external electronic device 201.

In an embodiment, the external electronic device 201 may transmit packets 1364 and 1365 through the first communication link and transmit a packet 1336 through the third communication link.

In an embodiment, if a set transmission scheme is a concatenation scheme, the second electronic device 204 may generate third data by concatenating the first data and data (e.g., second data) of the second electronic device 204, and transmit a packet 1363 including the third data to the external electronic device 201 through the third communication link. Upon receiving the packet 1363 including the third data through the third communication link, the external electronic device 201 may identify that the third data included in the received packet 1363 is mono data for which a mixing operation is not performed on the first data and the second data, and generate fourth data (e.g., sound source data) based on a result of the identification. Upon receiving the packet 1363 including the third data, the external electronic device 201 may identify that two pieces of mono data (e.g., a mono sound source) have been transferred from the second electronic device 204, and may process (e.g., mix and/or modify) the two pieces of mono data. In an embodiment, the external electronic device 201 may identify, based at least in part on a packet size, that the packet 1363 is a packet in which two mono sound sources are transferred. In an embodiment, upon recognizing that the second electronic device 204 performs a replacement operation, the external electronic device 201 may identify that the packet 1363 is the packet in which the two mono sound sources are transferred.

In an embodiment, if the set transmission scheme is a mixing scheme, the second electronic device 204 may generate third data by performing a mixing operation on the first data and the second data, and transmit a packet 1371 including the third data to the external electronic device 201 through the third communication link. Upon receiving the packet 1371 including the third data through the third communication link, the external electronic device 201 may identify that the third data included in the received packet 1371 is stereo data (e.g., a stereo sound source) for which the mixing operation is performed on the first data and the second data, and generate fourth data based on a result of the identification.

In FIG. 13, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

Figure 14:
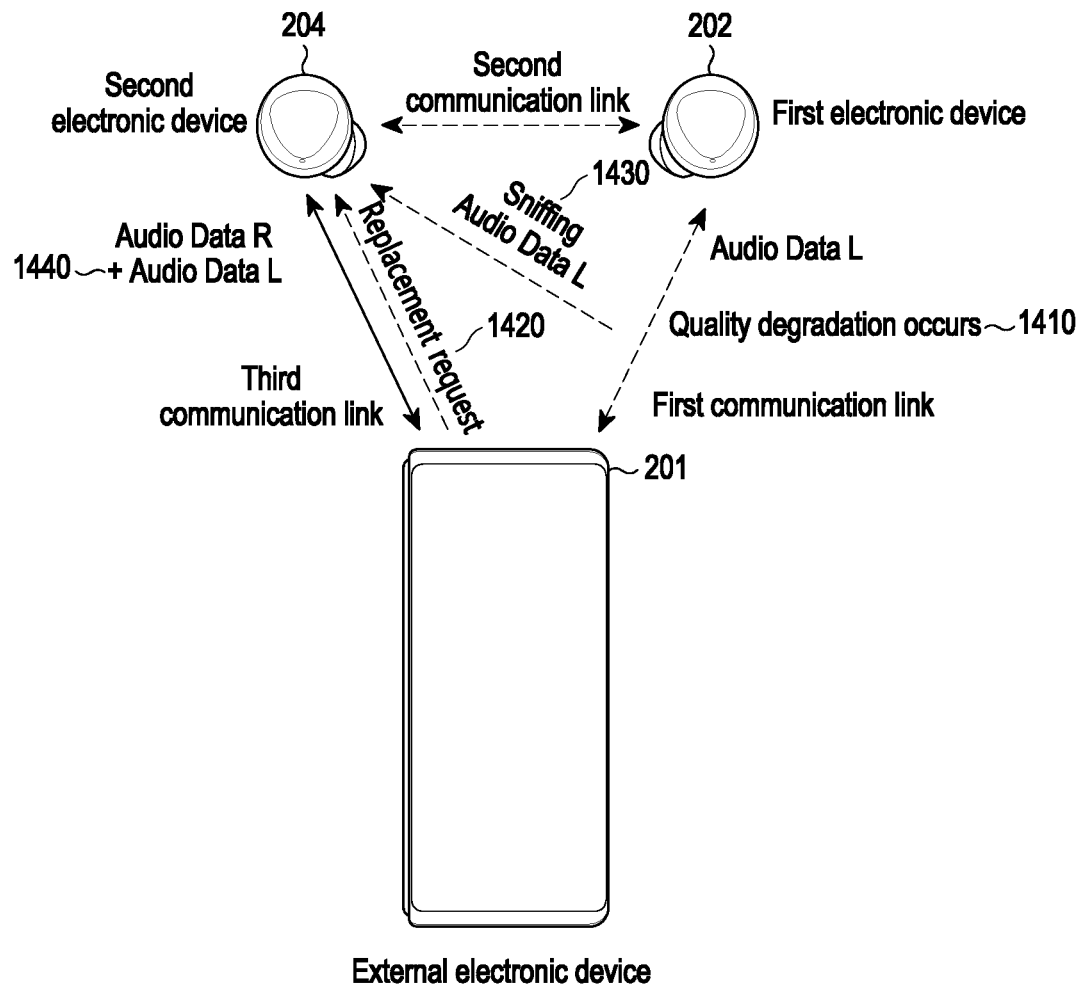
FIG. 14 is a diagram schematically illustrating another example of an operation of providing an audio service in a wireless communication network according to an embodiment.

FIG. 14 is a diagram schematically illustrating another example of an operation of providing an audio service in a wireless communication network according to an embodiment.

Referring to FIG. 14, a wireless communication network may include a first electronic device 202 (e.g., a first electronic device 202 in FIG. 2 or FIG. 4), a second electronic device 204 (e.g., a second electronic device 204 in FIG. 2 or FIG. 4), and an external electronic device 101 (e.g., an electronic device 101 in FIG. 1, or an external electronic device 201 in FIG. 2, FIG. 3, or FIG. 4). In FIG. 14, an audio service may be a binaural recording service which is an AoBLE service. In FIG. 14, the first electronic device 202 and the second electronic device 204 may be included in an electronic device (e.g., an electronic device 102 in FIG. 1 or FIG. 2). In an embodiment, the electronic device may be wiredly and/or wirelessly connected to a third electronic device (e.g., a third electronic device 300 in FIG. 2 or FIG. 4).

Each of the first electronic device 202 and the second electronic device 204 may be connected to the external electronic device 201 based on a BLE scheme. The first electronic device 202 and the second electronic device 204 may be connected to each other based on the BLE scheme or a Bluetooth legacy scheme. A communication link established between the first electronic device 202 and the external electronic device 201 may be a first communication link, a communication link established between the second electronic device 204 and the external electronic device 201 may be a third communication link, and a communication link established between the first electronic device 202 and the second electronic device 204 may be a second communication link.

An operation in which the first electronic device 202 and the external electronic device 201 establish the first communication link, an operation in which the second electronic device 204 and the external electronic device 201 establish the third communication link, and an operation in which the first electronic device 202 and the second electronic device 204 establish the second communication link may be implemented similarly to an operation of establishing the first communication link as described in FIG. 6, an operation of establishing the third communication link as described in FIG. 8, and an operation of establishing the second communication link as described in FIG. 9, respectively, so a detailed description of the operation in which the first electronic device 202 and the external electronic device 201 establish the first communication link, the operation in which the second electronic device 204 and the external electronic device 201 establish the third communication link, and the operation in which the first electronic device 202 and the second electronic device 204 establish the second communication link will be omitted.

In a state in which the first communication link is established between the external electronic device 201 and the first electronic device 202, the third communication link is established between the external electronic device 201 and the second electronic device 204, and the second communication link is established between the first electronic device and the second electronic device 204, the external electronic device 201, the first electronic device 202, and the second electronic device 204 may perform (e.g., may provide) a binaural recording service. While the external electronic device 201, the first electronic device 202, and the second electronic device 204 provide the binaural recording service, quality of the first communication link or the third communication link may be lower than threshold quality (for example, quality degradation may occur in the first communication link or the third communication link). An operation of detecting that quality of the first communication link or the third communication link is less than threshold quality may be implemented similarly to or substantially the same as an operation of detecting that quality of a first communication link or a third communication link is less than threshold quality described in FIG. 5, so a detailed description of the operation of detecting (or identifying) that the quality of the first communication link or the third communication link is less than the threshold quality will be omitted.

In FIG. 14, it will be assumed that the quality of the first communication link established between the external electronic device 201 and the first electronic device 202 is less than the threshold quality (for example, quality degradation occurs in the first communication link) (1410). Upon detecting that the quality of the first communication link is less than the threshold quality, the external electronic device 201 may transmit, to the second electronic device 204, a signal (e.g., a replacement request packet) requesting that the second electronic device 204 transmit, to the external electronic device 201, data (e.g., audio data or first data) transmitted from the first electronic device 202 to the external electronic device 201 (1420). The replacement request packet may be implemented similarly to a replacement request packet described in Table 1, so a detailed description of the replacement request packet will be omitted.

An example of an operation in which an external electronic device 201 transmits a replacement request packet as the external electronic device 201 identifies that quality of a first communication link established between a first electronic device 202 and the external electronic device 201 is less than threshold quality will be described with reference to FIG. 15.

Figure 15:
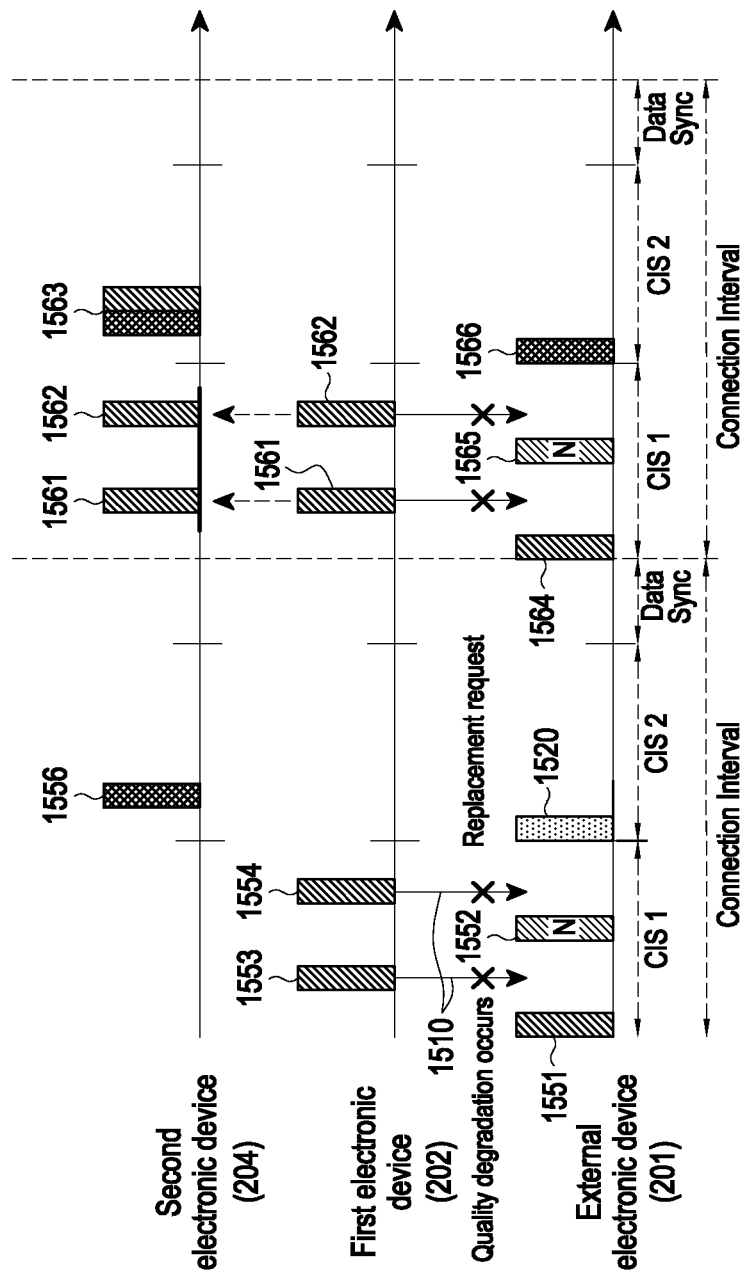
FIG. 15 is a diagram schematically illustrating an example of an operation in which an external electronic device transmits a replacement request packet in a wireless communication network according to an embodiment.

FIG. 15 is a diagram schematically illustrating an example of an operation in which an external electronic device transmits a replacement request packet in a wireless communication network according to an embodiment.

Referring to FIG. 15, a structure of a wireless communication network may be implemented similarly to a structure of a wireless communication network described in FIG. 14, so a detailed description thereof will be omitted. An external electronic device 201 (e.g., an electronic device 101 in FIG. 1, or an external electronic device 201 in FIG. 2, FIG. 3, or FIG. 4) and a first electronic device 202 (e.g., a first electronic device 202 in FIG. 2 or FIG. 4) may perform a packet transmission/reception operation through a first communication link. For example, the external electronic device 201 may transmit packets 1551 and 1552 through the first communication link, and the first electronic device 202 may transmit packets 1553 and 1554 through the first communication link. In an embodiment, a second electronic device 204 (e.g., a second electronic device 204 in FIG. 2 or FIG. 4) and the external electronic device 201 may perform a packet transmission/reception operation through a third communication link. For example, the second electronic device 204 may transmit a packet 1556 through the third communication link.

The external electronic device 201 may identify that quality of the first communication link established between the external electronic device 201 and the first electronic device 202 is less than threshold quality (for example, quality degradation occurs in the first communication link) (1510).

Upon identifying that the quality of the first communication link is less than the threshold quality, the external electronic device 201 may transmit a replacement request packet 1520 to the second electronic device 204.

Operations of the first electronic device 202, the second electronic device 204, and the external electronic device 201 in FIG. 15 may be implemented similarly to or substantially the same as operations of the first electronic device 202, the second electronic device 204, and the external electronic device 201 in FIG. 10 except that the external electronic device 201, which identifies that the quality of the first communication link is less than the threshold quality, transmits the replacement request packet 1520 to the second electronic device 204. For example, an operation related to packets 1551, 1552, 1553, 1554, and 1556 and packets 1561, 1562, 1563, 1564, 1565, and 1566 in FIG. 15 may be implemented similarly to or substantially the same as an operation related to packets 1051, 1052, 1053, 1054, and 1056 and packets 1061, 1062, 1063, 1064, 1065, and 1066, so a detailed description thereof will be omitted.

In FIG. 15, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted.

Figure 16:
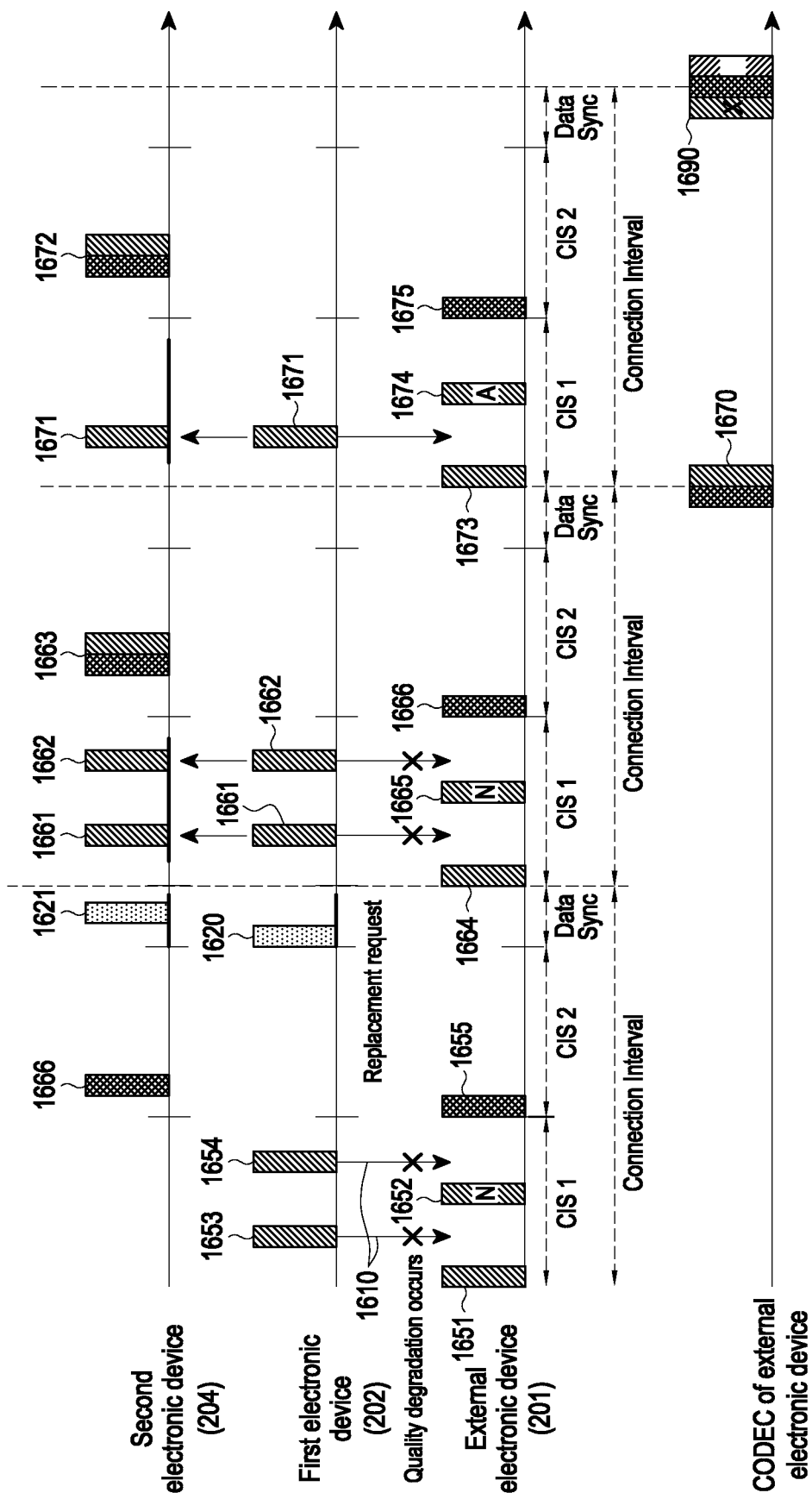
FIG. 16 is a diagram illustrating an example of an operation in which an external electronic device receives data in a wireless communication network according to an embodiment.

FIG. 16 is a diagram illustrating an example of an operation in which an external electronic device receives data in a wireless communication network according to an embodiment.

Referring to FIG. 16, a structure of a wireless communication network may be implemented similarly to a structure of a wireless communication network described in FIG. 5, so a detailed description thereof will be omitted. A first electronic device 202 (e.g., a first electronic device 202 in FIG. 2 or FIG. 4) and an external electronic device 201 (e.g., an electronic device 101 in FIG. 1, or an external electronic device 201 in FIG. 2, FIG. 3, or FIG. 4 may perform a packet transmission/reception operation through a first communication link. For example, the external electronic device 201 may transmit packets 1651 and 1652 through the first communication link, and the first electronic device 202 may transmit packets 1653 and 1654 through the first communication link. In an embodiment, a second electronic device 204 (e.g., a second electronic device 204 in FIG. 2 or FIG. 4) and the external electronic device 201 may perform a packet transmission/reception operation through a third communication link. For example, the external electronic device 201 may transmit a packet 1655 through the third communication link, and the second electronic device 204 may transmit a packet 1656 through the third communication link.

In an embodiment, as the first electronic device 202 identifies that quality of the first communication link established between the first electronic device 202 and the external electronic device 201 is less than threshold quality (e.g., quality degradation occurs) (1610), the first electronic device 202 may transmit a replacement request packet 1620 to the second electronic device 204 via the second communication link.

Upon receiving the replacement request packet 1620 from the first electronic device 202, the second electronic device 204 may receive (e.g., sniff) packets 1661 and 1662 including data (e.g., audio data or first data) transmitted from the first electronic device 202 to the external electronic device 201.

In an embodiment, the external electronic device 201 may transmit packets 1664 and 1665 through the first communication link, and may transmit a packet 1666 through the third communication link.

In an embodiment, if a set transmission scheme is a concatenation scheme, the second electronic device 204 may generate third data by concatenating the data (e.g., the first data), which is received by the second electronic device 204, transmitted from the first electronic device to the external electronic device 201, and data (e.g., second data) of the second electronic device 204, and transmit a packet 1663 including the third data to the external electronic device 201 through the third communication link established between the second electronic device 204 and the external electronic device 201.

In an embodiment, the external electronic device 201 may receive data (e.g., audio data) through the first communication link or the third communication link in each time interval (e.g., a CIS). For example, the external electronic device 201 may receive mono audio data (e.g., first mono audio data) from the first electronic device 202 in a first time period (e.g., a CIS1), and may receive mono audio data (e.g., second mono audio data) from the second electronic device 204 in a second time period (e.g., a CIS2). The external electronic device 201 may generate the first mono audio data and the second mono audio data received in the first time period and the second time period as stereo sound source data based on a set merging condition.

If quality of the first communication link established between the external electronic device 201 and the first electronic device 202 is less than threshold quality (1610), the external electronic device 201 may not receive the first mono audio data from the first electronic device 202. In an embodiment, as the first mono audio data is not received, the external electronic device 201 may use a packet loss concealment (PLC) and sound source recovery algorithm.

If the quality of the first communication link is less than the threshold quality, the first electronic device 202 may transmit a replacement request packet 1620 to the second electronic device 204, and the second electronic device 204 receiving the replacement request packet 1620 may sniff the first mono audio data transmitted from the first electronic device 202 to the external electronic device 201 to transmit the sniffed first mono audio data to the external electronic device 201.

Upon receiving the first mono audio data from the second electronic device 204, the external electronic device 201 may identify that the first mono audio data from the first electronic device 202 has recovered, and merge the first mono audio data received from the second electronic device 204 and the second mono audio data received from the second electronic device 204 to generate stereo sound source data. For example, the external electronic device 201 may merge the second mono audio data received from the second electronic device 204 and the first mono audio data received from the second electronic device 204 to generate stereo sound source data. In an embodiment, the external electronic device 201 may concatenate a pieces of mono audio data received in the same time period to generate stereo sound source data.

In an embodiment, if the data received from the second electronic device 204 is the stereo sound source data, not the second mono audio data, the external electronic device 201 may identify that the second electronic device 204 concatenate the first mono audio data transmitted from the first electronic device 202 to the external electronic device 201 and the second mono audio data to generate the stereo sound source data as the quality of the first communication link established between the first electronic device 202 and the external electronic device 201 is less than the threshold quality (1670).

In an embodiment, if the quality of the first communication link which was less than the threshold quality is greater than or equal to the threshold quality, the external electronic device 201 may receive the packet 1661 including the first mono audio data from the first electronic device 202. Because the second electronic device 204 performs a replacement operation, the second electronic device 204 may sniff the packet 1661 transmitted from the first electronic device 202 and concatenate the packet 1661 with data to be transmitted from the second electronic device 204 to generate a packet 1671. The second electronic device 204 may transmit the generated packet 1671 through the third communication link, and the external electronic device 201 may receive the packet 1671. If the data received from the second electronic device 204 is the stereo sound source data, not the second mono audio data, the external electronic device 201 may identify that the second electronic device 204 concatenate the first mono audio data transmitted from the first electronic device 202 to the external electronic device 201 and the second mono audio data to generate the stereo sound source data as the quality of the first communication link established between the first electronic device 202 and the external electronic device 201 is less than the threshold quality. Because the external electronic device 201 has received the packet 1661 from the first electronic device 202, the external electronic device 201 may discard data which corresponds to the packet 1661 among data included in the packet 1671 without processing the data (1690).

For example, the external electronic device 201 may receive the first mono audio data (e.g., the packet 1661) from the first electronic device 202 in the first time period, and may receive, from the second electronic device 204 in the second time period, the stereo sound source data (e.g., the packet 1671) in which the first mono audio data are the second mono audio data are concatenated. The external electronic device 201 may identify that the first mono audio data included in the stereo sound source data received from the second electronic device 204 is identical to the first mono audio data received from the first electronic device 202 in the first time period, and in this case, the external electronic device 201 may discard the first mono audio data received from the second electronic device 204.

In an embodiment, if the stereo sound source data received from the second electronic device 204 in the second time period is the stereo sound source data generated by performing a mixing operation on the first mono audio data and the second mono audio data, the external electronic device 201 may use, as the stereo sound source data, the stereo sound source data received from the second electronic device 204 in the second time period as it is, instead of generating the stereo sound source data by concatenating the first mono audio data received from the first electronic device 202 in the first time period and the second mono audio data included in the stereo sound source data received from the second electronic device 204 in the second time period.

According to an embodiment, the external electronic device 201 may apply a higher priority level than the first mono audio data and the second mono audio data to the stereo sound source data to which the mixing operation is applied. For example, because the higher priority level is applied to the stereo sound source data to which the mixing operation is applied compared to the first mono audio data and the second mono audio data, the stereo sound source data to which the mixing operation is applied may be used as the stereo sound source data of the external electronic device 201.

According to an embodiment, an RLF may occur in the first communication link established between the first electronic device 202 and the external electronic device 201. As the RLF occurs in the first communication link, the second electronic device 204 may perform an operation (e.g., a replacement operation) of sniffing data transmitted from the first electronic device 202 to the external electronic device 201 to transmit the sniffed data to the external electronic device 201. The first communication link may recover while the second electronic device 204 performs the replacement operation, and in this case, the second electronic device 204 may no longer need to perform the replacement operation.

An operation in which a first electronic device 202 transmits, to a second electronic device 204, a replacement release packet requesting to stop performing a replacement operation if a first communication link recovers while the second electronic device 204 performs the replacement operation on the first communication link will be described with reference to FIG. 17.

Figure 17:
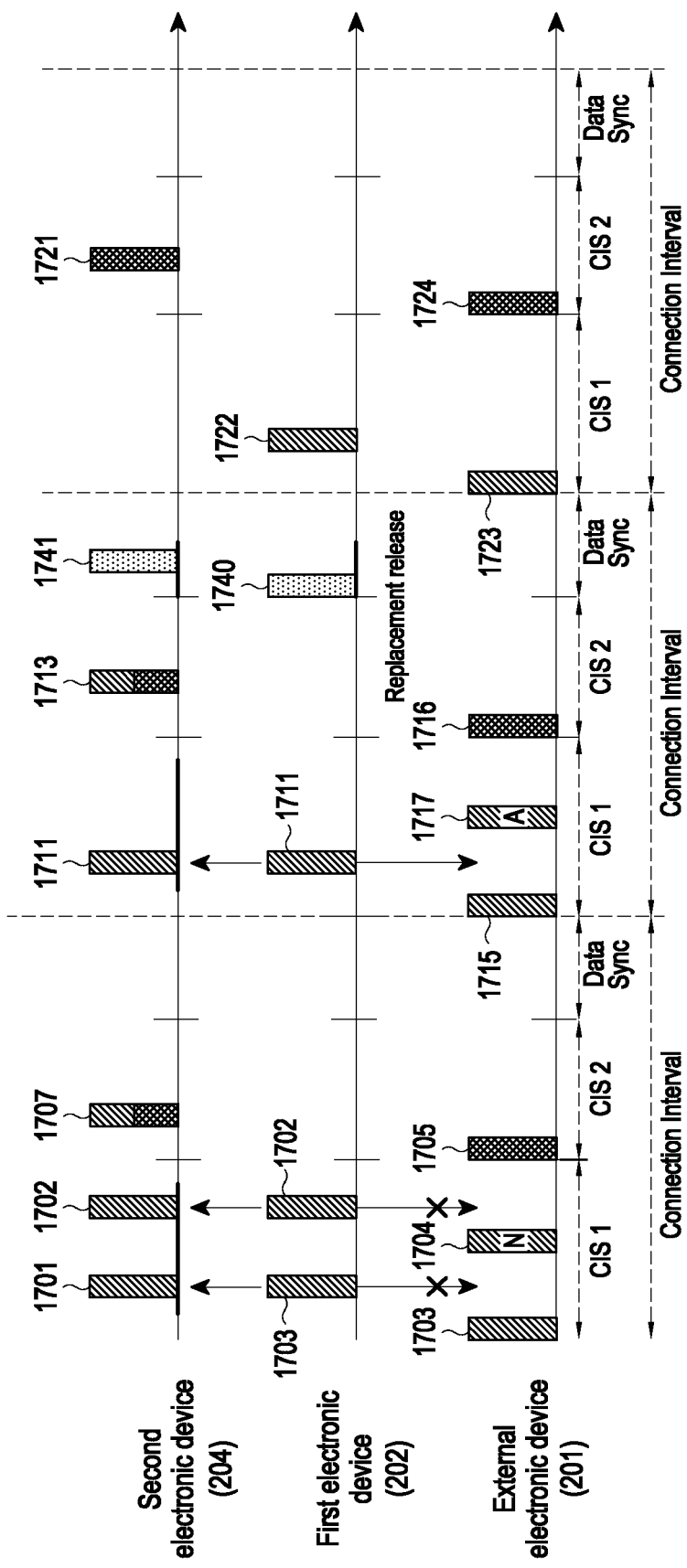
FIG. 17 is a diagram schematically illustrating an example of an operation in which a first electronic device transmits a replacement release packet in a wireless communication network according to an embodiment.

FIG. 17 is a diagram schematically illustrating an example of an operation in which a first electronic device transmits a replacement release packet in a wireless communication network according to an embodiment.

Referring to FIG. 17, a structure of a wireless communication network may be implemented similarly to a structure of a wireless communication network described in FIG. 5, so a detailed description thereof will be omitted. Operations of a first electronic device 202 (e.g., a first electronic device 202 in FIG. 2 or FIG. 4), a second electronic device 204 (e.g., a second electronic device 204 in FIG. 2 or FIG. 4), and an external electronic device 201 (e.g., an electronic device 101 in FIG. 1, or an external electronic device 201 in FIG. 2, FIG. 3, or FIG. 4) shown in FIG. 17 may be operations in a case that the second electronic device 204 receives a replacement request packet from the first electronic device 202 or the external electronic device 201 and then performs a replacement operation for the first electronic device 202 as quality of a first communication link established between the first electronic device 202 and an external electronic device 201 is less than threshold quality. The operation of the second electronic device 204 shown in FIG. 17 may be an operation in a case that a transmission scheme used to perform a replacement operation for the first electronic device 202 is a mixing scheme.

In an embodiment, the second electronic device 204 may receive (e.g., sniff) packets 1701 and 1702 transmitted from the first electronic device 202 to the external electronic device 201 through the first communication link, and generate a packet 1701 by mixing, based on the mixing scheme, data (e.g., first data) included in at least part of the sniffed packets 1701 and 1702 with data (e.g., second data) transmitted from the second electronic device 204 to the external electronic device 201. The second electronic device 204 may transmit the generated packet 1701 to the external electronic device 201 through a third communication link.

In an embodiment, the external electronic device 201 may transmit packets 1703 and 1704 through the first communication link and transmit a packet 1705 through the third communication link.

In this way, while the second electronic device 204 performs the replacement operation, the quality of the first communication link, which was less than the threshold quality, may become greater than or equal to the threshold quality. In an embodiment, an operation of identifying whether quality of a communication link is greater than or equal to threshold quality may be implemented similarly to or substantially the same as an operation of identifying whether quality of a communication link is greater than or equal to threshold quality described in FIG. 5, so a detailed description thereof will be omitted.

If the quality of the first communication link is greater than or equal to the threshold quality, the external electronic device 201 may receive normally data (e.g., audio data or first data) transmitted from the first electronic device 202 to the external electronic device 201 through the first communication link, and in this case, the second electronic device 204 may no longer need to perform the replacement operation. The first electronic device 202 may transmit, to the second electronic device 204, a replacement release packet 1740 requesting to stop the operation of sniffing the data transmitted from the first electronic device 202 to the external electronic device 201 (for example, requesting to stop the replacement operation). A replacement release packet may be implemented similarly to a replacement release packet described in Table 1, so a detailed description of the replacement release packet 1740 will be omitted.

In an embodiment, the replacement release packet 1740 may be transmitted in a Data Sync period of the second communication link established between the first electronic device 202 and the second electronic device 204. In an embodiment, the Data Sync period is a period for synchronizing the first electronic device 202 and the second electronic device 204, and the first electronic device 202 and the second electronic device 204 may exchange information for data synchronization in the Data Sync period. In an embodiment, the replacement release packet 1740 may be exchanged together with the information for data synchronization in the Data Sync period in the second communication link.

Upon receiving the replacement release packet 1740 transmitted from the first electronic device 202, the second electronic device 204 may identify that the replacement operation for the first electronic device 202 no longer needs to be performed, so the second electronic device 204 may stop the replacement operation for the first electronic device 202. As such, as the replacement operation for the first electronic device 202 is stopped, each of the first electronic device 202, the second electronic device 204, and the external electronic device 201 may perform a packet transmission/reception operation through a corresponding communication link. For example, the second electronic device 204 may transmit a packet 1721 in the third communication link, the first electronic device 202 may transmit a packet 1722 in the first communication link, and the external electronic device 201 may transmit a packet 1723 in the first communication link and transmit a packet 1724 in the third communication link.

In FIG. 17, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted. In FIG. 17, a packet marked as "A" may represent an ACK packet.

An operation in which an external electronic device 201 transmits, to a second electronic device 204, a replacement release packet requesting to stop performing a replacement operation if a first communication link recovers while the second electronic device 204 performs the replacement operation will be described with reference to FIG. 18.

Figure 18:
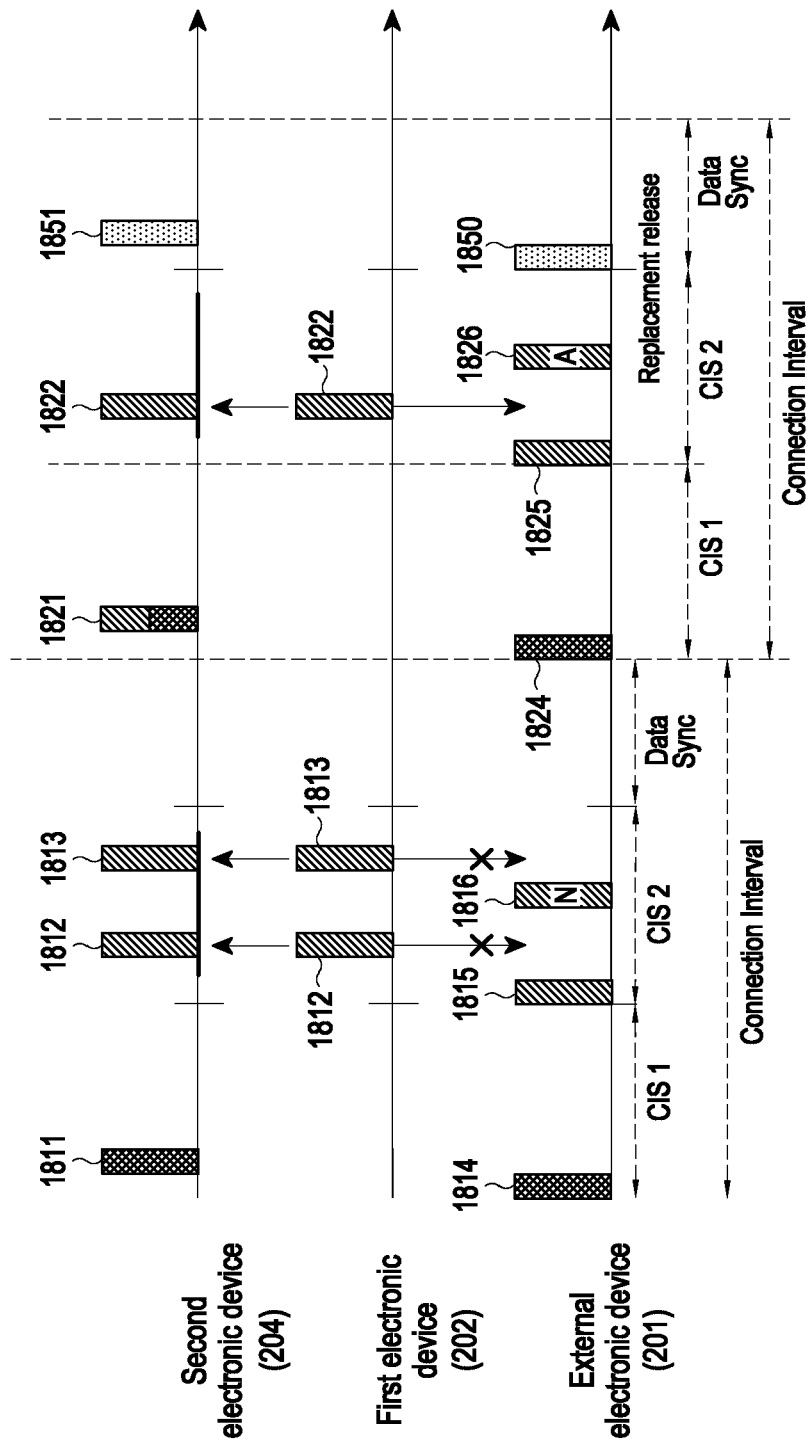
FIG. 18 is a diagram schematically illustrating an example of an operation in which an external electronic device transmits a replacement release packet in a wireless communication network according to an embodiment.

FIG. 18 is a diagram schematically illustrating an example of an operation in which an external electronic device transmits a replacement release packet in a wireless communication network according to an embodiment.

Referring to FIG. 18, a structure of a wireless communication network may be implemented similarly to a structure of a wireless communication network described in FIG. 5, so a detailed description thereof will be omitted. Operations of a first electronic device 202 (e.g., a first electronic device 202 in FIG. 2 or FIG. 4), a second electronic device 204 (e.g., a second electronic device 204 in FIG. 2 or FIG. 4), and an external electronic device 201 (e.g., an electronic device 101 in FIG. 1, or an external electronic device 201 in FIG. 2, FIG. 3, or FIG. 4) shown in FIG. 18 may be operations in a case that the second electronic device 204 receives a replacement request packet from the first electronic device 202 or the external electronic device 201 and then performs a replacement operation for the first electronic device 202 as quality of a first communication link established between the first electronic device 202 and an external electronic device 201 is less than threshold quality. The operation of the second electronic device 204 shown in FIG. 18 may be an operation in a case that a transmission scheme used to perform a replacement operation for the first electronic device 202 is a mixing scheme.

In an embodiment, the second electronic device 204 may receive (e.g., sniff) packets 1812 and 1813 transmitted from the first electronic device 202 to the external electronic device 201 through the first communication link, and generate a packet 1821 by mixing, based at least in part on the mixing scheme, data (e.g., first data) included in at least part of the sniffed packets 1812 and 1813 with data (e.g., second data) transmitted from the second electronic device 204 to the external electronic device 201. The second electronic device 204 may transmit the generated packet 1821 to the external electronic device 201 through a third communication link.

In an embodiment, the second electronic device 204 may transmit, to the external electronic device 201, a packet 1811 through the third communication link. In an embodiment, the external electronic device 201 may transmit, to the second electronic device 204, packets 1815 and 1816 through the first communication link and transmit, to the second electronic device 204, a packet 1814 through the third communication link.

In this way, while the second electronic device 204 performs the replacement operation, the quality of the first communication link, which was less than the threshold quality, may become greater than or equal to the threshold quality. In an embodiment, an operation of identifying whether quality of a communication link is greater than or equal to threshold quality may be implemented similarly to or substantially the same as an operation of identifying whether quality of a communication link is greater than or equal to threshold quality described in FIG. 5, so a detailed description thereof will be omitted.

If the quality of the first communication link is greater than or equal to the threshold quality, the external electronic device 201 may receive normally data (e.g., audio data or first data) transmitted from the first electronic device 202 to the external electronic device 201 through the first communication link, and in this case, the second electronic device 204 may no longer need to perform the replacement operation. The external electronic device 201 may transmit, to the second electronic device 204, a replacement release packet 1850 requesting to stop the operation of sniffing the data transmitted from the first electronic device 202 to the external electronic device 201 (for example, requesting to stop the replacement operation). A replacement release packet may be implemented similarly to a replacement release packet described in Table 1, so a detailed description of the replacement release packet 1850 will be omitted.

In an embodiment, the replacement release packet 1850 may be transmitted in the third communication link established between the external electronic device 201 and the second electronic device 204. Upon receiving the replacement release packet 1850 transmitted from the external electronic device 201, the second electronic device 204 may identify that the replacement operation for the first electronic device 202 no longer needs to be performed, so the second electronic device 204 may stop the replacement operation for the first electronic device 202. Although not separately shown in FIG. 18, as described in FIG. 17, as the replacement operation for the first electronic device 202 is stopped, each of the first electronic device 202, the second electronic device 204, and the external electronic device 201 may perform a packet transmission/reception operation through a corresponding communication link.

In FIG. 18, for example, a packet marked as "N" may represent a NACK packet, and an operation of the first electronic device 202 receiving the NACK packet may be implemented similarly to or substantially the same as an operation of the first electronic device 202 described in FIG. 10, so a detailed description thereof will be omitted. In FIG. 18, a packet marked as "A" may represent an ACK packet.

A process in which a second electronic device 204 automatically performs a replacement operation for a first electronic device 202 in a wireless communication network will be described with reference to FIG. 19.

Figure 19:
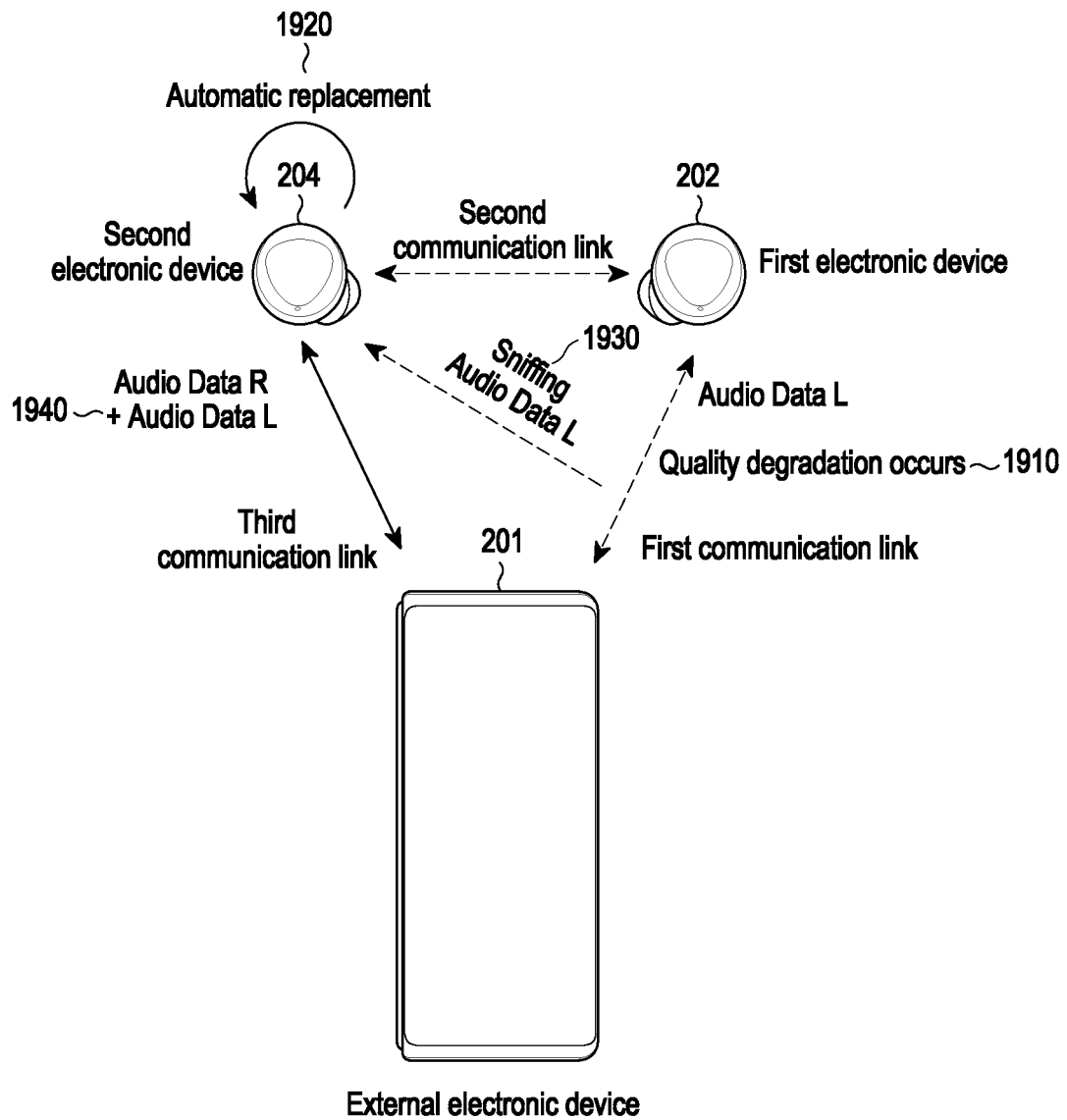
FIG. 19 is a diagram schematically illustrating an example of a process in which a second electronic device automatically performs a replacement operation for a first electronic device in a wireless communication network according to an embodiment.

FIG. 19 is a diagram schematically illustrating an example of a process in which a second electronic device automatically performs a replacement operation for a first electronic device in a wireless communication network according to an embodiment.

Referring to FIG. 19, a structure of a wireless communication network may be implemented similarly to a structure of a wireless communication network described in FIG. 5, so a detailed description thereof will be omitted. In a first electronic device 202 (e.g., a first electronic device 202 in FIG. 2 or FIG. 4) or a second electronic device 204 (e.g., a second electronic device 204 in FIG. 2 or FIG. 4), a replacement operation may be automatically triggered (1920) based on a set condition (1910).

In an embodiment, a condition that the first electronic device 202 automatically performs the replacement operation may include at least one of a condition that quality of a third communication link established between the second electronic device 204 and an external electronic devices 201 (e.g., an electronic device 101 in FIG. 1 or an external electronic device 201 in FIG. 3) is less than threshold quality, and/or a condition that the first communication link established between the first electronic device 202 and the external electronic device 201 is not used while the first electronic device 202, the second electronic device 204, and the external electronic device 201 cooperate to provide a service (e.g., an audio service or a binaural recording service). For example, the first communication link may not be used if a call is made using only a microphone included in the second electronic device 204 while the first electronic device 202, the second electronic device 204, and the external electronic device 201 cooperate to provide a call service. In the disclosure, although a case that the condition that the first electronic device 202 automatically performs the replacement operation is at least one of the condition that the quality of the third communication link is less than the threshold quality and/or the condition that the first communication link is not used has been described as an example, the condition that the first electronic device 202 automatically performs the replacement operation is not limited thereto.

In an embodiment, a condition that the second electronic device 204 automatically performs the replacement operation may include at least one of a condition that quality of the first communication link established between the first electronic device 202 and the external electronic devices 201 is less than the threshold quality, or a condition that the third communication link established between the second electronic device 204 and the external electronic device 201 is not used while the first electronic device 202, the second electronic device 204, and the external electronic device 201 cooperate to provide the service. For example, the third communication link may not be used if a call is made using only a microphone included in the first electronic device 202 while the first electronic device 202, the second electronic device 204, and the external electronic device 201 cooperate to provide a call service. In the disclosure, although a case that the condition that the second electronic device 204 automatically performs the replacement operation is at least one of the condition that the quality of the first communication link is less than the threshold quality and/or the condition that the third communication link is not used has been described as an example, the condition that the second electronic device 204 automatically performs the replacement operation is not limited thereto.

In FIG. 19, it will be assumed that the replacement operation is automatically triggered in the second electronic device 204. In this case, the second electronic device 204 may automatically perform the replacement operation even if the second electronic device 204 does not receive a separate replacement request packet from the first electronic device 202 or the external electronic device 201. Replacement operations 1930 and 1940 for the first electronic device 202 performed by the second electronic device 204 may be implemented similarly to replacement operations 530 and 540 for the first electronic device 202 performed by the second electronic device 204 described in FIG. 5, so a detailed description thereof will be omitted.

In embodiments of the disclosure, upon performing a replacement operation for a first electronic device (e.g., a first electronic device 202 in FIG. 2 or FIG. 4), a second electronic device (e.g., a second electronic device 204 in FIG. 2 or FIG. 4) may sniff data (e.g., first data) transmitted from the first electronic device to an external electronic device (e.g., an electronic device 101 in FIG. 1, or an external electronic device 201 in FIG. 2, FIG. 3, or FIG. 4).

In an embodiment, the second electronic device may identify that an error occurs in at least part of the data of the first electronic device sniffed by the second electronic device, and in this case, the second electronic device may not transmit, to the external electronic device, the data in which the error occurs instead of the first electronic device.

In an embodiment, if there is no data transmitted from the first electronic device to the external electronic device for set time after the replacement request packet is received from the first electronic device, the second electronic device may terminate the replacement operation for the first electronic device. For example, a case that there is no data transmitted from the first electronic device to the external electronic device for the set time may be a case that the data transmitted from the first electronic device to the external electronic device does not actually exist, or a case that it is impossible for the second electronic device to receive the data even if there is the data transmitted from the first electronic device to the external electronic device for the set time. In this case, the external electronic device may output, on a screen through a UI, information (e.g., a message) indicating that reception sensitivity for the first electronic device is less than threshold sensitivity.

In an embodiment, upon performing a replacement operation for the first electronic device, the second electronic device may sniff data transmitted from the first electronic device to the external electronic device. The second electronic device may transmit, to the external electronic device, only data which is sniffed within set time from a corresponding transmission time point among sniffed data. For example, even if the second electronic device sniffs data transmitted from the first electronic device to the external electronic device, if the set time has elapsed from time when the second electronic device sniffs corresponding data, the sniffed data may not be transmitted to the external electronic device.

In an embodiment, while the second electronic device performs the replacement operation for the first electronic device, quality of the third communication link between the second electronic device and the external electronic device may be less than threshold quality. If the quality of the third communication link is less than the threshold quality, the second electronic device may transmit a replacement release packet to the first electronic device through the second communication link. This case may be because the data transmitted from the first electronic device to the external electronic device may not be normally sniffed by the second electronic device to be transmitted to the external electronic device because the quality of the third communication link between the second electronic device and the external electronic device is also less than the threshold quality even if the second electronic device performs the replacement operation on the first electronic device.

In an embodiment, while the second electronic device performs the replacement operation for the first electronic device, the quality of the third communication link between the second electronic device and the external electronic device may be less than the threshold quality, and the quality of the first communication link between the first electronic device and the external electronic device may be greater than or equal to the threshold quality. In this case, the external electronic device may transmit a replacement release packet to the first electronic device and transmit, to the first electronic device, a replacement request packet requesting to perform a replacement operation for the second electronic device.

Figure 21A:
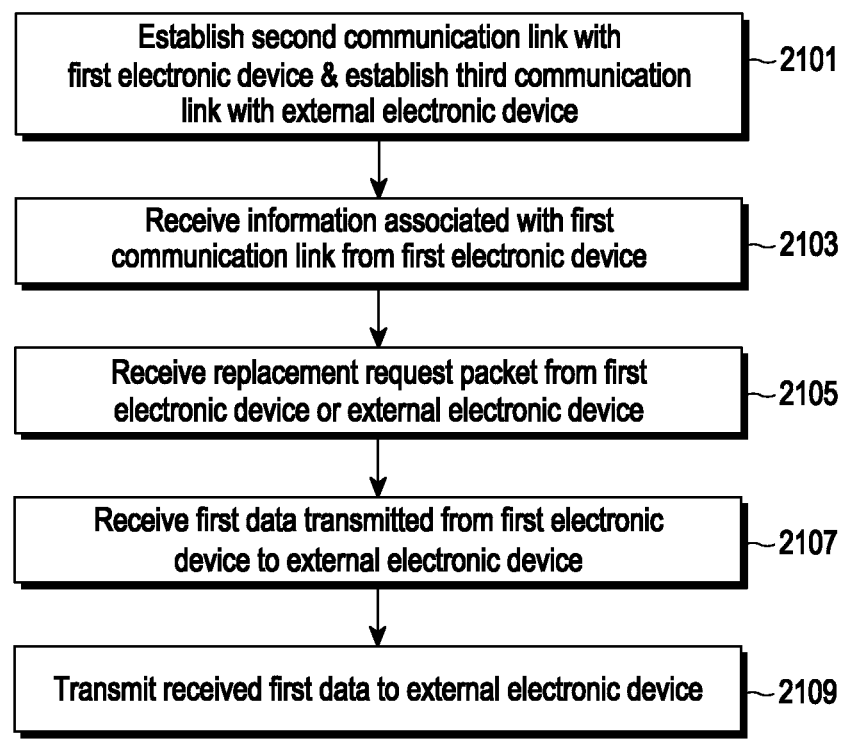
FIG. 21A is a flowchart illustrating an example of an operation process of a second electronic device in a wireless communication network according to an embodiment.

FIG. 21A is a flowchart illustrating an example of an operation process of a second electronic device in a wireless communication network according to an embodiment.

Referring to FIG. 21A, in operation 2101, a processor (e.g., a processor 410 in FIG. 4) of a second electronic device (e.g., a second electronic device 204 in FIG. 2 or FIG. 4) may establish, via a communication circuit (e.g., a communication circuit 420 in FIG. 4), a communication link (e.g., a second communication link) with a first electronic device (e.g., a first electronic device 202 in FIG. 2 or FIG. 4), and may establish, via the communication circuit, a communication link (e.g., a third communication link) with an external electronic device (e.g., an electronic device 101 in FIG. 1 or an external electronic device 201 in FIG. 2, FIG. 3, or FIG. 4). An operation of establishing the second communication link between the second electronic device and the first electronic device may be implemented similarly to or substantially the same as an operation of establishing a second communication link between a second electronic device 204 and a first electronic device 202 described in FIG. 9, so a detailed description thereof will be omitted. An operation of establishing the third communication link between the second electronic device and the external electronic device may be implemented similarly to or substantially the same as an operation of establishing a third communication link between a second electronic device 204 and an external electronic device 201 described in FIG. 8, so a detailed description thereof will be omitted.

The processor of the second electronic device may receive, from the first electronic device via the communication circuit, information associated with a communication link (e.g., a first communication link) established between the first electronic device and the external electronic device in operation 2103. In an embodiment, the information associated with the first communication link may include a CIS parameter, and the CIS parameter may be implemented similarly to or substantially the same as a CIS parameter described in FIG. 9, so a detailed description thereof will be omitted.

While providing an audio service (e.g., a binaural recording service) together with the first electronic device and the external electronic device, the processor of the second electronic device receiving the information associated with the first communication link may receive, from the first electronic device or the external electronic device via the communication circuit, a signal (e.g., a replacement request packet) requesting that the second electronic device transmit, to the external electronic device, data (e.g., first data) transmitted from the first electronic device to the external electronic device instead of the first electronic device in operation 2105. An operation in which the processor of the second electronic device receives the replacement request packet from the first electronic device may be implemented similarly to or substantially the same as an operation in which a second electronic device 204 receives a replacement request packet 1020 from a first electronic device 202 described in FIG. 10, so a detailed description thereof will be omitted. An operation in which the processor of the second electronic device receives the replacement request packet from the external electronic device may be implemented similarly to or substantially the same as an operation in which a second electronic device 204 receives a replacement request packet 1520 described in FIG. 15 from an external electronic device 201, so a detailed description thereof will be omitted.

Upon receiving the replacement request packet from the first electronic device or the external electronic device, the processor of the second electronic device may identify that a replacement operation needs to be performed for the first electronic device in the first communication link, and in operation 2107, may receive (e.g., sniff), via the communication circuit, the first data transmitted from the first electronic device to the external electronic device in the first communication link.

Upon receiving the first data, the processor of the second electronic device may transmit, via the communication circuit, the received first data to the external electronic device in operation 2109. An operation in which the processor of the second electronic device transmits the first data to the external electronic device may be similarly to or substantially the same as an operation in which a second electronic device 204 transmits first data to an external electronic device 201 described in FIG. 12, so a detailed description thereof will be omitted.

Figure 21B:
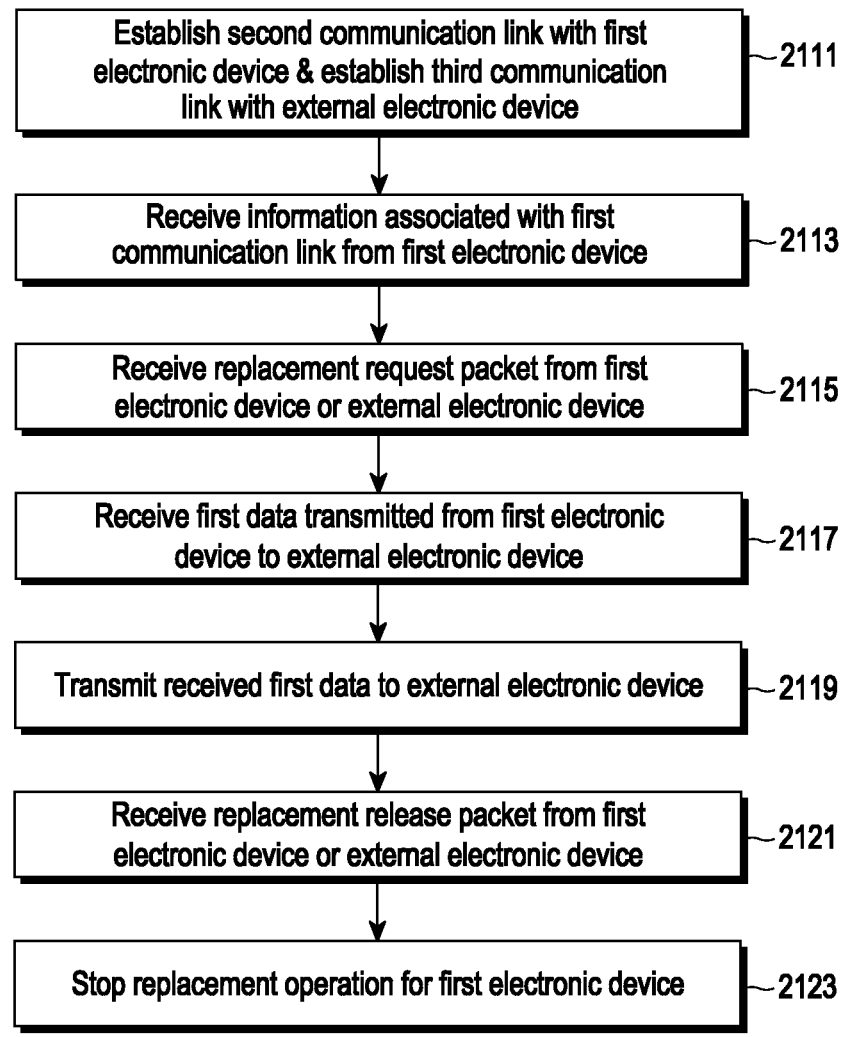
FIG. 21B is a flowchart illustrating another example of an operation process of a second electronic device in a wireless communication network according to an embodiment.

FIG. 21B is a flowchart illustrating another example of an operation process of a second electronic device in a wireless communication network according to an embodiment.

Referring to FIG. 21B, operations 2111 to 2119 may be implemented similarly to or substantially the same as operations 2101 to 2109 described in to FIG. 21A, so a detailed description thereof will be omitted.

While performing a replacement operation for a first electronic device (e.g., a first electronic device 202 in FIG. 2 or FIG. 4) in a first communication link, a processor (e.g., a processor 410 in FIG. 4) of a second electronic device (e.g., a second electronic device 204 in FIG. 2 or FIG. 4) may receive, from the first electronic device or an external electronic device (e.g., an electronic device in FIG. 1 or an external electronic device 201 in FIG. 2, FIG. 3, or FIG. 4) via a communication circuit (e.g., a communication circuit 420 in FIG. 4), a signal (e.g., a replacement release packet) requesting to stop an operation (e.g., a replacement operation) in which the second electronic device transmits, to the external electronic device, first data transmitted from the first electronic device to the external electronic device in operation 2121. An operation in which the processor of the second electronic device receives the replacement release packet from the first electronic device may be implemented similarly to or substantially the same as an operation in which a second electronic device 204 receives a replacement request packet 1740 from a first electronic device 202 described in FIG. 17, so a detailed description thereof will be omitted. An operation in which the processor of the second electronic device receives the replacement release packet from the external electronic device may be implemented similarly to or substantially the same as an operation in which a second electronic device 204 receives a replacement request packet 1850 from an external electronic device 201 described in FIG. 18, so a detailed description thereof will be omitted.

Upon receiving the replacement release packet from the first electronic device or the external electronic device, the processor of the second electronic device may identify that the replacement operation needs to be stopped, and in operation 2123, may stop the replacement operation for the first electronic device.

Figure 22A:
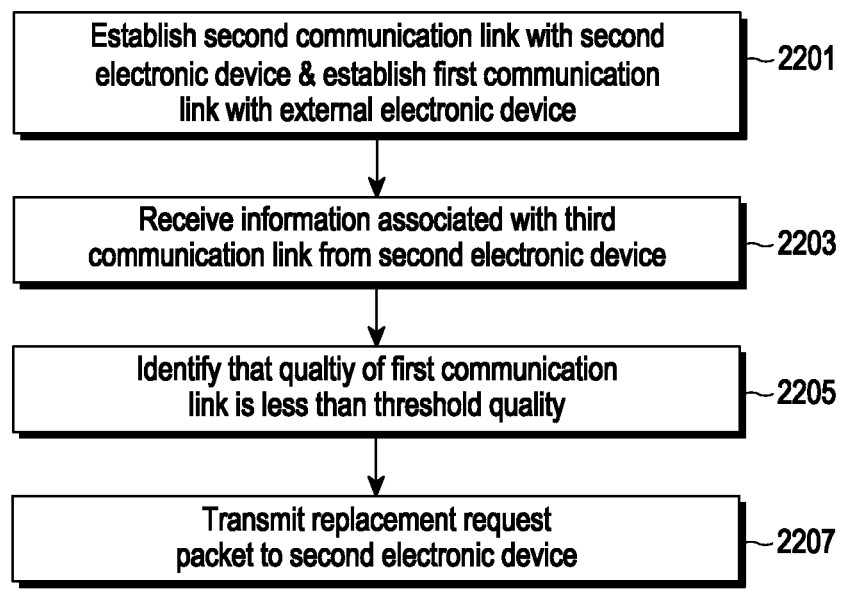
FIG. 22A is a flowchart illustrating an example of an operation process of a first electronic device in a wireless communication network according to an embodiment.

FIG. 22A is a flowchart illustrating an example of an operation process of a first electronic device in a wireless communication network according to an embodiment.

Referring to FIG. 22A, in operation 2201, a processor (e.g., a processor 410 in FIG. 4) of a first electronic device (e.g., a first electronic device 202 in FIG. 2 or FIG. 4) may establish, via a communication circuit (e.g., a communication circuit 420 in FIG. 4), a communication link (e.g., a second communication link) with a second electronic device (e.g., a second electronic device 204 in FIG. 2 or FIG. 4), and may establish, via the communication circuit, a communication link (e.g., a first communication link) with an external electronic device (e.g., an electronic device 101 in FIG. 1 or an external electronic device 201 in FIG. 2, FIG. 3, or FIG. 4). An operation of establishing the second communication link between the first electronic device and the second electronic device may be implemented similarly to or substantially the same as an operation of establishing a second communication link between a first electronic device 202 and a second electronic device 204 described in FIG. 9, so a detailed description thereof will be omitted. An operation of establishing the first communication link between the second electronic device and the external electronic device may be implemented similarly to or substantially the same as an operation of establishing a first communication link between a first electronic device 202 and an external electronic device 201 described in FIG. 6, so a detailed description thereof will be omitted.

Upon establishing the second communication link with the second electronic device, the processor of the first electronic device may receive, from the second electronic device via the communication circuit, information associated with a communication link (e.g., a third communication link) established between the second electronic device and the external electronic device in operation 2203. In an embodiment, the information associated with the third communication link may include a CIS parameter, and the CIS parameter may be implemented similarly to or substantially the same as a CIS parameter described in FIG. 9, so a detailed description thereof will be omitted.

While providing an audio service (e.g., a binaural recording service) together with the second electronic device and the external electronic device, the processor of the first electronic device receiving the information associated with the third communication link may identify that quality of the first communication link is less than threshold quality in operation 2205. An operation of identifying that the quality of the first communication link is less than the threshold quality may be implemented similarly to or substantially the same as an operation of identifying that quality of a first communication link is less than threshold quality described in FIG. 5, so a detailed description of the operation of identifying that the quality of the first communication link is less than the threshold quality will be omitted.

Upon identifying that the quality of the first communication link is less than the threshold quality, the processor of the first electronic device may transmit, to the second electronic device via the communication circuit, a signal (e.g., a replacement request packet) requesting that the second electronic device transmit, to the external electronic device, data (e.g., first data) transmitted from the first electronic device to the external electronic device in operation 2207. An operation in which the processor of the first electronic device transmits the replacement request packet to the second electronic device may be implemented similarly to or substantially the same as an operation in which a first electronic device 202 transmits a replacement request packet 1020 to a second electronic device 204 described in FIG. 10, so a detailed description thereof will be omitted.

Figure 22B:
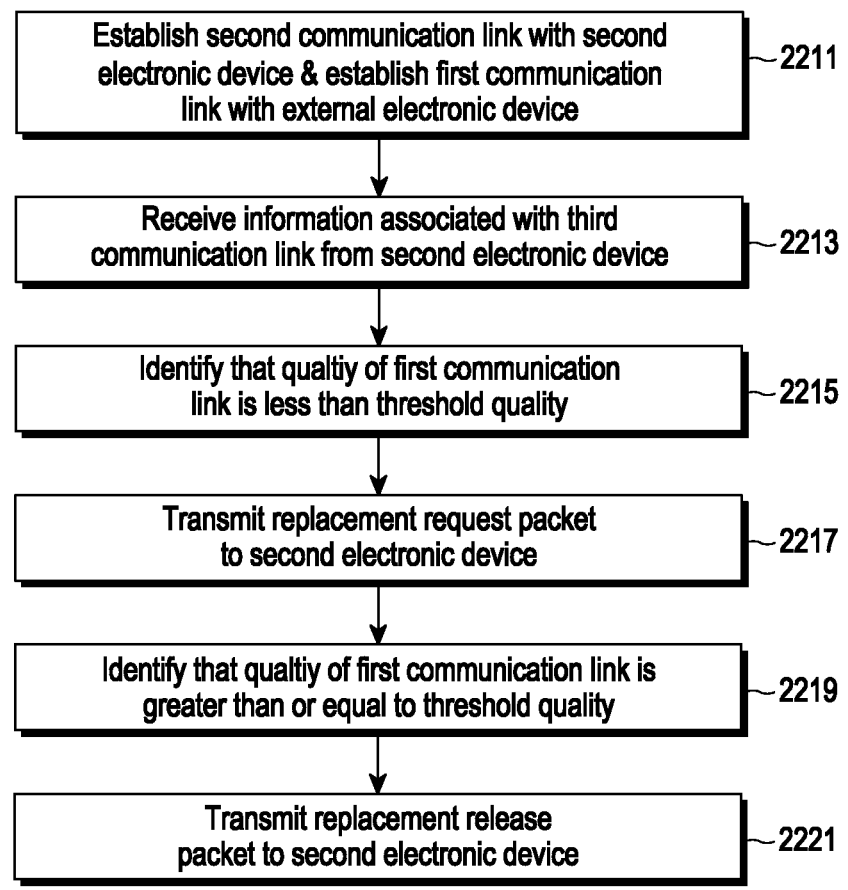
FIG. 22B is a flowchart illustrating another example of an operation process of a first electronic device in a wireless communication network according to an embodiment.

FIG. 22B is a flowchart illustrating another example of an operation process of a first electronic device in a wireless communication network according to an embodiment.

Referring to FIG. 22B, operations 2211 to 2217 may be implemented similarly to or substantially the same as operations 2201 to 2207 described in to FIG. 22A, so a detailed description thereof will be omitted. A processor (e.g., a processor 410 in FIG. 4) of a first electronic device (e.g., a first electronic device 202 in FIG. 2 or FIG. 4) transmitting a replacement request packet may identify that quality of a first communication link which was less than threshold quality is greater than or equal to the threshold quality in operation 2219. In an embodiment, an operation of identifying that the quality of the first communication link is greater than or equal to the threshold quality may be implemented similar to or substantially the same as an operation of identifying that quality of a first communication link is greater than or equal to threshold quality described in FIG. 5 or FIG. 17, so a detailed description thereof will be omitted.

If the quality of the first communication link is greater than or equal to the threshold quality, the external electronic device may normally receive the first data transmitted from the first electronic device to the external electronic device through the first communication link, and in this case, the second electronic device may no longer need to perform the replacement operation. In operation 2221, the processor of the first electronic device may transmit, to the second electronic device via a communication circuit (e.g., a communication circuit 420 in FIG. 4), a replacement release packet requesting to stop an operation of sniffing the data transmitted from the first electronic device to the external electronic device (for example, requesting to stop the replacement operation). An operation in which the processor of the first electronic device transmits the replacement release packet to the second electronic device may be implemented similarly to or substantially the same as an operation in which a first electronic device 202 transmits a replacement release packet 1740 to a second electronic device 204 described in FIG. 17, so a detailed description thereof will be omitted.

Figure 23A:
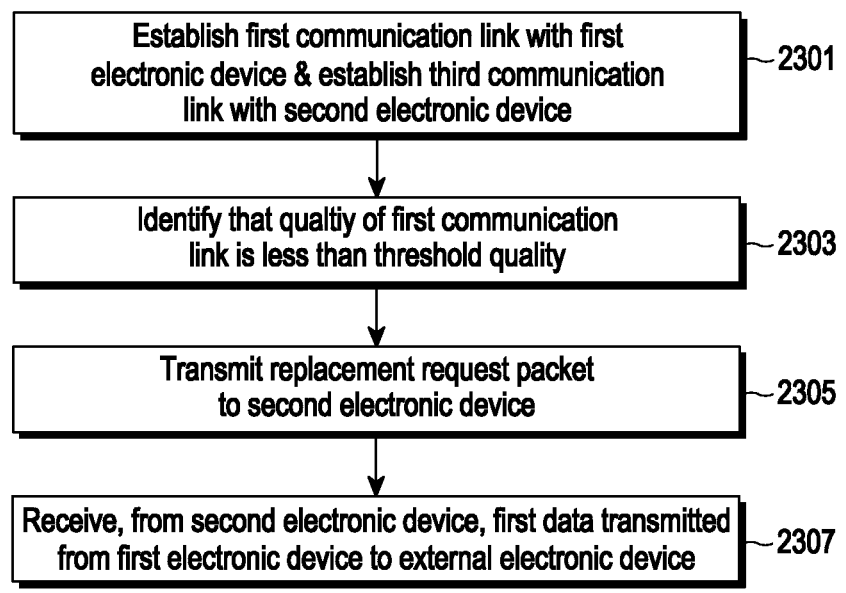
FIG. 23A is a flowchart illustrating an example of an operation process of an external electronic device in a wireless communication network according to an embodiment.

FIG. 23A is a flowchart illustrating an example of an operation process of an external electronic device in a wireless communication network according to an embodiment.

Referring to FIG. 23A, in operation 2301, a processor (e.g., a processor 120 in FIG. 1 or a processor 304 in FIG. 3) of an external electronic device (e.g., an electronic device 101 in FIG. 1, or an external electronic device 201 in FIG. 2, FIG. 3, or FIG. 4) may establish, via a communication circuit (e.g., a communication module 190 in FIG. 1 or a communication circuit 302 in FIG. 3), a communication link (e.g., a first communication link) with a first electronic device (e.g., a first electronic device 202 in FIG. 2 or FIG. 4), and may establish, via the communication circuit, a communication link (e.g., a third communication link) with a second electronic device (e.g., a second electronic device 204 in FIG. 2 or FIG. 4). An operation of establishing the first communication link between the external electronic device and the first electronic device may be implemented similarly to or substantially the same as an operation of establishing a first communication link between an external electronic device 201 and a first electronic device 202 described in FIG. 6, so a detailed description thereof will be omitted. An operation of establishing the third communication link between the external electronic device and the second electronic device may be implemented similarly to or substantially the same as an operation of establishing a third communication link between an external electronic device 201 and a second electronic device 204 described in FIG. 8, so a detailed description thereof will be omitted.

While providing an audio service (e.g., a binaural recording service) together with the first electronic device and the second electronic device, the processor of the external electronic device may identify that quality of the first communication link is less than threshold quality in operation 2303. An operation of identifying that the quality of the first communication link is less than the threshold quality may be implemented similarly to or substantially the same as an operation of identifying that quality of a first communication link is less than threshold quality described in FIG. 5, so a detailed description of the operation of identifying that the quality of the first communication link is less than the threshold quality will be omitted.

Upon identifying that the quality of the first communication link is less than the threshold quality, the processor of the external electronic device may transmit, to the second electronic device via the communication circuit, a signal (e.g., a replacement request packet) requesting that the second electronic device sniff data (e.g., first data) transmitted from the first electronic device to the external electronic device to transmit the data to the external electronic device instead of the first electronic device in operation 2305. An operation in which the processor of the external electronic device transmits the replacement request packet to the second electronic device may be implemented similarly to or substantially the same as an operation in which an external electronic device 201 transmits a replacement request packet 1520 to a second electronic device 204 described in FIG. 15, so a detailed description thereof will be omitted.

The processor of the external electronic device transmitting the replacement request packet may receive first data from the second electronic device via the communication circuit in operation 2307. An operation in which the processor of the external electronic device receives the first data from the second electronic device may be implemented similarly to or substantially the same as an operation in which an external electronic device 201 receives first data from a second electronic device 204 described in FIG. 12, so a detailed description thereof will be omitted.

Figure 23B:
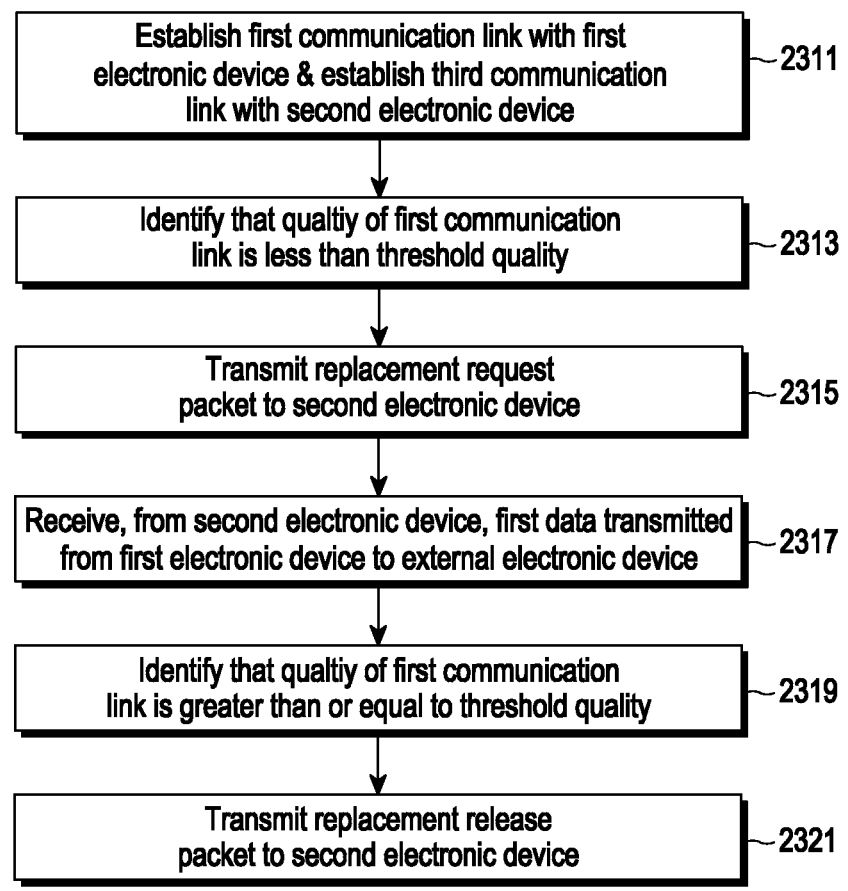
FIG. 23B is a flowchart illustrating another example of an operation process of an external electronic device in a wireless communication network according to an embodiment.

FIG. 23B is a flowchart illustrating another example of an operation process of an external electronic device in a wireless communication network according to an embodiment.

Referring to FIG. 23B, operations 2311 to 2317 may be implemented similarly to or substantially the same as operations 2301 to 2307 described in to FIG. 23A, so a detailed description thereof will be omitted.

As such, while receiving first data from a second electronic device (e.g., a second electronic device 204 in FIG. 2 or FIG. 4), a processor (e.g., a processor 120 in FIG. 1 or a processor 304 in FIG. 3) of an external electronic device (e.g., an electronic device 101 in FIG. 1 or an external electronic device 201 in FIG. 2, FIG. 3, or FIG. 4) may identify that quality of a first communication link which was less than threshold quality is greater than or equal to the threshold quality in operation 2319. In an embodiment, an operation of identifying that the quality of the first communication link is greater than or equal to the threshold quality may be implemented similar to or substantially the same as an operation of identifying that quality of a first communication link is greater than or equal to threshold quality described in FIG. 5 or FIG. 17, so a detailed description thereof will be omitted.

If the quality of the first communication link is greater than or equal to the threshold quality, the external electronic device may normally receive the first data transmitted from the first electronic device to the external electronic device through the first communication link, and in this case, a second electronic device (e.g., a second electronic device 204 in FIG. 2 or FIG. 4) may no longer need to perform the replacement operation. In operation 2321, the processor of the external electronic device may transmit, to the second electronic device via the communication circuit, a replacement release packet requesting to stop an operation of sniffing the data transmitted from the first electronic device to the external electronic device (for example, requesting to stop the replacement operation). An operation in which the processor of the external electronic device transmits the replacement release packet to the second electronic device may be implemented similarly to or substantially the same as an operation in which an external electronic device 201 transmits a replacement release packet 1850 to a second electronic device 204 described in FIG. 18, so a detailed description thereof will be omitted.

According to an embodiment of the disclosure, an operating method of an electronic device (e.g., a second electronic device 204 in FIG. 2 or FIG. 4) may include receiving, from an external electronic device (e.g., a first electronic device 202 in FIG. 2 or FIG. 4), information associated with a communication link established between the external electronic device (e.g., the first electronic device 202 in FIG. 2 or FIG. 4) and another external electronic device (e.g., an electronic device 101 in FIG. 1 or an external electronic device 201 in FIG. 2, FIG. 3, or FIG. 4).

According to an embodiment of the disclosure, the operating method may further include, receiving, from the external electronic device (e.g., the first electronic device 202 in FIG. 2 or FIG. 4), a request that the electronic device (e.g., the second electronic device 204 in FIG. 2 or FIG. 4) transmit, to the other external electronic device (e.g., the electronic device 101 in FIG. 1 or the external electronic device 201 in FIG. 2, FIG. 3, or FIG. 4), first data transmitted from the external electronic device (e.g., the first electronic device 202 in FIG. 2 or FIG. 4) to the other external electronic device (e.g., the electronic device 101 in FIG. 1 or the external electronic device 201 in FIG. 2, FIG. 3, or FIG. 4) instead of the external electronic device (e.g., the first electronic device 202 in FIG. 2 or FIG. 4).

According to an embodiment of the disclosure, the operating method may further include, in response to the request, receiving, the first data transmitted from the external electronic device (e.g., the first electronic device 202 in FIG. 2 or FIG. 4) to the other external electronic device (e.g., the electronic device 101 in FIG. 1 or the external electronic device 201 in FIG. 2, FIG. 3, or FIG. 4).

According to an embodiment of the disclosure, the operating method may further include, transmitting, to the other external electronic device (e.g., the electronic device 101 in FIG. 1 or the external electronic device 201 in FIG. 2, FIG. 3, or FIG. 4), the received first data instead of the external electronic device (e.g., the first electronic device 202 in FIG. 2 or FIG. 4).

According to an embodiment of the disclosure, the request may be received if quality of the communication link is less than threshold quality.

According to an embodiment of the disclosure, the request may include information about a time point at which the electronic device (e.g., the second electronic device 204 in FIG. 2 or FIG. 4) starts receiving the first data.

According to an embodiment of the disclosure, transmitting the received first data to the other external electronic device (e.g., the electronic device 101 in FIG. 1 or the external electronic device 201 in FIG. 2, FIG. 3, or FIG. 4) may include transmitting, to the other external electronic device (e.g., the electronic device 101 in FIG. 1 or the external electronic device 201 in FIG. 2, FIG. 3, or FIG. 4), the received first data together with second data transmitted from the electronic device (e.g., the second electronic device 204 in FIG. 2 or FIG. 4) to the other external electronic device (e.g., the electronic device 101 in FIG. 1 or the external electronic device 201 in FIG. 2, FIG. 3, or FIG. 4).

According to an embodiment of the disclosure, the method may further include receiving, from the external electronic device (e.g., the first electronic device 202 in FIG. 2 or FIG. 4), a request for the electronic device (e.g., the second electronic device 204 in FIG. 2 or FIG. 4) to stop receiving the first data, and in response to the request to stop receiving the first data, stopping receiving the first data.

According to an embodiment of the disclosure, the request to stop receiving the first data may be received if quality of the communication link is greater than or equal to threshold quality.

According to an embodiment of the disclosure, the request to stop receiving the first data may include information about a time point at which the electronic device (e.g., the second electronic device 204 in FIG. 2 or FIG. 4) stops receiving the first data.

According to an embodiment of the disclosure, a time period in which the electronic device (e.g., the second electronic device 204 in FIG. 2 or FIG. 4) receives the request from the external electronic device (e.g., the first electronic device 202 in FIG. 2 or FIG. 4) may precede a time period in which the electronic device (e.g., the second electronic device 204 in FIG. 2 or FIG. 4) transmits, to the other external electronic device (e.g., the electronic device 101 in FIG. 1 or the external electronic device 201 in FIG. 2, FIG. 3, or FIG. 4), the received first data instead of the external electronic device (e.g., the first electronic device 202 in FIG. 2 or FIG. 4).

According to an embodiment of the disclosure, an operating method of an electronic device (e.g., a second electronic device 204 in FIG. 2 or FIG. 4) may include transmitting, to an external electronic device (e.g., a first electronic device 202 in FIG. 2 or FIG. 4), information associated with a communication link established between the electronic device (e.g., the second electronic device 204 in FIG. 2 or FIG. 4) and another external electronic device (e.g., an electronic device 101 in FIG. 1, or an external electronic device 201 in FIG. 2, FIG. 3, or FIG. 4).

According to an embodiment of the disclosure, the operating method may further include identifying that quality of the communication link is less than threshold quality.

According to an embodiment of the disclosure, the operating method may further include, in response to identifying that the quality of the communication link is less than the threshold quality, transmitting, to the external electronic device (e.g., the first electronic device 202 in FIG. 2 or FIG. 4), a request that the external electronic device (e.g., the first electronic device 202 in FIG. 2 or FIG. 4) receive first data transmitted from the electronic device (e.g., the second electronic device 204 in FIG. 2 or FIG. 4) to the other external electronic device (e.g., the electronic device 101 in FIG. 1, or the external electronic device 201 in FIG. 2, FIG. 3, or FIG. 4) to transmit, to the other external electronic device (e.g., the electronic device 101 in FIG. 1, or the external electronic device 201 in FIG. 2, FIG. 3, or FIG. 4), the first data instead of the electronic device (e.g., the second electronic device 204 in FIG. 2 or FIG. 4).

According to an embodiment of the disclosure, the operating method may further include transmitting the first data to the other external electronic device (e.g., the electronic device 101 in FIG. 1, or the external electronic device 201 in FIG. 2, FIG. 3, or FIG. 4).

According to an embodiment of the disclosure, identifying that the RLF occurs in the communication link may include identifying that the quality of the communication link is less than the threshold quality based on at least one of a noise level, a bit error rate (BER), a packet error rate (PER), packet retransmission time, a number of transmitted packets in each unit time, or a retransmission ratio.

According to an embodiment of the disclosure, the request may include information about a time point at which the external electronic device (e.g., the first electronic device 202 in FIG. 2 or FIG. 4) starts receiving the first data.

According to an embodiment of the disclosure, the operating method may further include identifying that the quality of the communication link is greater than or equal to the threshold quality, and in response to identifying that the quality of the communication link is greater than or equal to the threshold quality, transmitting, to the external electronic device (e.g., the first electronic device 202 in FIG. 2 or FIG. 4), a request for the external electronic device (e.g., the first electronic device 202 in FIG. 2 or FIG. 4) to stop receiving the first data.

According to an embodiment of the disclosure, the request to stop receiving the first data may include information about a time point at which the external electronic device (e.g., the first electronic device 202 in FIG. 2 or FIG. 4) stops receiving the first data.

According to an embodiment of the disclosure, an operating method of an electronic device (e.g., an electronic device 101 in FIG. 1, or an external electronic device 201 in FIG. 2, FIG. 3, or FIG. 4) may include identifying that quality of a communication link established between the electronic device (e.g., the electronic device 101 in FIG. 1, or the external electronic device 201 in FIG. 2, FIG. 3, or FIG. 4) and an external electronic device (e.g., a first electronic device 202 in FIG. 2 or FIG. 4) is less than threshold quality.

According to an embodiment of the disclosure, the operating method may further include, in response to identifying that the quality of the communication link is less than the threshold quality, transmitting, to another external electronic device (e.g., a second electronic device 204 in FIG. 2 or FIG. 4), a request that the other external electronic device (e.g., the second electronic device 204 in FIG. 2 or FIG. 4) transmit, to the electronic device (e.g., the electronic device 101 in FIG. 1, or the external electronic device 201 in FIG. 2, FIG. 3, or FIG. 4), first data transmitted from the external electronic device (e.g., the first electronic device 202 in FIG. 2 or FIG. 4) to the electronic device (e.g., the electronic device 101 in FIG. 1, or the external electronic device 201 in FIG. 2, FIG. 3, or FIG. 4) instead of the external electronic device (e.g., the first electronic device 202 in FIG. 2 or FIG. 4).

According to an embodiment of the disclosure, the operating method may further include, receiving, from the other external electronic device (e.g., the second electronic device 204 in FIG. 2 or FIG. 4), the first data received by the other external electronic device (e.g., the second electronic device 204 in FIG. 2 or FIG. 4).

According to an embodiment of the disclosure, identifying that the quality of the communication link is less than the threshold quality may include identifying that the quality of the communication link is less than the threshold quality based on at least one of a noise level, a bit error rate (BER), a packet error rate (PER), packet retransmission time, a number of transmitted packets in each unit time, or a retransmission ratio.

According to an embodiment of the disclosure, the request may include information about a time point at which the other external electronic device (e.g., the second electronic device 204 in FIG. 2 or FIG. 4) starts receiving the first data.

According to an embodiment of the disclosure, the operating method may further include identifying that the quality of the communication link is greater than or equal to the threshold quality, and in response to identifying that the quality of the communication link is greater than or equal to the threshold quality, transmitting, to the other external electronic device (e.g., the second electronic device 204 in FIG. 2 or FIG. 4), a request for the other external electronic device (e.g., the second electronic device 204 in FIG. 2 or FIG. 4) to stop receiving the first data.

According to an embodiment of the disclosure, the request to stop receiving the first data may include information about a time point at which the other external electronic device (e.g., the second electronic device 204 in FIG. 2 or FIG. 4) stops receiving the first data.

According to an embodiment of the disclosure, receiving the received first data from the other external electronic device (e.g., the second electronic device 204 in FIG. 2 or FIG. 4) may include receiving, from the other external electronic device (e.g., the second electronic device 204 in FIG. 2 or FIG. 4), the received first data and second data transmitted from the other external electronic device (e.g., the second electronic device 204 in FIG. 2 or FIG. 4) to the electronic device (e.g., the electronic device 101 in FIG. 1, or the external electronic device 201 in FIG. 2, FIG. 3, or FIG. 4) together.

According to an embodiment of the disclosure, a time period in which the electronic device (e.g., the electronic device 101 in FIG. 1, or the external electronic device 201 in FIG. 2, FIG. 3, or FIG. 4) transmits the request to the other external electronic device (e.g., the second electronic device 204 in FIG. 2 or FIG. 4) may precede a time period in which the electronic device (e.g., the electronic device 101 in FIG. 1, or the external electronic device 201 in FIG. 2, FIG. 3, or FIG. 4) receives the first data received by the other external electronic device (e.g., the second electronic device 204 in FIG. 2 or FIG. 4) from the other external electronic device (e.g., the second electronic device 204 in FIG. 2 or FIG. 4).

An electronic device and an operating method thereof according to an embodiment may provide an audio service stably even if an RLF occurs in at least one of communication links between electronic devices which provide the audio service, thereby improving service quality.

An electronic device and an operating method thereof according to an embodiment may solve an issue of service quality degradation due to data loss by transmitting data which is transmitted through a communication link in which an RLF occurs through another communication link in which the RLF does not occur when the RLF occurs in at least one of communication links between electronic devices which provide an audio service, thereby improving service quality.

An electronic device and an operating method thereof according to an embodiment may solve an issue of increased current consumption due to data retransmission by transmitting data which is transmitted through a communication link in which an RLF occurs through another communication link in which the RLF does not occur when the RLF occurs in at least one of communication links between electronic devices which provide an audio service, thereby decreasing current consumption.

What is claimed is:

1. An electronic device, comprising:
    a communication circuit; and
    at least one processor operatively connected to the communication circuit, wherein the at least one processor is configured to:
    receive, from an external electronic device via the communication circuit, information associated with a communication link established between the external electronic device and another external electronic device,
    receive, from the external electronic device via the communication circuit, a request that the electronic device transmit, to the other external electronic device instead of the external electronic device, first data transmitted from the external electronic device to the other external electronic device,
    in response to the request, receive, via the communication circuit, the first data transmitted from the external electronic device to the other external electronic device, and
    transmit the received first data to the other external electronic device instead of the external electronic device via the communication circuit.

2. The electronic device of claim 1, wherein the request is received in response to a quality of the communication link being less than a threshold quality.

3. The electronic device of claim 1, wherein the request includes information about a time point at which the electronic device starts receiving the first data.

4. The electronic device of claim 1, wherein the at least one processor is configured to:
    transmit, to the other external electronic device via the communication circuit, the received first data together with second data transmitted from the electronic device to the other external electronic device.

5. The electronic device of claim 1, wherein the at least one processor is further configured to:
    receive, via the communication circuit from the external electronic device, a request for the electronic device to stop receiving the first data, and
    stop receiving the first data in response to the request to stop receiving the first data.

6. The electronic device of claim 5, wherein the request to stop receiving the first data is received in response to a quality of the communication link being greater than or equal to threshold quality.

7. The electronic device of claim 5, wherein the request to stop receiving the first data includes information about a time point at which the electronic device stops receiving the first data.

8. The electronic device of claim 1, wherein a time period during which the electronic device receives the request from the external electronic device precedes a time period during which the electronic device transmits the received first data to the other external electronic device, instead of the external electronic device.

9. An electronic device, comprising:
    a communication circuit; and
    at least one processor operatively connected to the communication circuit, wherein the at least one processor is configured to:
    transmit, to an external electronic device via the communication circuit, information associated with a communication link established between the electronic device and another external electronic device,
    identify that a quality of the communication link is less than a threshold quality,
    in response to identifying that the quality of the communication link is less than the threshold quality, transmit, to the external electronic device, via the communication circuit, a request that the external electronic device receive first data transmitted from the electronic device to the other external electronic device to transmit, to the other external electronic device, the first data instead of the electronic device, and
    transmit the first data to the other external electronic device via the communication circuit.

10. The electronic device of claim 9, wherein the at least one processor is configured to identify that the quality of the communication link is less than the threshold quality based on one or a combination of a noise level, a bit error rate (BER), a packet error rate (PER), packet retransmission time, a number of transmitted packets in each unit time, and a retransmission ratio.

11. The electronic device of claim 9, wherein the request includes information about a time point at which the external electronic device starts receiving the first data.

12. The electronic device of claim 9, wherein the at least one processor is further configured to:
    identify that the quality of the communication link is greater than or equal to the threshold quality, and
    in response to identifying that the quality of the communication link is greater than or equal to the threshold quality, transmit, to the external electronic device via the communication circuit, a request for the external electronic device to stop receiving the first data.

13. The electronic device of claim 11, wherein the request to stop receiving the first data includes information about a time point at which the external electronic device stops receiving the first data.

14. An electronic device, comprising:
    a communication circuit; and
    at least one processor operatively connected to the communication circuit, wherein the at least one processor is configured to:
    identify that a quality of a communication link established between the electronic device and an external electronic device is less than a threshold quality,
    in response to identifying that the quality of the communication link is less than the threshold quality, transmit to another external electronic device, via the communication circuit, a request that the other external electronic device transmit, to the electronic device, first data transmitted from the external electronic device to the electronic device instead of the external electronic device, and
    receive, from the other external electronic device via the communication circuit, the first data received by the other external electronic device.

15. The electronic device of claim 14, wherein the at least one processor is configured to identify that the quality of the communication link is less than the threshold quality based on one or a combination of a noise level, a bit error rate (BER), a packet error rate (PER), packet retransmission time, a number of transmitted packets in each unit time, and a retransmission ratio.

16. The electronic device of claim 14, wherein the request includes information about a time point at which the other external electronic device starts receiving the first data.

17. The electronic device of claim 14, wherein the at least one processor is further configured to:
- identify that the quality of the communication link is greater than or equal to the threshold quality, and
- in response to identifying that the quality of the communication link is greater than or equal to the threshold quality, transmit, to the other external electronic device via the communication circuit, a request for the other external electronic device to stop receiving the first data.

18. The electronic device of claim 17, wherein the request to stop receiving the first data includes information about a time point at which the other external electronic device stops receiving the first data.

19. The electronic device of claim 14, wherein the at least one processor is configured to:
- receive, from the other external electronic device via the communication circuit, the received first data and second data that is transmitted from the other external electronic device to the electronic device together.

20. The electronic device of claim 14, wherein a time period in which the electronic device transmits the request to the other external electronic device precedes a time period in which the electronic device receives the first data received by the other external electronic device from the other external electronic device.

* * * * *